US012695940B2

(12) United States Patent
Sánchez De La Fuente et al.

(10) Patent No.: US 12,695,940 B2
(45) Date of Patent: Jul. 28, 2026

(54) FILE FORMAT CONCEPTS FOR VIDEO CODING

(71) Applicant: Fraunhofer-Gesellschaft zur Foerderung der angewandten Forschung e.V., Munich (DE)

(72) Inventors: Yago Sánchez De La Fuente, Berlin (DE); Dimitri Podborski, Berlin (DE); Karsten Grueneberg, Berlin (DE); Cornelius Hellge, Berlin (DE); Thomas Schierl, Berlin (DE); Robert Skupin, Berlin (DE); Thomas Wiegand, Berlin (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 0 days.

(21) Appl. No.: 18/819,584

(22) Filed: Aug. 29, 2024

(65) Prior Publication Data

US 2025/0063221 A1 Feb. 20, 2025

Related U.S. Application Data

(63) Continuation of application No. 17/957,827, filed on Sep. 30, 2022, now Pat. No. 12,081,829, which is a
(Continued)

(30) Foreign Application Priority Data

Apr. 3, 2020 (EP) ..................................... 20168113

(51) Int. Cl.
| | |
|---|---|
| *H04N 21/435* | (2011.01) |
| *H04N 21/4402* | (2011.01) |
| *H04N 21/854* | (2011.01) |

(52) U.S. Cl.
CPC ....... *H04N 21/435* (2013.01); *H04N 21/4402* (2013.01); *H04N 21/440227* (2013.01); *H04N 21/85406* (2013.01)

(58) Field of Classification Search
CPC ............. H04N 21/435; H04N 21/4402; H04N 21/440227; H04N 21/85406;
(Continued)

(56) References Cited

U.S. PATENT DOCUMENTS

| | | | |
|---|---|---|---|
| 2008/0025347 A1* | 1/2008 | Mantegna ................. | H04J 3/06 |
| 2016/0234516 A1 | 8/2016 | Hendry et al. | |
| 2017/0111650 A1 | 4/2017 | Hendry et al. | |

FOREIGN PATENT DOCUMENTS

| | | |
|---|---|---|
| GB | 2535453 A | 8/2016 |
| GB | 2546027 A | 7/2017 |
(Continued)

OTHER PUBLICATIONS

"Advanced video coding for generic audiovisual services—Uploaded in 2 parts", ITU-T H.264 (Jun. 2019), Jun. 2019, 836 pp.
(Continued)

*Primary Examiner* — Anthony Bantamoi
(74) *Attorney, Agent, or Firm* — Perkins Coie LLP; Michael A. Glenn

(57) ABSTRACT

File format concepts for video coding are described. Embodiments allow for an efficient extraction of sub-streams from a video file. Further embodiments allow for a flexible switching between sub-streams of a video file. Further embodiments allow for a flexible handling of decoder initializations.

19 Claims, 29 Drawing Sheets

Related U.S. Application Data continuation of application No. PCT/EP2021/058758, filed on Apr. 1, 2021.

(58) Field of Classification Search
CPC ..... H04N 21/234327; H04N 21/23439; H04N 21/44029
See application file for complete search history.

(56) References Cited

FOREIGN PATENT DOCUMENTS

| | | | |
|---|---|---|---|
| KR | 20180068979 A | 6/2018 | |
| WO | WO-03073769 A1 * | 9/2003 | ............. H04N 19/46 |

OTHER PUBLICATIONS

"High efficiency video coding—Uploaded in 2 parts ", ITU-T H.265 (Jun. 2019), Jun. 2019, 696 pp.
"Information technology—Coding of audio-visual objects—Part 15", ISO/IEC 14496-15, Carriage of network abstraction layer (NAL) unit structured video in the ISO base media file format, Jan. 2014, XP030220847, Jan. 2014, 179 pp.
Bross, Benjamin , "Versatile Video Coding (Draft 8)", H.266/VVC, JVET-Q2001, vE, Jan. 2020, Jan. 2020, 513 pp.

* cited by examiner

FILE FORMAT CONCEPTS FOR VIDEO CODING

CROSS-REFERENCE TO RELATED APPLICATIONS

This application is a continuation of copending U.S. patent application Ser. No. 17/957,827 filed Sep. 30, 2022, which is a continuation of International Application No. PCT/EP2021/058758, filed Apr. 1, 2021, which is incorporated herein by reference in its entirety, and additionally claims priority from European Application No. 20168113.7, filed Apr. 3, 2020, which is also incorporated herein by reference in its entirety.

BACKGROUND OF THE INVENTION

Embodiments of the present invention relate to file format parsers for parsing a file comprising information about one or more pictures of a video stream. Further embodiments relate to file generators for generating a file comprising information about one or more pictures of a video stream. Further embodiments relate to video decoders and video encoders. Embodiments of the present invention relate to methods for parsing a file comprising information about one or more pictures of a video stream. Further embodiments relate to methods for generating a file comprising information about one or more pictures of a video stream.

Further embodiments relate to a client device for downloading media data from a server. Further embodiments of the present invention relate to files, such as data files comprising information about one or more pictures of a video stream. Further embodiments of the present invention relate to a manifest file describing media data downloadable by a client from a server. Further embodiments relate to a method for downloading media data from a server.

Examples of the disclosure relate to multi-track VVC file format integration aspects.

Encoded video data may be stored or transmitted in the form of one or more files. These files may comprise, beyond the coded video data itself, information about the structure of the coded video data and/or information about how the coded video data is structured within the file. It is desirable to have a concept for a file format for a video file, and along therewith a concept for generating and parsing the video file, which allows for a flexible and/or efficient (i.e. efficiently exploiting of computational resources and/or memory resources) decoding of the video data stored in the file, in particular in cases, in which the file allows for extracting different video streams from the file, such providing for, e.g., scalable or tiled video bitstreams.

SUMMARY

An embodiment may have a file parser for providing a video bitstream based on a set of tracks of a file signaling a coded video sequence, each of the set of tracks representing a sub-stream of the video sequence, wherein the file parser is configured to derive from descriptive data within the file a subset of tracks of the set of tracks complying with a predetermined operation point, forward the sub-streams of the subset of tracks in the video bitstream.

According to another embodiment, a method for processing a file signaling a coded video sequence may have the steps of: providing a video bitstream based on a set of tracks of the file, each of the set of tracks representing a sub-stream of the video sequence, deriving from descriptive data within the file a subset of tracks of the set of tracks complying with a predetermined operation point, forwarding the sub-streams of the subset of tracks in the video bitstream.

Another embodiment may have a file parser configured to derive, from a file, for a track of the file, an indication indicating whether all sample entries present in the file for the track signal video parameters for a coded video sequence of a video bitstream, which is inserted into the track or a track group of the file to which the track belongs, which meet a predetermined decoder capability, wherein each coded video sequence starts at an RAP of the video bitstream and ends in front of a subsequent RAP of the video bitstream; if all sample entries present in the file for each coded video sequence of the video bitstream are indicated to meet the predetermined decoder capability, leave a video decoder, which receives the coded video sequence, at an RAP at which a coded video sequence starts, as currently initialized irrespective of video parameters signaled by the sample entry for the RAP deviating from video parameters signaled by the sample entry present in the file for the preceding coded video sequence or not, and/or irrespective of the video parameters signaled by the sample entry for the RAP conflicting with a current initialization of the video decoder or not.

According to another embodiment, a method for processing a file may have the steps of: deriving, from the file, for a track of the file, an indication indicating whether all sample entries present in the file for the track signal video parameters for a coded video sequence of a video bitstream, which is inserted into the track or a track group of the file to which the track belongs, which meet a predetermined decoder capability, wherein each coded video sequence starts at an RAP of the video bitstream and ends in front of a subsequent RAP of the video bitstream; if all sample entries present in the file for each coded video sequence of the video bitstream are indicated to meet the predetermined decoder capability, leaving a video decoder, which receives the coded video sequence, at an RAP at which a coded video sequence starts, as currently initialized irrespective of video parameters signaled by the sample entry for the RAP deviating from video parameters signaled by the sample entry present in the file for the preceding coded video sequence or not, and/or irrespective of the video parameters signaled by the sample entry for the RAP conflicting with a current initialization of the video decoder or not.

A first aspect of the invention provides a concept for a file, a file parser, a file generator as well as a client for downloading media data from a server and a manifest file provided by a server. In embodiments according to the first aspect, a file signals a coded video sequence distributed over a set of tracks of the file, each of the tracks signaling a sub-stream of the coded video sequence. A file parser may generate a video bitstream for decoding by extracting one, or a combination of multiple, of the sub-streams of the file. Depending on the extracted sub-streams, the video bitstream may have individual properties, e.g. in terms of constraints on bitrate, picture size, frame rate, etc., e.g. expressed in profile, tier, level parameter. The file further comprises descriptive data which indicates, for an operation point (e.g. defining constraints for the decoding of the video bitstream extracted from the file), a subset of the tracks, the sub-streams of which are required for the video bitstream of the operation point. Hence, the descriptive data may allow the file parser to extract the video bitstream by means of extracting entire tracks, so that a parsing of individual samples of the coded video data may be unnecessary for extracting the video bitstream. Further, as the mechanism allows for extracting individual sub-streams, samples of same decoding time which belong to different tracks may be forwarded in the video bitstream independently from each other.

According to an embodiment, the indication of the tracks required by the operation point are indicated in the file by means of an entity group syntax structure assigning the operation points to a set of tracks. As the entity group syntax structure may be stored on file-level, the file parser may not be required to parse all tracks, but only the tracks assigned to the currently selected operation point. Thus, the file parsing may be particularly efficient.

A second aspect of the invention provides a concept for a file, a file parser, a file generator as well as a client for downloading media data from a server and a manifest file provided by a server. Embodiments according to the second aspect allow for extracting, from a track of a file which signals a coded video sequence, a portion of samples of the track so as to generate a video bitstream in accordance with a selected operation point. Thus, embodiments of the second aspect allow for forwarding a track partially, so that an unnecessarily high bitrate of the video bitstream may be avoided. Embodiments of the second aspect may be particularly beneficial in scenarios, in which a base layer track signals a base layer of a coded video sequence, and a further track signals comprises an enhancement layer for the base layer, the enhancement layer, e.g., providing a higher resolution of pictures of the coded video sequence. In cases in which a portion but not all pictures of the base layer are required for decoding the enhancement layer, e.g. a video stream having the higher resolution, for example in cases in which a portion of pictures is encoded without inter-layer prediction, embodiments thus allow for an extraction of a portion of the base layer, which is actually required for decoding the enhancement layer. According to the second aspect, embodiments of the file include descriptive data indicating the required portion of the samples of the track required by the operation point.

According to an embodiment, the indication of the required portion of the samples is carried in a sample group syntax structure which indicates, for a layer of the coded video sequence, a constraint on a temporal sublayer of the coded video sequence by indicating a constraint on a temporal sublayer identifier. Based on the finding that, in many cases, the temporal sublayer to which a sample of the coded video sequence is associated, in combination with a layer to which the sample is associated, is a valid criterion for the decision whether the sample is required for an operation point or not, the indication of a constraint on a temporal sublayer is an efficient way, in terms of signaling overhead, of providing selectivity for forwarding individual samples of a track.

A third aspect provides a concept for a file, a file parser, a file generator as well as a client for downloading media data from a server and a manifest file provided by a server. In embodiments according to the third aspect, a file signals a coded video sequence distributed over a set of tracks of the file, each of the tracks signaling a sub-stream of the coded video sequence. The file comprises switching information indicating samples of a first track at which switching from a second track is allowed provided that one or more preceding samples in the second track are available to the video decoder. The third aspect relies on the idea, that in case that the one or more preceding samples are available, switching to the first track is possible at a sample which relies on a reference sample (e.g. at a non-RAP sample), if a sample of the second track which is temporally collocated with the reference sample of the first track is available to the decoder. The indication of such switching points may thus allow for switching at non-RAP sample position, providing for a high flexibility in the decoding and presentation of the coded video sequence.

A fourth aspect provides a concept for a file, a file parser, a file generator as well as a client for downloading media data from a server and a manifest file provided by a server. The file signals, in a track of the file, coded video sequences of a video stream. The file comprises respective sample entries for the coded video sequences, the sample entries signaling video parameters (which are, e.g. indicative or required decoder capabilities) for the coded video sequences. According to the fourth aspect, the file comprises descriptive data, from which the file parser may derive, whether the video parameters signaled by all of the sample entries for the track or a track group, meet a predetermined decoder capability. Thus, the file parse may suppress a re-initialization of a video decoder processing the video bitstream in cases in which all coded video sequences of the track comply with the decoder capabilities irrespective of the finding, that the video parameters may change within the track. In other words, an unnecessary re-initialization of the decoder may be avoided.

BRIEF DESCRIPTION OF THE DRAWINGS

Embodiments of the present disclosure are described in more detail below with respect to the figures, among which.

DETAILED DESCRIPTION OF THE INVENTION

In the following, embodiments are discussed in detail, however, it should be appreciated that the embodiments provide many applicable concepts that can be embodied in a wide variety of video coding concepts. The specific embodiments discussed are merely illustrative of specific ways to implement and use the present concept, and do not limit the scope of the embodiments. In the following description, a plurality of details is set forth to provide a more thorough explanation of embodiments of the disclosure. However, it will be apparent to one skilled in the art that other embodiments may be practiced without these specific details. In other instances, well-known structures and devices are shown in form of a block diagram rather than in detail in order to avoid obscuring examples described herein. In addition, features of the different embodiments described herein may be combined with each other, unless specifically noted otherwise.

In the following description of embodiments, the same or similar elements or elements that have the same functionality are provided with the same reference sign or are identified with the same name, and a repeated description of elements provided with the same reference number or being identified with the same name is typically omitted. Hence, descriptions provided for elements having the same or similar reference numbers or being identified with the same names are mutually exchangeable or may be applied to one another in the different embodiments.

Figure 1:
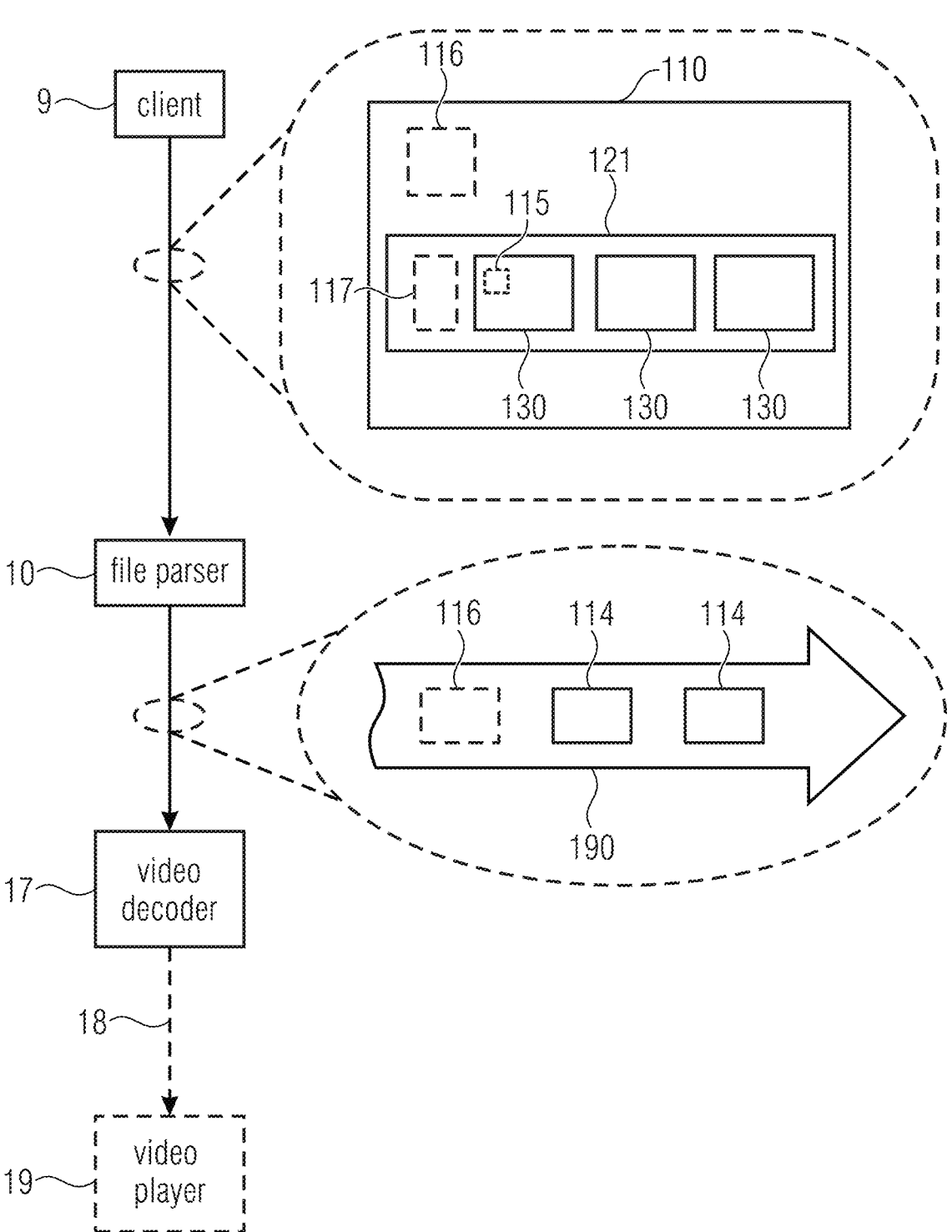
FIG. 1 illustrates an example of a file parser and a file.
Figure 2:
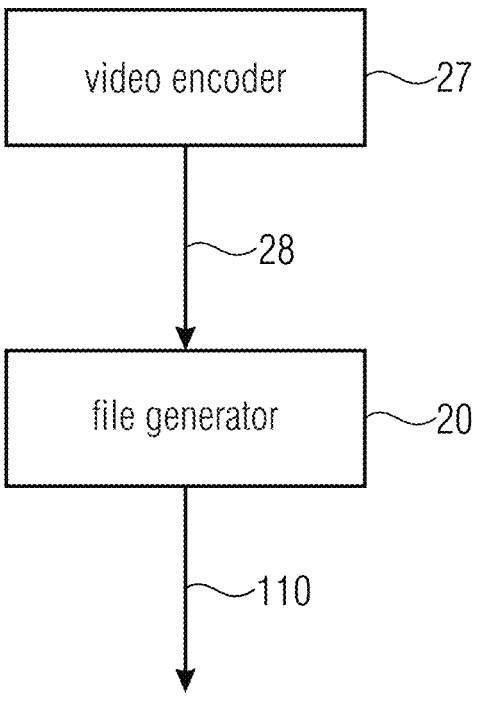
FIG. 2 illustrates an example of a file generator.

The following description of the figures starts with the presentation of a file parser in conjunction with a video decoder, and a file generator in conjunction with a video encoder with respect to FIG. 1 and FIG. 2, respectively. The file parser of FIG. 1 and the file generator of FIG. 2 provide an example for a framework into which embodiments of the present invention may be built in. Thereinafter, the description of embodiments of the concept of the present invention is presented along with a description as to how such concepts could be built into the file parser and the file generator of FIG. 1 and FIG. 2, respectively. Although, the embodiments described with respect to the subsequent FIG. 3 and following may also be used to form a file parser and a file generator not operating according to the framework described with respect to FIG. 1 and FIG. 2.

0. File Parser 10 According to FIG. 1 and File Generator 20 According to FIG. 2

FIG. 1 illustrates an example of a file parser 10 in conjunction with a video decoder 17. The file parser 10 receives a file 110 and generates on the basis of the file 110 a video bitstream 190. The file 110 may also be referred to as video file, file data, file of a video or the like. The video bitstream 190 is provided to the video decoder 17 which decodes the video bitstream 190 so as to obtain a sequence 18 of decoded picture. For example, the sequence 18 of decoded pictures may be played by a video player 19. The file parser 10 may represent any means receiving the file. For example, one or more or all of the file parser 10, the decoder 17 and the player 19 may be part of one common devices. That is, the entity receiving the video bitstream 190 may be video decoder 17 or a video player comprising the latter. In so far the file format parser 10 may, itself, form one entity along with the video decoder 17 and/or the video player and/or an application such as a DASH client or the like. The video bitstream 190 generated by file parser 10 may include all or an excerpt of the content of file 110.

The file 110 comprises samples 130 of coded video data, e.g. data, into which the residual samples and prediction modes, motion vectors and so froth is actually coded. For example, a sample 130 comprises a coded picture of a coded video sequence coded into file 110, or comprises a portion of a coded picture, such as a slice or a tile thereof. For example, a sample 130 may comprise one or more video coding layer (VCL) network abstraction layer (NAL) units, each of which may comprise a portion of a coded picture such as a slice or a tile of a coded picture. In other words, a sample 130 may refer to an entire coded picture, or may refer to a portion thereof. In the latter case, multiple samples 130 may together signal a coded picture. The file 110 may comprise one or more tracks to which the coded video data is distributed, e.g. track 121 shown in FIG. 1.

The file 110 may further comprise descriptive data. The descriptive data may be indicative of a structure of the coded video data signaled in file 110, dependencies within the coded video data, information for decoding of the coded video data and/or information for parsing the coded video data. The descriptive data may be signaled in-band with the samples 130. E.g., a sample 130 may comprise descriptive data 115, e.g. a parameter set. In-band descriptive data may refer to coded video data of a sample 130 to which it belongs and may optionally refer to further samples associated which the sample, e.g. via a reference. For example, the in-band descriptive data 115 may be signaled in a non-VCL NAL unit, e.g. a SEI NAL unit or a parameter set (PS) NAL unit. Additionally of alternatively, descriptive data may be signaled out-of-band. For example, descriptive data may be signaled in a sample entry 117 which may optionally be part of track 121. Further, file 110 may comprise descriptive data 116 at file level, i.e. in addition to the one or more tracks 121 instead of part of a track, e.g. a meta box.

The file parser 10 parse the descriptive data of file 110, or a portion thereof, and derive the video bitstream 190 by inserting, into the video bitstream 190, coded video data, or a portion thereof, along with descriptive data, or a portion thereof, of the file 110. For example, file parser 10 may insert samples 130 into the video bitstream 190 according to a decoding order of the samples 130. Further, file parser 10 may insert descriptive data at positions in the video bitstream 190 at which it is required for decoding the samples 130.

The file 110 may provide several choices for extracting a decodable video stream, i.e. multiple choices for performing a playback based on the coded video data of file 110. Each of the decodable video streams may comprise a set of the samples 130. One of the streams may include the entire coded video data of file 110, others may be sub-streams, including a subset of the samples 130. For example, a track of file 110 may comprise a sub-stream which may be decoded, i.e. played, independently from other tracks. That is, the track may comprise all samples and parameter sets required for generating a decodable video stream. Other examples of tracks may comprise a sub-stream of the coded video data 12 which is not decodable independently from other tracks. For example, a sub-stream of a track (e.g. the sub-stream is defined by a parameter set of the track, e.g. by indicating samples belonging to or required by the subs-stream, e.g. by referencing one or more layers and/or one or more temporal layers) may depend on a further track, as it may require samples 11 of the further track. Also, a sub-stream of the coded video data 12 may include multiple tracks which may both comprise or define independent or dependent sub-streams themselves. A generation of the video bitstream 190 based on multiple tracks may be referred to as joint decoding of the respective tracks or sub-streams. For example, the different decodable video streams of file 110 may signal the same content at different quality (e.g. frame rate, resolution) and/or may signal different sub-pictures, e.g. for providing different fields of view to a user. In other words, by means of selecting a decodable stream from file 110, the video stream may be scalable or tiled.

For example, decodable video streams within file 110 may be defined by indicating samples belonging to a specific one the video streams. As mentioned before, samples 130 of the file 110 may belong to a track 121 of the file 110, so that samples may be selected by track. Further, samples 130 may be associated with one out of one or more layers of the coded video data signaled in file 110. Additionally or alternatively, samples 130 may be associated with one of one or more temporal layers, which may comprise pictures for complementary points in time, so that a frame rate of a video stream may depend on the number of temporal layers selected for the video stream. Thus, a video stream may, for example, be defined by means of selecting one or more layers and/or one or more temporal layers and/or one or more tracks.

The decision among the choices for playback of the coded video data 12 may be provided to the file parser 10 from external means such as the video decoder 17 or the video player 19 or some application, or might even be made by the file parser 10 itself, and the file parser 10 may provide the video bitstream 190 accordingly. For example, the file parser 10 may select the sub-stream on the basis of an operation point which is indicative of capabilities of the video decoder 17. Thus, file parser 10 generates video stream 190 by including, into the video stream 190, a set of samples 130 of the coded video data 12 and descriptive data for the selected video bitstream.

In other words, the term file parser may refer to any means receiving and processing a file so as to feed therefrom a decoder, here a video decoder; the recipient of the excerpt of the file, namely a video bitstream, having the parameter sets therein in-band or a video bitstream which is accompanied by parameter sets out-of-band, may be a video decoder or a video player comprising the latter; in so far the file parser may, it self, form one entity along with the video decoder and/or the video player and/or an application such as a DASH client or the like.

Optionally, file 110 may be provided to file parser 10 by a client device 9. Client device 9 may download file 110 from a server. For example, the client device 9 may be an application such as a DASH client. The client device 9 may receive from the server, a manifest file, such as an MPD file, the manifest file comprising a plurality of descriptions for respective media representations, which are downloadable from the server. The manifest file may describe which files, e.g. file 110, are required for a media representation and where to download them. E.g. a media representation may refer to a decodable video stream or sub-stream of the coded video sequence, as described above. Thus, client 9 may select one or more files for download in dependence on the predetermined operation point 102. The manifest file may optionally describe constraints or tier, profile, level information for a video bitstream of the media representation.

FIG. 2 illustrates an example of a file generator 20 in conjunction with the video encoder 27. Video encoder 27 generates a video bitstream 28, based on which the file generator 20 generates the file 110. The video stream 28 may be similar to the video bitstream, or, in examples, be equal to the video bitstream 28. In contrast to video bitstream 28, the video stream 110 of FIG. 1 may, for example, include only a portion of the content of file 8, while the video bitstream 28 may comprise the entire coded video data of file 8.

It is noted that although, in the context of the individual embodiments described in sections 1 to 4, the description may focus on the file parser and the file, the description is also to be understood as a description of respective file generators, e.g. within the framework of file generator 20 of FIG. 2. For each embodiment of a file parser, there is a corresponding embodiment of a file generator which is for inserting the information and data into the file to be parsed by the file parser. For example, it is clear, that information derived from a file by a file parser, e.g. information being descriptive of coded video data within the file, is to be inserted into the file by the corresponding file generator. For example, file generator may obtain the respective information from the video encoder 27, or may derive the information such as the descriptive data by inspecting the coded video data provided by video encoder 27.

Several applications require storing the video data into multiple tracks or using multiple sample entries.

Examples of use-cases s where multiple tracks are required are consumption/transmission of scalable bit-streams or tiled bitstreams. In such cases, the consumed video data depends on different factors, such as client capabilities (e.g., acceptable resolution), throughput characteristics (e.g. higher or lower bitrate video can be streamed) or RoI or viewport of a user where a different set of tiles or rectangular regions aka. subpictures are played back to match the user orientation or RoI.

There are different issues that need to be solved for multi-track scenarios. First, there are two different scenarios envisioned:

A. Several tracks provide together a joint bitstream: scalable or tiled-tracks use case. In this case the video bitstream is extracted from several tracks B. A single track of the several tracks provide a bitstream: e.g. tracks with different resolutions, bit-rates, etc. In this case the bitstream is generated by extracting a sample of one or another track.

For case A), different solutions exist that have been provided for previous scalable video coding standards, such as SVC and SHVC. On the one hand, so-called extractors can be used. If a sample in a dependent track contains a construct that is called and "extractor" this contain some kind of instructions on how to extract and substitute the "extractor" construct by samples that come from tracks on which the current track depends on. An alternative is to use some implicit reconstruction mechanism that specifies without requiring the presence of an "extractor" construct how to generate the access units of a video by extracting the required samples from several tracks.

Sections 1 and 2 include embodiments that describe how multi-track solutions for a bitstream are encapsulated and decapsulated.

For case B), typically switching from one track to another is done at Random Access Points, i.e. IDRs for AVC, IDRs, CRAs and BLAs for HEVC. However, there is a benefit of allowing switching at a higher granularity as described in section 3.

Examples of cases where different sample entries might be required are a track containing sub-streams that are encoded with different codecs, or encoded with the same codec but different profiles, e.g. due to ad insertion, or even encoded with the same codec and profiles but containing some high-level metadata (e.g. SEI messages) that are not allowed to be stored in-band at the track level together with the samples but is stored at sample entries. In the latter case, to be able to dynamically change that metadata within the stream, this means to work either with multiple-tracks, which is not desirable in some scenarios, or have several sample entries changing them dynamically during playback of a track.

However, changing a sample entry involves resetting the decoder which might be undesirable in some cases. For instance, if there is a change of codec, it makes sense to reset the decoder, but if there is only a change in that metadata but the decoding process can be kept running, it would be desirable to not reset the decoder. Section 4 describes embodiments in this regard.

1. File Parser 100 and File 110 According to FIG. 3 to FIG. 11

Examples of the concept in section 1 may refer to layered VVC bitstreams using a multi-track approach. Embodiments of section 1 may be in accordance with the first aspect.

VVC supports scalability (SNR, spatial, Multi-view . . . ) with same means as single layer decoding. This means, that any VVC decoder can decode a multi-layer stream as long as the required capabilities indicated by the profile tier level do not exceed a certain value.

The implementation of layered Versatile Video Coding in ISO-BMFF can be done following the design principles of previous scalable standards, such as SVC and SHVC.

This requires to define a new sample entry type, e.g. 'vvc2' and 'vvi2'. A sample entry of this type in a track that indicates a sample dependency with a box 'tref' would require then further processing of the tracks that this track depends on for generation of the scalable VVC bitstream. This is similar as for previous standards such as SVC and VVC.

As already mentioned in the introduction this could be done with "extractors" indicating the dependent samples or by an implicit reconstruction process that does not require "extractors".

Figure 3:
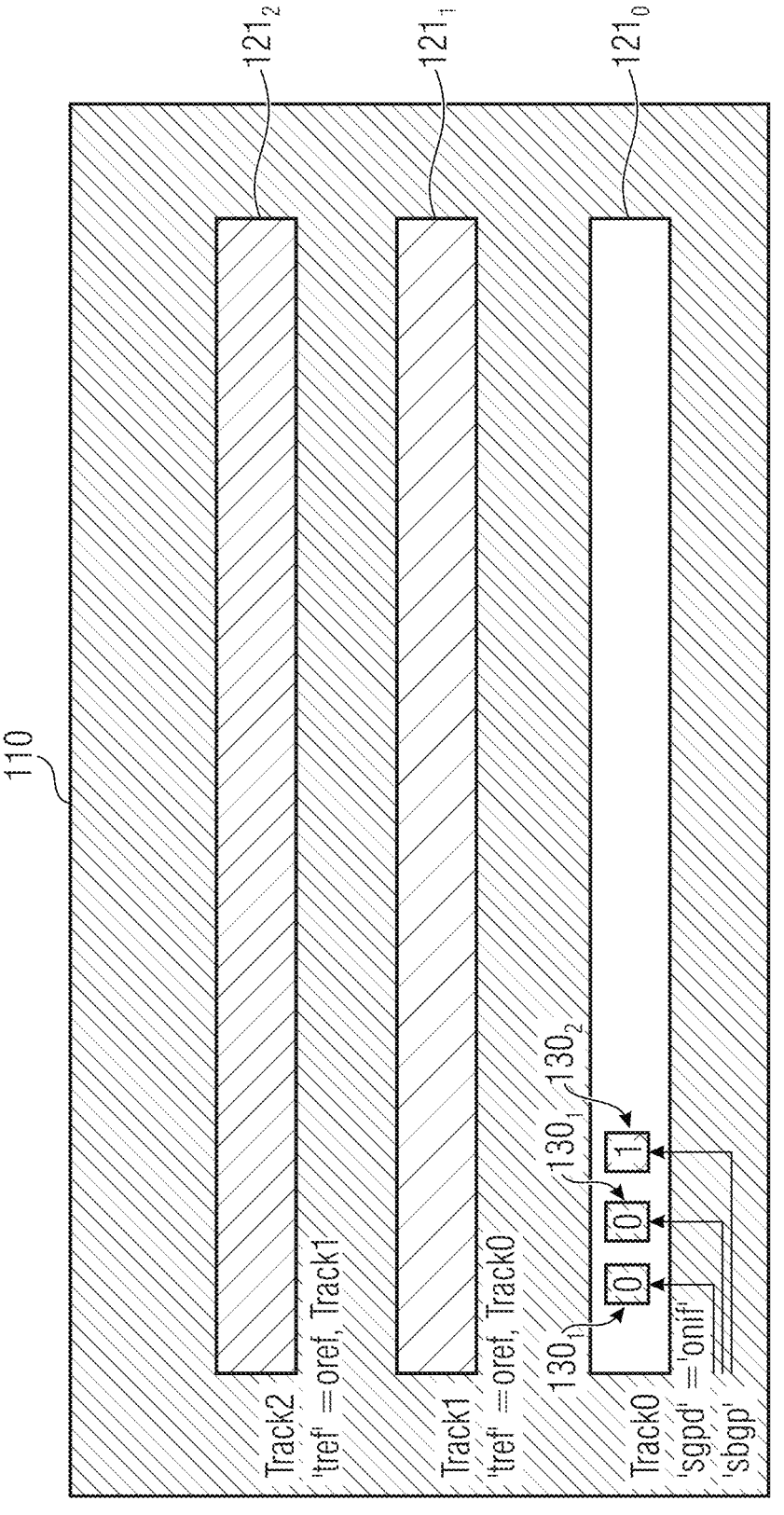
FIG. 3 illustrates an example of a file.

FIG. 3 illustrates an example of a file structure for implicit reconstruction. The file structure of FIG. 3 may represent an example of a file 110, which may optionally correspond the file 110 as described in section 0. According to the example of FIG. 3, file 110 comprises three tracks 121, namely track 0, referenced using reference sign 121₀, track 1 (reference sign 121₁), and track 1 (reference sign 121₂). FIG. 3 illustrates how implicit reconstruction may work for three tracks, Track0 (base layer), Track1 (enhancement layer 1) and Track2 (enhancement layer 2). The implicit reconstruction process requires the association of a track to an operation point, similar as done for SHVC with the operation point information 'oinf' sample group. This sample group is only stored into one track containing a layer that is present in all operation points (i.e. the base layer). In the example below two sample groups are represented. The sample groups are described by a box 'spgd' (sample group description box) that would list two groups within the sample group box. The 'sbgp' (sample to group box) box marks the samples within the base layer track as belonging to one of these two groups in the example. Then, the rest of the tracks with layers depending on this layer contain a track reference to indicate that are dependent tracks and they indicate a reference type of 'oref' to indicate that they are to be or can be reconstructed using the implicit reconstruction process and that they depend on lower layer tracks.

Then, the implicit reconstruction process involves figuring out what layers and therefore tracks belong to an operation point and getting the samples from each of the relevant tracks. All this information is currently carried out in the 'oinf' sample group description box. It tells when a sample belongs to a sample group (operation point) and which layers are entailed for that operation point. Note that some tracks required for an operation point might have additional layers that are not required for an operation point and therefore some NAL units need to be removed from the extracted bitstream. Also, note that the 'oinf' sample group is only present in one track and samples within that track can be mapped to that sample group dynamically, which does not allow to map samples with the same decoding time in different tracks to different operation points.

Since the dynamicity within a track to map samples to sample groups seems to be either:

In many cases unnecessary and complicated as tables for sample group mapping (sample to group box) needs to be parsed.

Not flexible enough as samples of same decoding time belong to the same operation point a different approach may be of advantage.

Figure 4:
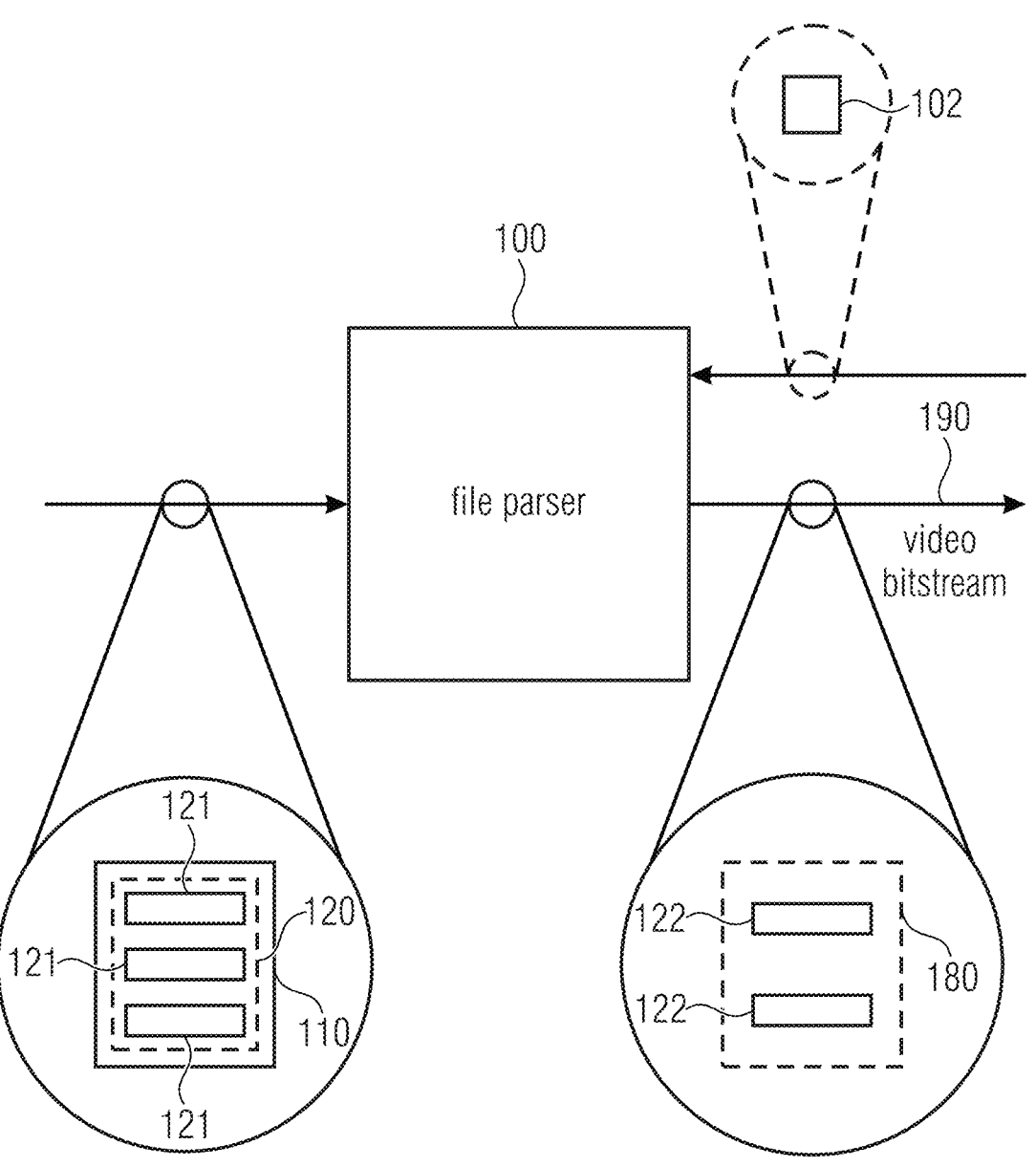
FIG. 4 illustrates an example of a file parser for multi-track scenarios.

FIG. 4 illustrates an example of a file parser 100, which may optionally correspond to the file parser 10 explained in section 0. That is, the concept of file parser 100 of section 1 may optionally implemented within the framework described in section 0. According to the example of FIG. 4, the file 110, which may optionally correspond to the file 110 of FIG. 1, comprises a set 120 of tracks 121, e.g. as described with respect to FIG. 1. The set of tracks 121 signals a coding video sequence. Each of the tracks 121 represents a sub-stream of the video sequence, the sub-stream being optionally, but not necessarily, decodable independently from other tracks. The file parser 100 may derive from the descriptive data within the file 110 a subset 180 of tracks of the set 120 of tracks complying with a predetermined operation point 102. The subset 180 of tracks 121 may comprise one or more or all of the tracks 121 of the set 120 of tracks within the file 110. The predetermined operation point 102 may be associated with one or more bitstream requirements such as requirements for buffer sizes, bit rate, timing, or in general, requirements for the video bitstream 190 provided by file parser 100, which requirements are set by video decoder 17 or video player 19 for decoding or playing the video bitstream 190. File parser 100 forwards the sub-streams 122 of the sub set of tracks 121 and the video bitstream 190.

The sub-stream 122 of a track 121 forwarded in the video bitstream 190 may not necessarily comprise all information indicated in track 121, but may, for example, lack some parameter set or descriptive data of track 121. In other examples, the information referred to as sub-stream 122, forwarded by file parser 100 in the video bitstream 190, may optionally but not necessarily correspond to the respective track 121.

In other words, according to file parser 100 of FIG. 4, a video stream represented by the video bitstream 190 may be extracted from file 110 by including, into the video bitstream 190, respective sub-streams of the subset 180 of tracks 121 associated with the predetermined operation point. As described with respect to FIG. 1, file parser 100 may select a predetermined operation point itself, or on the basis of an information about the operation point which may be provided by the video decoder 17 of the video player 19. In the following, several examples of how the predetermined operation point is associated with the set 180 of tracks are described.

For example, the tracks belonging to an operation point are grouped together into a track group. There are different options to do this:

1) All tracks of a scalable bitstream belong to the same track group
     a. The track group information contains a description of which belong to an operation point.
      i. The track itself describes what is inside: layer_id, sub_layer_id, etc.
      ii. The track group description defines the operation points in a similar manner than 'oinf'. Defining operation points, with which layers_ids to include, and so on. In another embodiment this information is not carried with every track belonging to the track group as typically done but there is a central grouping information used (e.g., using entity groups) for conveying this information reducing thus the overhead.

For example, file parser 100 may derive, from descriptive data of the file 110, a set of layer identifiers indicating one or more layer identifiers, e.g., layer_id. The descriptive data may associate the set of layer identifiers with the predetermined operation point. For example, the descriptive data may indicate, for each of a plurality of operation points, a respective set of layer identifiers. The file parser 100 may parse descriptive information of the tracks 121 of the file 110 so as to derive, for each of the tracks 121, one or more layers associated with the track. File parser 100 may forward a track 121 in the video bitstream 190, if one of the one or more layers to which the track is associated is identified to be relevant for the predetermined operation point by the set of layer identifiers. For example, such a signaling may be realized by a track group syntax structure as described with respect to FIG. 5.

Figure 5:
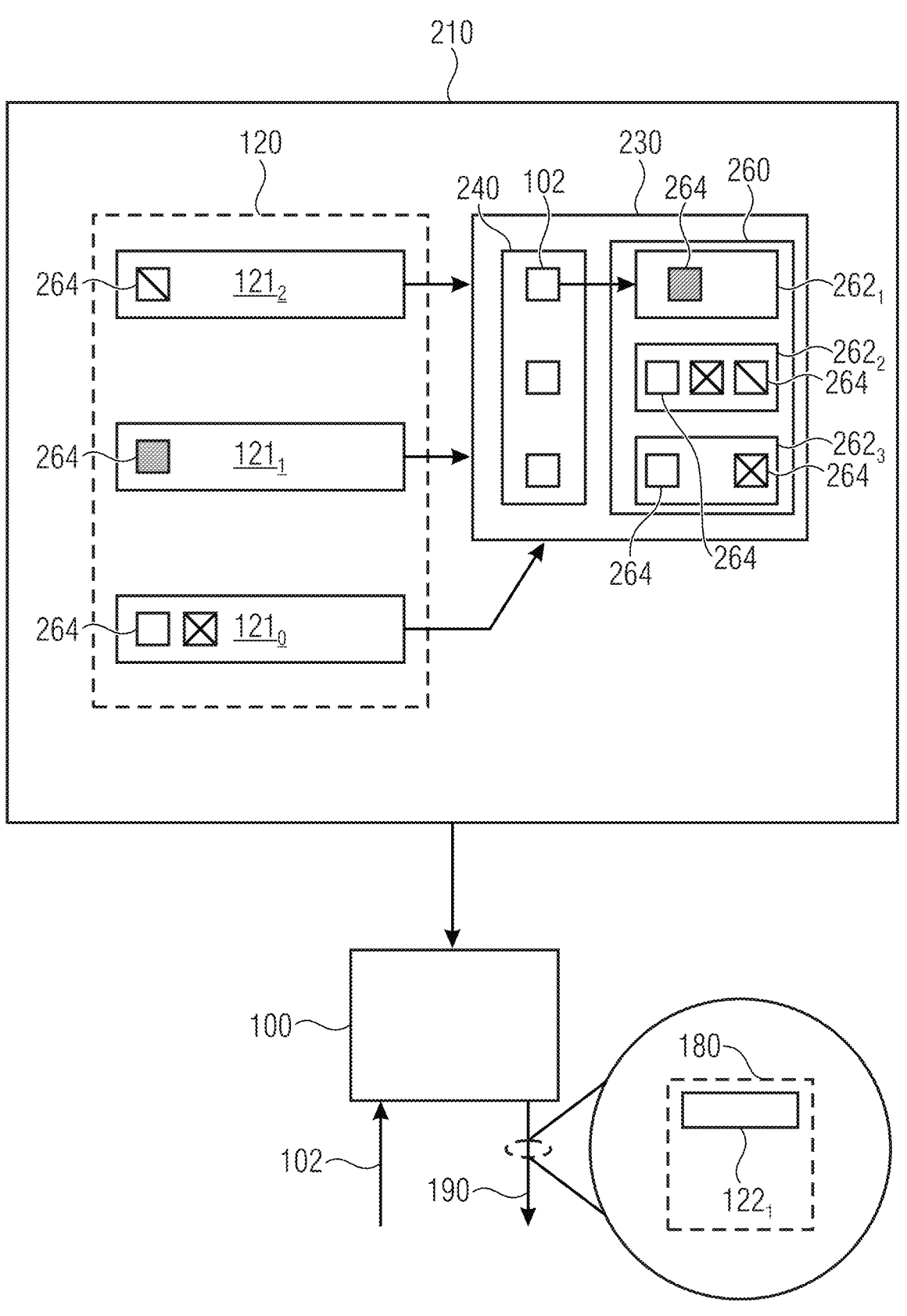
FIG. 5 illustrates an example of a file parser and a file using a track group.

FIG. 5 illustrates an example of the file parser 100 of FIG. 4, which may receive a file 210. File 210 may optionally correspond to the file 110 of FIG. 4. The file 210 comprises, within its descriptive data, a track group syntax structure 230. The set 120 of tracks 121 of file 210 are associated with a track group syntax structure 230. For example, each of the tracks 121 of the set 120 of tracks may comprise a reference pointing to the track group syntax structure 230. The track group syntax structure 230 may indicate, for each of a set 240 of operation points, comprising the predetermined operation point 102, a respective set 262 of layer identifiers 264. In other words, the track group syntax structure 230 may comprise a set 260 of sets 262 of layer identifiers 264. In the example of FIG. 5, the set 260 of sets of layer identifiers comprises a first set 262₁, a second set 212₁ and a third set 262₃ of layer identifiers. In FIG. 5, for illustrative purpose, the predetermined operation point is indicated to be associated with the first set of layer identifiers 262₁, which is indicative of a layer identifier 264 to which samples of the second layer 121₁ are associated. File parser 100 may derive, from descriptive data of the tracks 121, layer identifiers identifying layers contained in the respective tracks, so as to associate one or more of the tracks 121 with the predetermined operation point.

Optionally, the track group syntax structure 230 further comprises information about a tier, a level, a profile and a set of constrains for each of the operation points. For example, the information describing the operation point may be indicated by means of an index pointing to a set of combinations of tier, level, profile and set of constraints.

Figure 6:
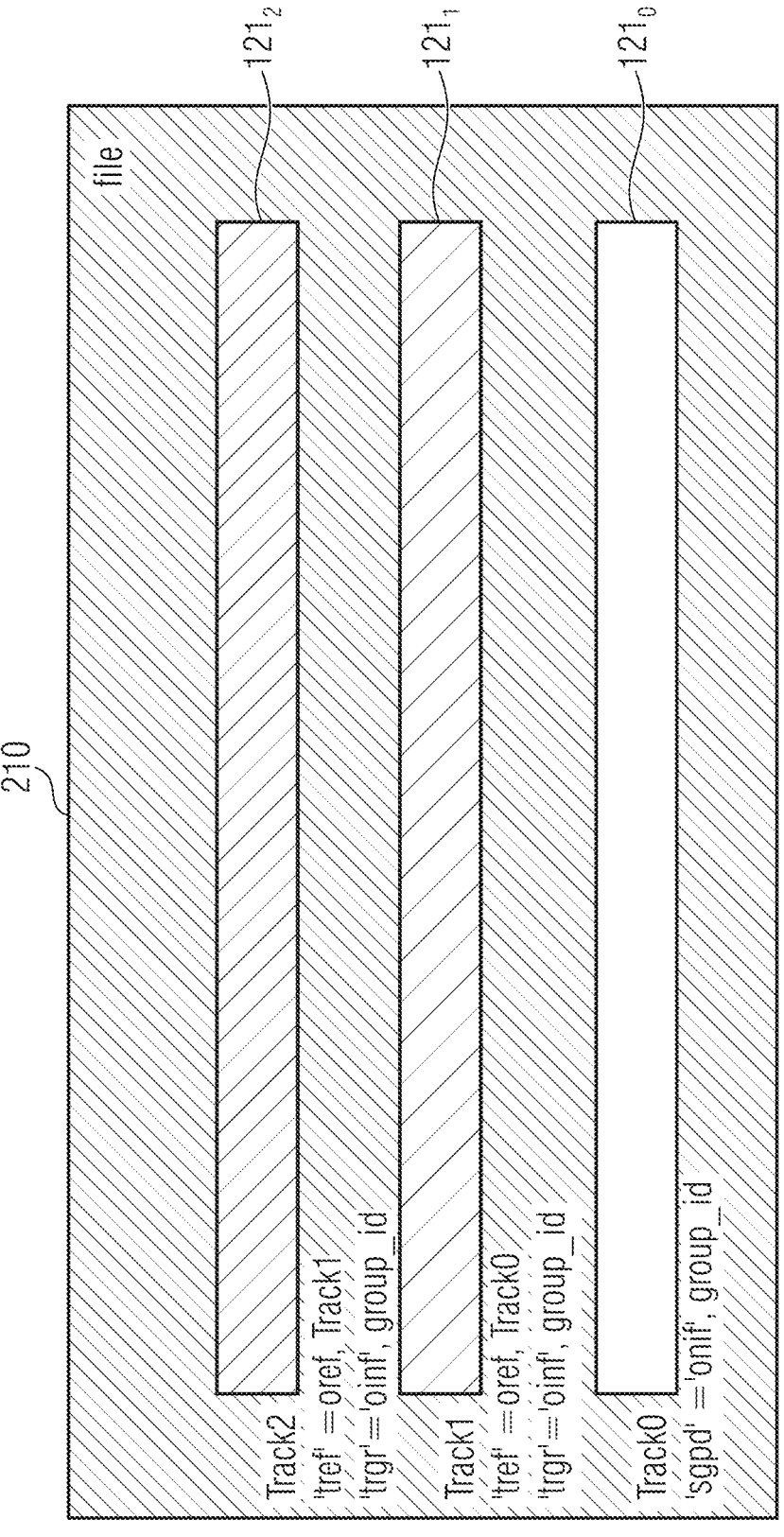
FIG. 6 illustrates another example of a file.

FIG. 6 illustrates an example of a file structure 210 with track groups for implicit reconstruction. The file structure 210 of FIG. 6 may optionally correspond to the file structure 210 of FIG. 5. FIG. 6 illustrates an example for track group references associating each of the tracks 121₀, 121₁, 121₂ to a track group syntax structure, as explained with respect to FIG. 5.

For example, the track reference indicated for the tracks may be of a track reference type, e.g. 'oref' (or a new one 'gref' track group reference), which implies the presence of a track group for implicit reconstruction. For example, file parser 100 may parse descriptive data associated with the tracks 121. If file parser detects a track reference of the track reference type indicating the presence of a track group, file parser 100 may parse the indicated track group for reconstruction of the video bitstream 190.

The track group, e.g. as described by the following syntax, may be mapped to a track group of type 'oinf' by the 'trgr' box and mapped to a group_id. In the example in FIG. 5 all tracks belong to the same track group. However, the 'oinf' box can contain multiple operation points, e.g. OP0=Layer0, OP1=Layer0+Layer1, OP2=Layer0+Layer1+ Layer2. Therefore, this track grouping shown below needs that the tracks contain information about the layers within them so that a mapping from track to operation point can be done.

```
aligned(8) class TrackGroupTypeBox (unsigned int(32)
track_group_type) extends FullBox(track_group_type, version = 0,
flags = 0)
{
    unsigned int(32) track_group_id;
    if track_group_type == 'oinf' {
        unsigned int(6) num_profile_tier_level;
        for (i=1; i<=num_profile_tier_level; i++) {
            unsigned int(1) general_tier_flag;
            unsigned int(5) general_profile_idc;
            unsigned int(x) general_constraint_indicator_flags;
            unsigned int(8) general_level_idc;
        }
        unsigned int(16) num_operating_points;
        for (i=0; i<num_operating_points) {
            unsigned int(8) ptl_idx;
            unsigned int(8) layer_count;
            for (j=0; j<layer_count; j++) {
                unsigned int(6) layer_id;
            }
        }
    }
}
```

In this case, the parser needs to parse the track grouping information for each of the tracks. Then, once the parser identifies which tracks belong to the same track grouping, this means to select one operation point of the ones described in the track grouping described above, and identify which tracks contain the layers required for that operation point. Each track contains an additional box that described the layer information, i.e. which layers are contained there. Thus, the parser identifies the tracks that are required for the selected operation point and the samples within these tracks are extracted and sent together to the decoder.

Figure 7:
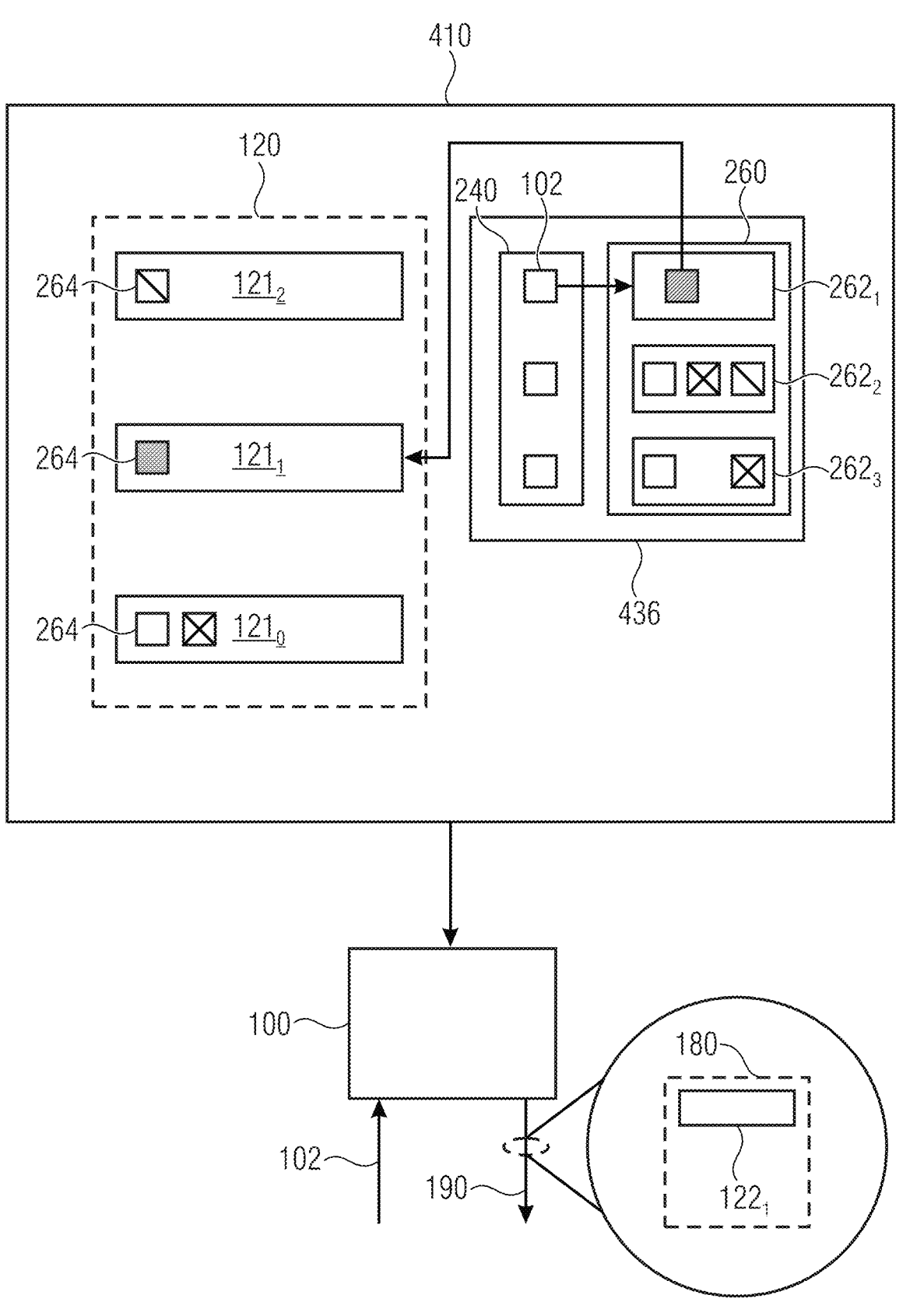
FIG. 7 illustrates an example of a file and a file parser, according to which a set of layer identifiers is signaled in an entity group syntax structure.

FIG. 7 illustrates another example of the file parser 100 in conjunction with the file 410 from which file parser 100 extracts the video bitstream 119. File 410 differs from file 210 described with respect to FIG. 5 at least in that the information associating the predetermined operation point 102 with a set 262 of layer identifiers, e.g., set $262_1$ in FIG. 7, is indicated in an entity group syntax structure 436 of the file 410 instead of the track group syntax structure 230 of file 210. Accordingly, file parser 100 of FIG. 7 may parse the entity group syntax structure 436 so as to derive the set $262_1$ of layer identifiers associated with a predetermined operation point 102. File parser 100 may parse descriptive data of the tracks 121 so as to derive in which of the tracks 121 the indicative layers are signaled. File format parser 100 may forward the tracks, or the video streams 122 of the tracks (e.g. at least samples 130 comprising the coded video data along with all or a part of descriptive data of the track), which comprise layers identified by the set of layer identifiers associated with the predetermined operation point 102.

Figure 8:
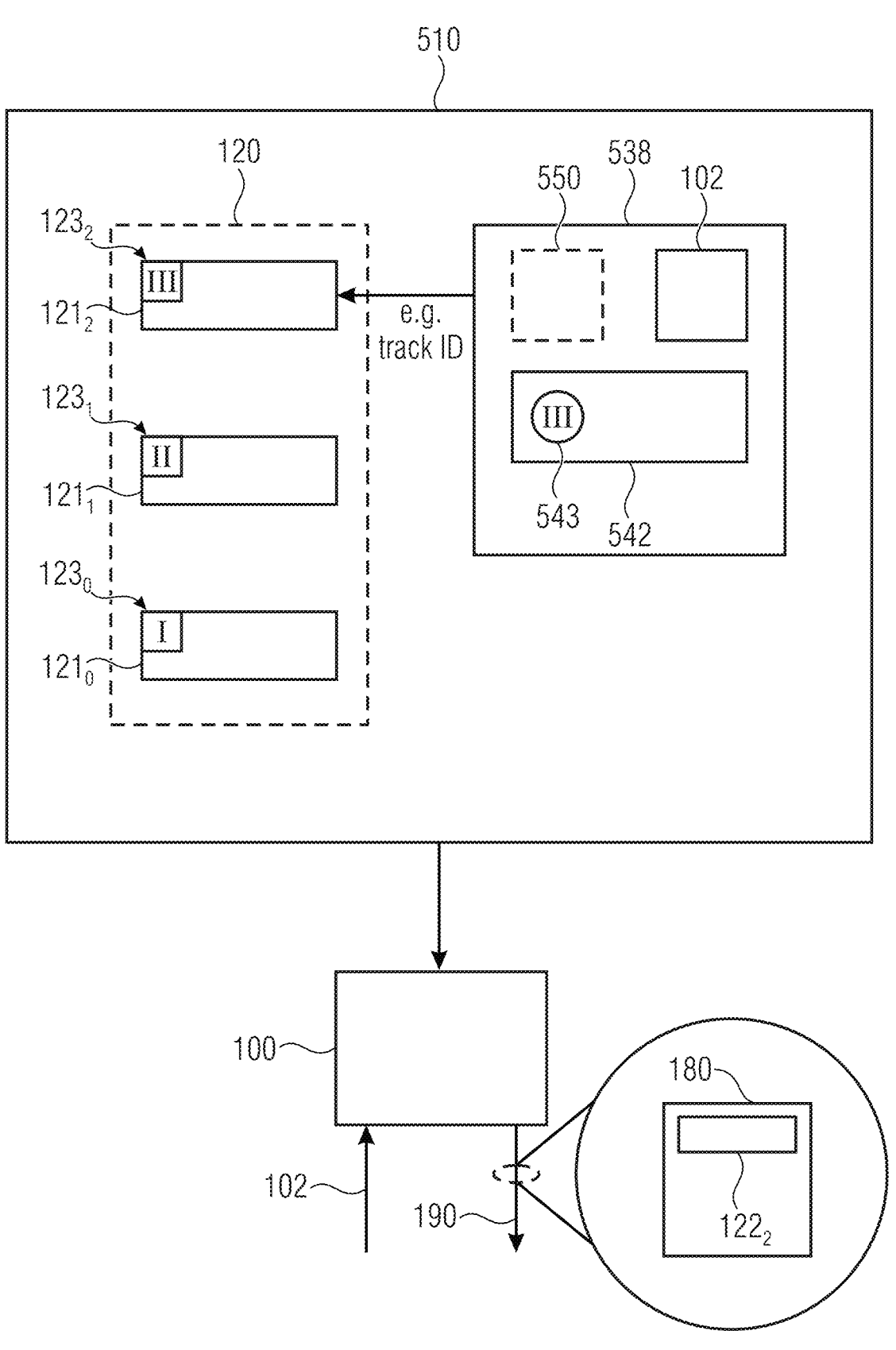
FIG. 8 illustrates an example of a file parser and a file using an entity group syntax structure.

FIG. 8 illustrates another example of the file parser 100 in conjunction with an example of a file 510 which may correspond to the file 110 of FIG. 4. File 510 comprises a plurality of tracks 121 each of which is associated with a respective track identifier 123. In FIG. 8, the plurality of tracks is represented by a set 120 of tracks $121_0$ associated with track identifier $123_0$, a track $121_1$ associated with a track identifier $123_1$ and a track $121_2$ associated with a track identifier $123_2$. Each of the tracks 121 represents a substream of a video sequence signaling by the file 510. Descriptive data of the file 510 comprises an operation point entity group syntax structure 538, e.g., an entity to group box. The operation point entity group syntax structure 538 describes the predetermined operation point 102. For example, the operation point may be identified via a group_id parameter. The operation point entity group syntax structure 538 is indicative of one or more tracks which are associated with the predetermined operation point 102. In other words, the operation point entity group syntax structure 538 may associate the predetermined operation point 102 with a set 542 of identifiers 543, each of the identifiers 543 being associated with, or pointing to, one of the tracks identifiers 123.

The operation point entity group syntax structure 538 may optionally be stored, within the file 510, on file level. That is, the operation point entity group syntax structure 538 is not necessary part of any of the tracks 123 by may be stored outside of the tracks 123, as it is illustrated in FIG. 8. Same applies to the entity group syntax structure 436 of FIG. 7, and may, in general, apply to entity group syntax structures.

Optionally, the operation point entity group syntax structure 538 comprises operation point information 550 describing the predetermined operation point 102. For example, the operation point information 550 is indicative of a profile, a tier, a level, and optionally a set of constraints of the bitstream defined for the predetermined operation point 102, as described with respect to FIG. 1. Same applies to the entity group syntax structure 436 of FIG. 7, which may optionally comprise operation point information 550 for each of the operation points of the set 240 of operation points.

File parser 100 according to FIG. 8 may parse the operation point entity group syntax structure 538 so as to derive a set 180 of tracks 121 associated with the predetermined operation point 102 as indicated by the set 542 of identifiers. File parser 100 may forward the sub-streams 122 of the sub set 180 of tracks 121 in the video bitstream 190, e.g. track $122_2$ in the illustrative example of FIG. 8.

Figure 9:
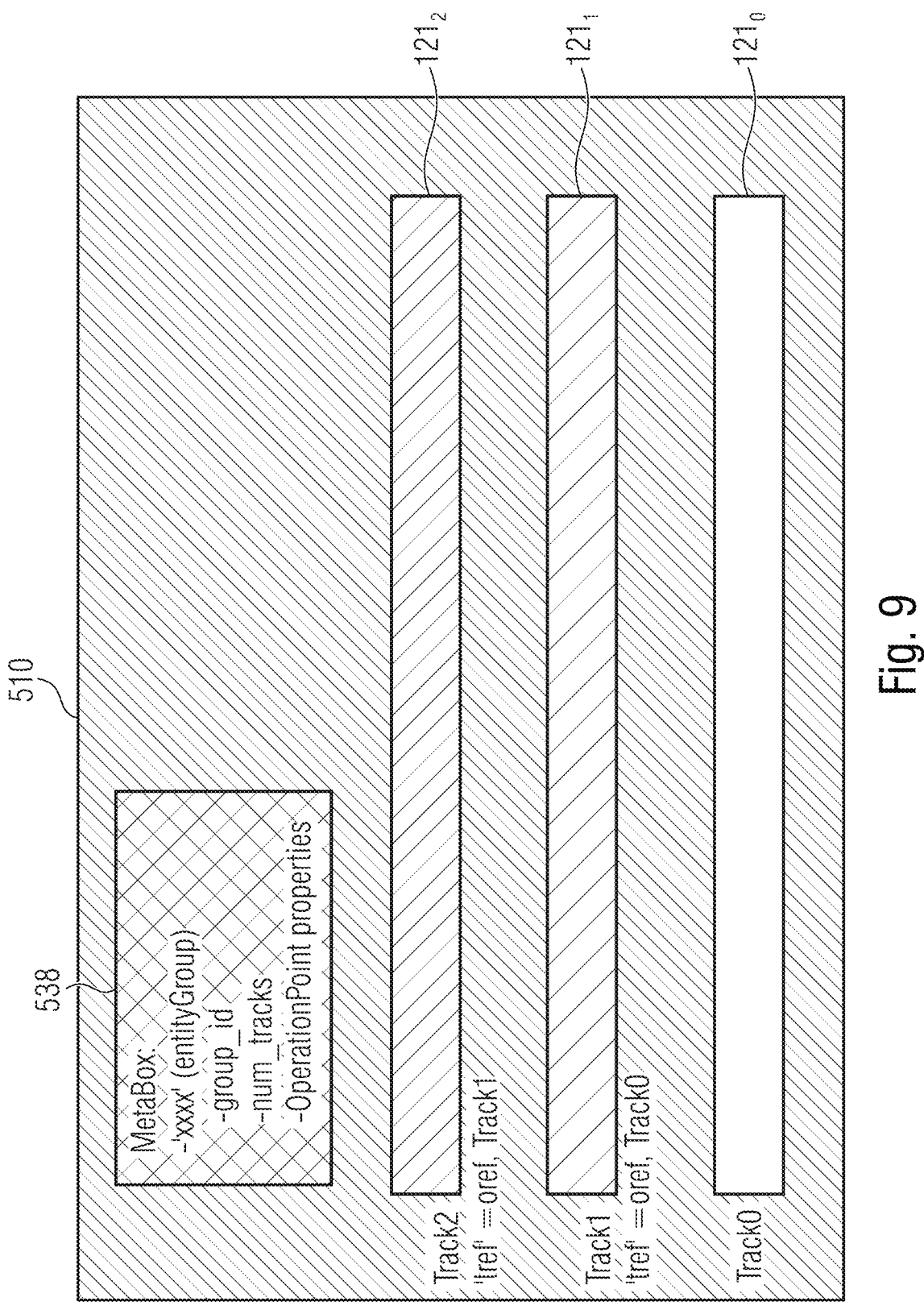
FIG. 9 illustrates an example of a file with an entity group syntax structure.
Figure 10:
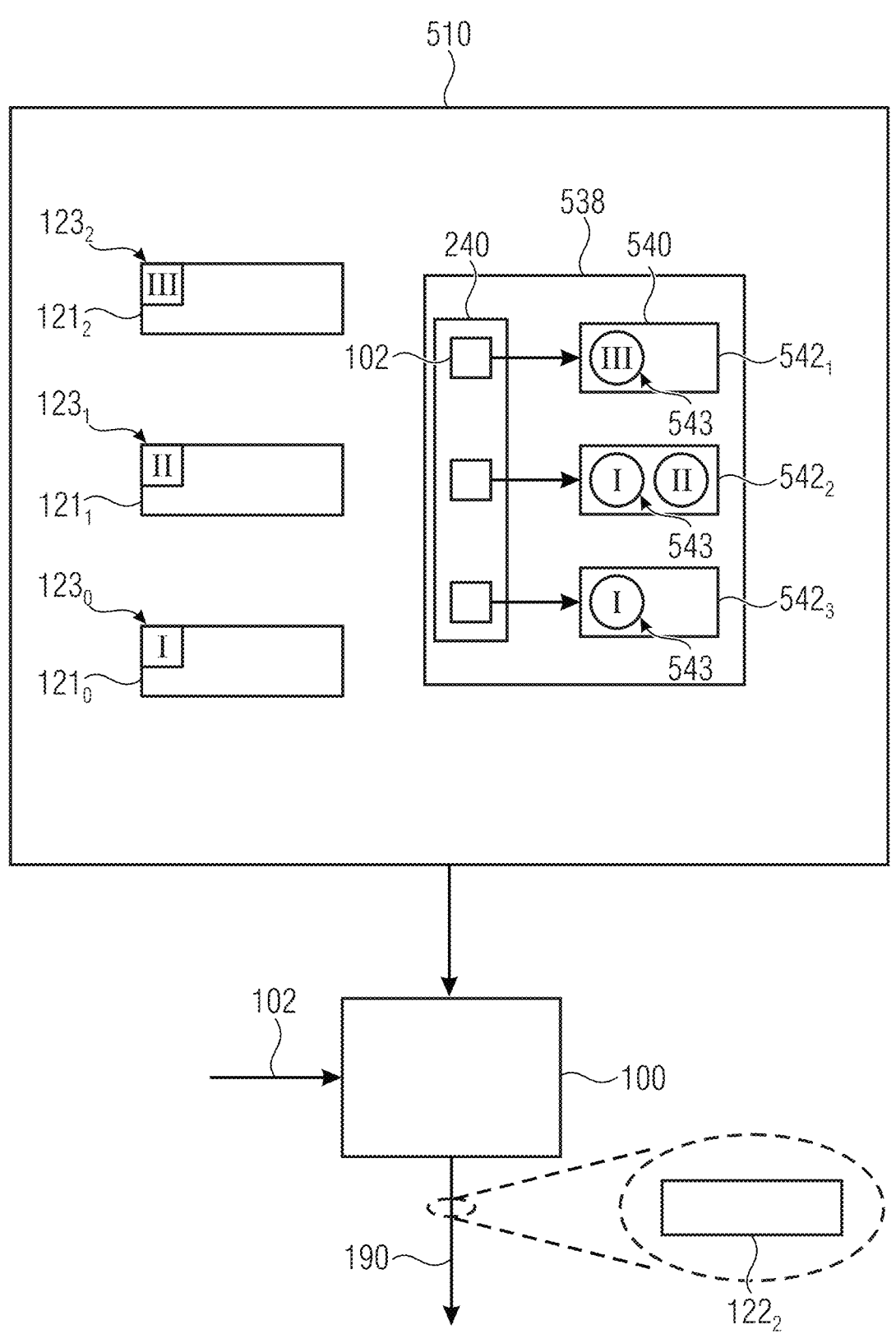
FIG. 10 illustrates an example of a file parser and a file using an entity group syntax structure.

In other words, as an alternative to the example of FIG. 5, according to the example of FIG. 7, FIG. 8 and subsequent FIGS. 9 and 10, the information describing the subset 180 of tracks to be forwarded in the video bitstream 190 may be carried in an entity group which is associated with the tracks which belong to an operation point. According to the embodiment of FIG. 7, the association between the entity group and the tracks is indicated by means of layer identifiers, whereas, according to the embodiments of FIGS. 8 to 10, the entity group may point directly to the associated tracks.

According to an example of file 510, the operation point entity group syntax structure 538 is one of a set of operation point entity group syntax structures, each of which is associated with, and describes, a respective operation point. In other words, each of a plurality of operation points may be described by an individual operation point entity group syntax structure. According to this example, each of the operation point entity group syntax structures may be identified by a respective group identifier.

According to alternative examples of the file 510, as will be described with respect to FIG. 10, the operation point entity group syntax structure 538 is descriptive of a plurality of operation points and their respective associated set of tracks.

FIG. 9 illustrates an example of file 510, according to which the operation point entity group syntax structure 538 is stored in file 510 in a box structure outside of tracks 121, e.g., in a meta box. As shown in FIG. 9, in the case of using an entity group, a box 'xxxx' (e.g. 'oief' operation point information entity group) as an entityGroup is defined and included, e.g. in the MetaBox, that defines how the operation points look like.

For example, the operation point entity group syntax structure 538 comprises operation point information 550 describing properties of the predetermined operation point 102. In examples, such as the example of FIG. 10, the operation point entity group syntax structure 538 comprises operation point information 550 for each of a plurality of operation points described by the operation point entity group syntax structure 538. In this case, the operation point entity group syntax structure 538 may comprise information on a tier, a level, a profile and/or a set of constraints associated with each of the plurality of operation points. Optionally, for example, for the embodiments described with respect to FIG. 8, but not necessarily for the embodiment described with respect to FIG. 10, the operation point entity group syntax structure 538 comprises a group identifier identifying the operation point entity group syntax structure 538.

As indicated in FIG. 9, in the case that the information associating the predetermined operation point with a set of tracks is indicated in an operation point entity group syntax structure 538, a track 121 may be associated with a track reference type, e.g., "oref" (or a new one "eref" entity group reference). The presence of the track reference type may imply the presence of an entity group for implicit reconstruction, such as the operation point entity group syntax structure 538.

For example, file parser 100 may parse the tracks, and may derive, based on the finding that the track 121 is associated with a track reference of this type, that the operation point entity group syntax structure 538 is present and accordingly parses the operation point entity group syntax structure 538.

An example for a syntax or operation point entity group syntax structure 538 if given in the following:

```
aligned(8) class EntityToGroupBox(grouping_type, version, flags)
extends FullBox(grouping_type, version, flags) {
    unsigned int(32) group_id;
    unsigned int(32) num_entities_in_group;
    for(i=0; i<num_entities_in_group; i++)
        unsigned int(32) entity_id;
// the remaining data may be specified for a particular grouping_type
}
``` with entity_id pointing to the track_ids. The new grouping_type for the defined/extended entity group could be as follows, being an example of the operation point description 550.

```
aligned(8) class OperationPointTrackGroupsBox extends
EntityToGroupBox('oieg',0,0)
{
    unsigned int(1) general_tier_flag;
    unsigned int(5) general_profile_idc;
    unsigned int(x) general_constraint_indicator_flags;
    unsigned int(8) general_level_idc;
}
```

Thus, the operation point description 550 may be included in the entity group syntax structure 538 by reference. In other examples, the operation point description 550 may be included explicitly in the entity group syntax structure 538.

The above syntax may be an example for the case where there is an entity group per operation point (e.g. identified by group_id in the figure in the entity group box), i.e. tracks are directly mapped to an operation point. For instance, one for each of e.g. OP0=Layer0, OP1=Layer0+Layer1, OP2=Layer0+Layer1+Layer2, where for each operation point the number of tracks and which are in each group are specified as well as the operation point properties, e.g. tier, profile, level as shown in 'oieg'.

In this case, the parser needs to parse the defined entity group boxes in the file, e.g. in the meta box. Among all the entity group boxes defined, one is selected that corresponds to the desired operation point. As the entity box point directly to the tracks belonging to the selected operation point, these tracks are parsed and the samples within them are send jointly to the decoder.

FIG. 10 illustrates another example of the file format parser 100, which may optionally correspond to the file format parser 100 of FIG. 4 and/or the file format parser 100 of FIG. 8. File format parser 100 according to FIG. 10 receives a file 510, which may optionally correspond to examples of the file 110 of FIG. 1 and/or file 510 as described with respect to FIG. 8. According to the example of FIG. 10, the file 510 comprises an entity group syntax structure 538, which may optionally correspond to examples of the operation point entity group syntax structure 538 as explained with respect to FIG. 8 and FIG. 9. The entity group syntax structure 538 of FIG. 10 comprises information assigning one of a set 540 of sets 542 of track identifiers 543 to each of a set 240 of operation points. The set 240 of operation points comprises the predetermined operation point 102. The file format parser 100 may derive the entity group syntax structure 538 from descriptive data within the file 510. Furthermore, the file format parser 100 may derive the subset 180 of tracks 121 for the predetermined operation point 102 from the set 542 of tracks identifiers 543 assigned to the predetermined operation point 102 by the entity group structure 538.

For example, the set 540 of sets of track identifiers may comprise one or more sets 542 of track identifiers, in FIG. 10 represented by a first set $542_1$ of identifiers, a second set 5422 of identifiers and a third set 5423 of identifiers. The track identifiers 543 may each be associated with one of track identifiers 123 of the tracks 121. For example, the identifiers 543 indicated in the entity group syntax structure 538 may be referred to as entity_id. Track identifiers 123 of the tracks 121 may be referred to as track_id. Optionally, the entity group syntax structure 538 may comprise, as described with respect to FIG. 8 and FIG. 9, for each of the operation points of the set 240 of operation points, operation point information 550 describing the respective operation point. File parser 100 may forward video sub-stream $122_2$ of track $121_2$ indicated by set $542_1$ of identifiers 543 to be associated with the predetermined operation point 102.

Further, each of the tracks 121 identified by the identifiers 543 of the entity group syntax structure 538 may optionally comprise information about one or more layers of the track. For example, file parser 100 may derive, for each of the subset 180 of tracks indicated by the set $542_1$ of identifiers associated with a predetermined operation point 102, from a box within the track, layer information which identifiers one or more layers contained in the track. In other words, each of the tracks identified by the track identifiers of the entity group box syntax structure 538 may comprise information about one or more layers of the track.

In other words, there could be a single Entity group for all operation points and a map to the track_id (entity_id), which may require further mapping of each layer/track to each operation point:

```
aligned(8) class OperationPointTrackGroupsBox extends
EntityToGroupBox('oieg',0,0)
{
    unsigned int(6) num_profile_tier_level;
    for (i=1; i<=num_profile_tier_level; i++) {
        unsigned int(1) general_tier_flag;
        unsigned int(5) general_profile_idc;
        unsigned int(x) general_constraint_indicator_flags;
        unsigned int(8) general_level_idc;
    }
    unsigned int(16) num_operating_points;
    for (i=0; i<num_operating_points) {
        unsigned int(8) ptl_idx;
        unsigned int(8) layer_count;
        for (j=0; j<layer_count; j++) {
        unsigned int(8) entity_id;
        }
    }
}
```

As already mentioned before, for this grouping that includes all operation point descriptions within the same group as shown above, there needs that the tracks contain information about the layers within them so that a mapping from track to operation point can be done. Another box describing what each track contains is required for this case within each track.

In this case, the parser needs to parse the single entity group describing all operation points and pointing to all tracks that of the whole scalable bitstream with which all operation points can be achieved. Then, the parser selects one operation point of the ones described in the entity group box described above, and identify which tracks contain the layers required for that operation point. Each track contains an additional box that described the layer information, i.e. which layers are contained there. Thus, the parser identifies the tracks that are required for the selected operation point and the samples within these tracks are extracted and sent together to the decoder.

Figure 11:
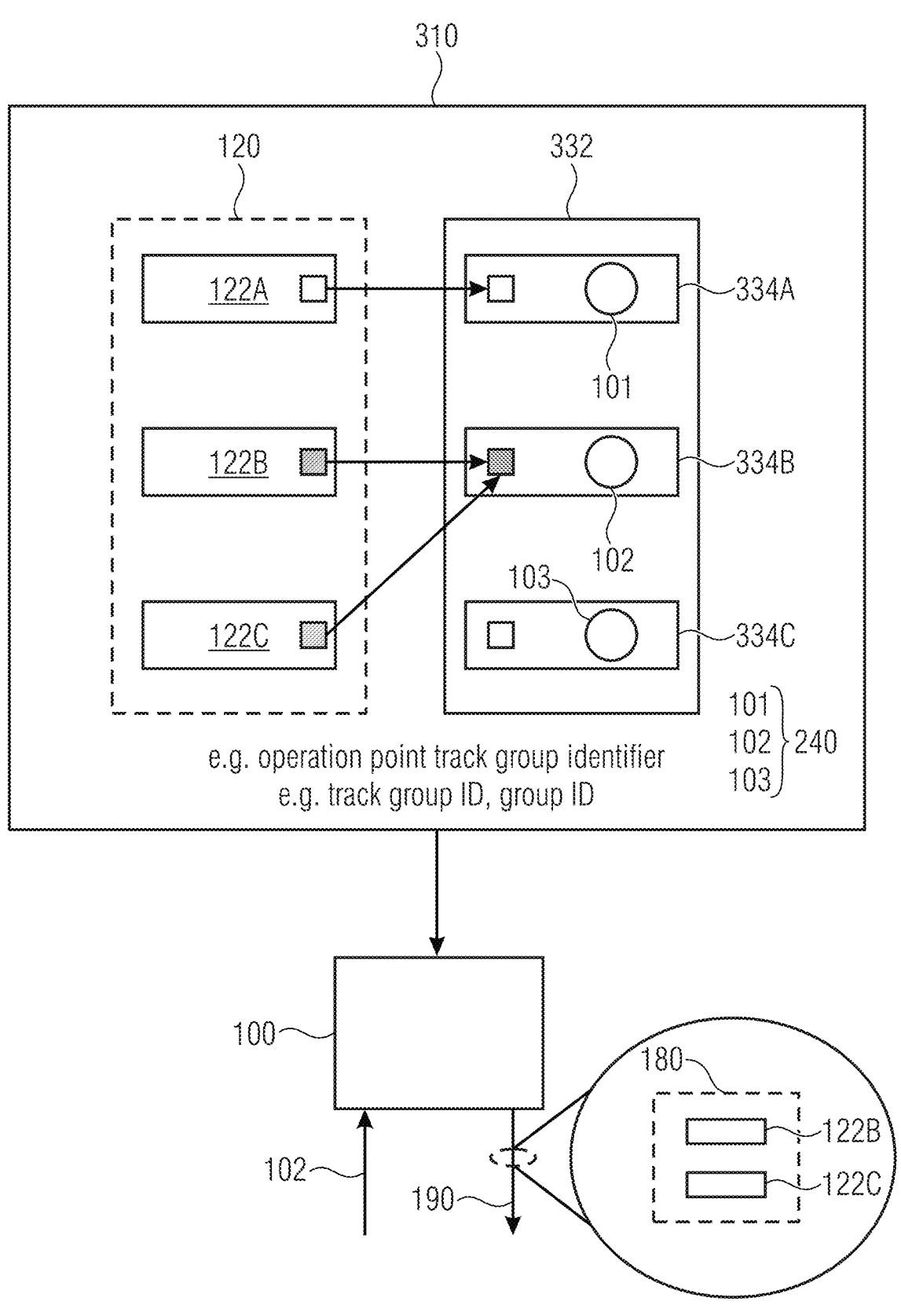
FIG. 11 illustrates an example of a file parser and a file using multiple track groups.

FIG. 11 illustrates another example of the file parser 100, which may correspond to the file parser 100 of FIG. 4. FIG. parser 100 according to FIG. 11 receives a file 310, which may optionally correspond to file 110 of FIG. 4. File 310 comprises a set 332 of operation point track groups 334, e.g., track group type box e.g., of type "oinf", each identified with an individual track_group_id. Each of the operation point track groups, which may be included in descriptive data of the file 310, may describe one of a set of operation points. File parser 100 may, for each of the tracks 121, derive from the descriptive data within the file 310, whether the respective track 121 is associated with an operation point track group 334 of the set 332 of operation point track groups which describes the predetermined operation point 302. If so, file parser 100 may selectively assign the respective track to the sub set 180 of tracks, i.e., file parser 100 may, in this case, forward the respective track in contrast to the case, in which the respective track is not associated with the operation point track group describing the predetermined operation point.

For example, each of the operation point track groups 334 may be identified with a track group identifier, e.g., group_id, and the file parser 100 may derive an association between one of the tracks and one of the operation point track groups 334 from an indication of the track group identifiers of the respective operation point track group 334 by the respective track 121.

In examples, each of the operation point track groups 334 comprises information about a tier, a level, a profile and/or a set of constraints for the operation point described by the respective operation point track group.

In other words, this is another option where several track groups, each corresponding to each operation point and tracks belonging to the operation point indicate that they pertain to the track group. This is similar to the first entity group case shown above. The difference to that case is that the information comes along with each track in a box instead of in a separate box that describes all tracks.

```
aligned(8) class TrackGroupTypeBox(unsigned int(32)
track_group_type) extends FullBox(track_group_type,
version = 0, flags = 0)
{
    unsigned int(32) track_group_id;
    if track_group_type == 'oinf' {
    unsigned int(1) general_tier_flag;
    unsigned int(5) general_profile_idc;
    unsigned int(x) general_constraint_indicator_flags;
    unsigned int(8) general_level_idc;
}
```

In this case, the parser needs to parse all track group boxes within a track. Among all possible operation points, one is selected. As in this case track groups and operation points have a one-to-one direct mapping the tracks belonging to the selected track group are parsed and sent jointly to the decoder.

In this case, some additional metadata is required to allow the user to pick among the different operation points. E.g. spatial resolution, ROI information, etc.

The grouping mechanisms discussed in section 1 may be built upon the assumption that there is no need of removing any NAL unit as no unnecessary (e.g., additional layer_id) is present in the extracted bitstream. In other words, once identified the tracks containing the layer_ids for an operation point, all NAL units of the selected tracks for implicit reconstruction are kept and used to output a bitstream to be decoded. That is, as mentioned above, file parser 100 may forward the entire tracks 121 which are associated with the predetermined operation point 102 in the video bitstream 190.

It is noted, that the embodiments of section 1 are also beneficially applicable for scenarios, in which the base layer is distributed over multiple tracks. A base layer may refer to a layer of the coded video sequence which fulfills the conditions for all operation points. In the case of multiple tracks also for the base layer case, the solution in section 1 may apply as there are tracks that are excluded or fully contained within an operation point. I.e., no "subtrack operations" is required.

2. File Parser, File Generator and File According to FIGS. 12 to 23, and Client and Manifest File According to FIG. 24

In the previous section some of the embodiments may focus on typical scenarios where tracks are either fully needed for an operation point or not.

However, there might be cases where this does not apply. A valid use-case for that is based on the fact that number of pictures per second required to be decoded are tightly related to the level of a bitstream. For instance, a 1920×1080@32 fps bitstream with a single layer corresponds to a level 4 but if there are two layers a 1920×1080@16 fps bitstream has a level 4 and 1920×1080@32 fps bitstream has a level 4.1.

By only using inter-layer prediction for some pictures in the bitstream, it is possible to have higher framerates with multi-layer bitstreams without requiring a much higher level.

For instance, one possibility would be to have only inter-layer dependency at every second frame in the bitstream as shown in the following FIG. 12

Figure 12:
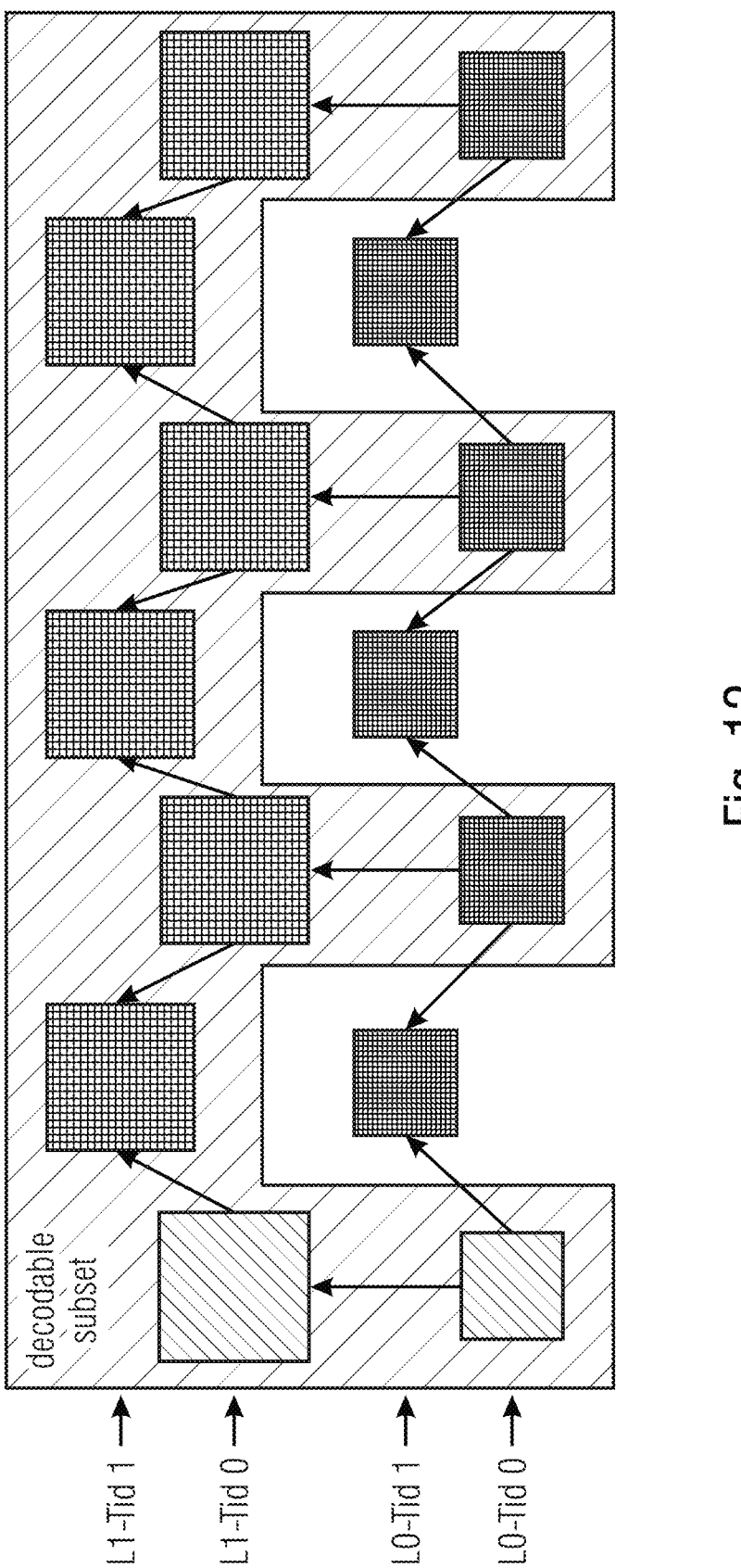
FIG. 12 illustrates an example of a multi-layered video stream.

FIG. 12 illustrates an example for a layer (L0) that is not completely required for decoding its dependent layers (L1). In FIG. 12, L0 and L1 may identify two layers of the video stream. E.g., layer L1 may be an enhancement layer of layer L0, i.e. coded pictures of layer L1 may signal the coded pictures of layer L0 at a higher resolution, Further, according to the example of FIG. 4, both layers L0 and L1 each have temporal sublayers, indicated using respective temporal sublayer identifiers Tid0 and Tid1. For example, pictures of layer L0 and Tid0 may be required for decoding temporally collocated pictures of layer L1, e.g. for inter-layer prediction. I.e. pictures of layer L1 may depend on their respective collocated pictures of layer L0. In contrast, pictures of layer L1 with Tid1 may be decoded independently of their temporally collocated pictures of layer L0 with Tid1.

There are several options that could be used to encapsulate the bitstream described above into the file format, for example:

1) Single track: all NAL units within the same track where samples can be assigned to a certain level using:
   a. Sample grouping: marking of samples belonging to an operation point or not
   b. Sub-tracks: box descriptive syntax elements of the video to map values of that syntax to an operation point.
2) Multiple tracks: one track per layer 3) Multiple tracks (which is covered by the solution in section 1):
    a. 1 Track for Layer 0 Tid 0
    b. 1 track for Layer 0 Tid 1
    c. 1 Track for Layer 1

Figure 13:
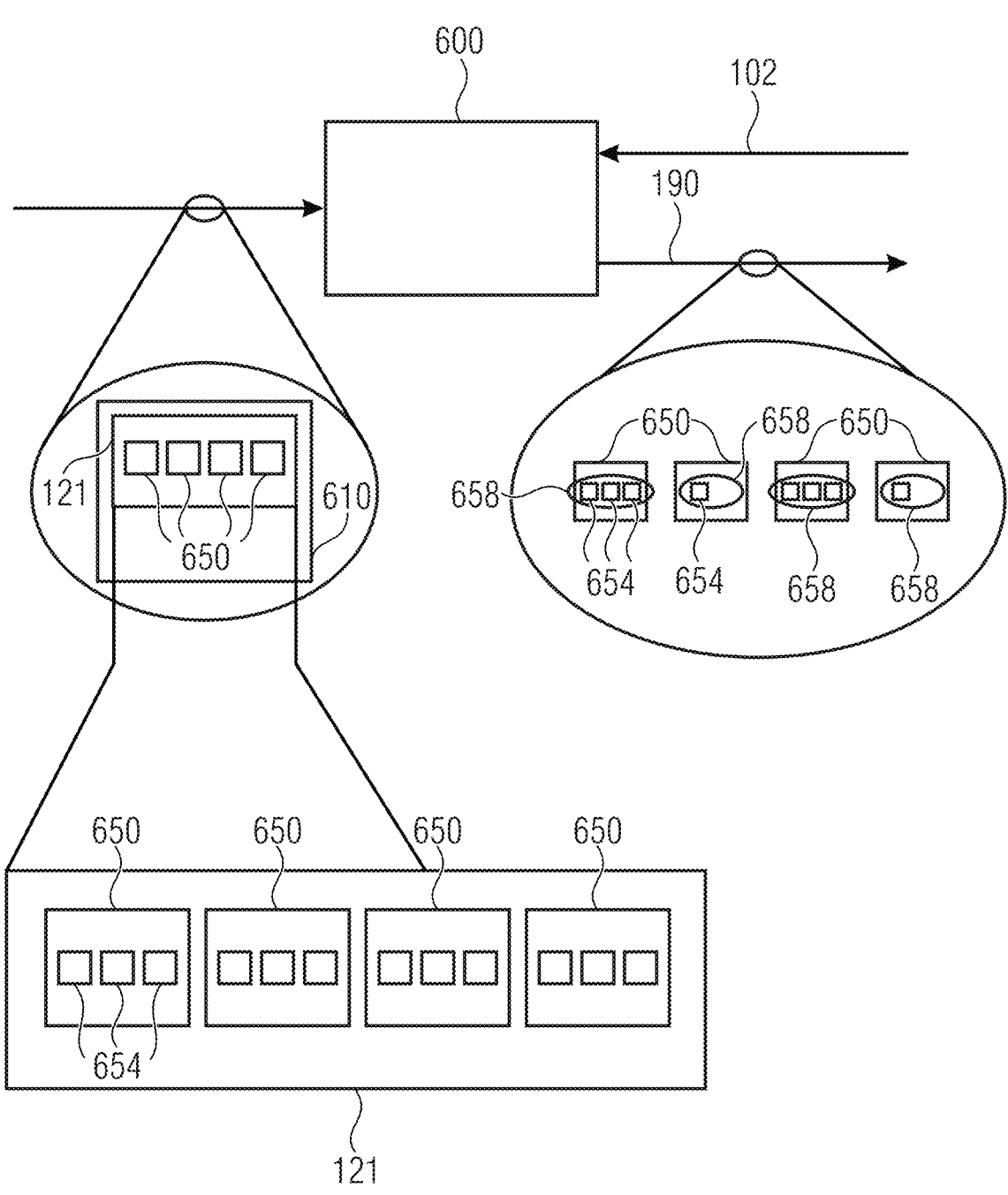
FIG. 13 illustrates another example of a file parser and a file.

FIG. 13 illustrates a file parser 600 according to an example. File parser 600 may optionally correspond to file parser 10 of FIG. 1. File parser 600 is configured to receive a file 610, which may optionally correspond to file 110 of FIG. 1. The file 610 comprises a track 121, the track 121 comprising a sequence of samples 650 of the video sequence. Each of the samples 650 comprises a plurality of bitstream portions 654, e.g., VCL NAL units, of the file 610. In other words, each of the samples 650 may comprise a plurality of the samples 130 of FIG. 1, i.e. each of the bitstream portion 654 may correspond to one or more samples 130. File parser 600 and file 610 may be in accordance with the second aspect.

File parser 600 derives from descriptive data within the file 610 a portion 658 (e.g. a selection) of the bitstream portions 654 of each of the samples 650, required by a predetermined operation point 102. File parser 600 may forward portions 658 of the bitstream portions of each of the samples 650 of the track 121 in the video bitstream 190. I.e., each of the portions 658 may comprise one or more samples 130. In other words, file parser 600 may derive from descriptive data of the file 610, a portion (or a sub-set, a selection) of the bitstream portions 654 are required by the predetermined operation point 102.

For example, in some scenarios, the whole bitstream is transmitted to the end-device irrespective of which is the operation point that that devices are interested in. It does not typically suit for point to point streaming scenarios in which typically a client downloads the appropriate decodable sub-set only, but might be useful for other scenarios such as multicast. Therefore, one option for such a use-case is to send the whole bitstream to the end-device using a single track but allow for partial processing of such a track.

The first option comes along with the problem that parsing the track requires identification of NAL units to some kind of "operation point" and needs to extract only a subset of the NAL units, depending on the decoder capabilities, as forwarding more NAL units to the decoder would violate the decoder capabilities.

There are already, File Format tools which that allow having different sub-bitstream access within a track, which is described herein as the state-of-the art:

FF already defines a LevelAssignmentBox ('leva') which describes levels (kind of sub-bitstreams). This box has a flag 'assignment_type' which defines the type of assignment to each of the levels. For cases where these different levels are within a single track the 'assignment_type' considered are the following values:
        assignment_type=0 (or 1) specifies that Sample grouping is used
        assignment_type=4: Sub-tracks with the SubTrackBox
    Sample grouping mechanism which allow to assign a partition of samples from a track to a specific group.

The sample group mechanism is not very flexible as it operates on a per-sample basis. That is, it cannot remove parts of a sample (i.e. sub-samples) as ideally desired by the illustrated example and FIG. 12 above.

Figure 14:
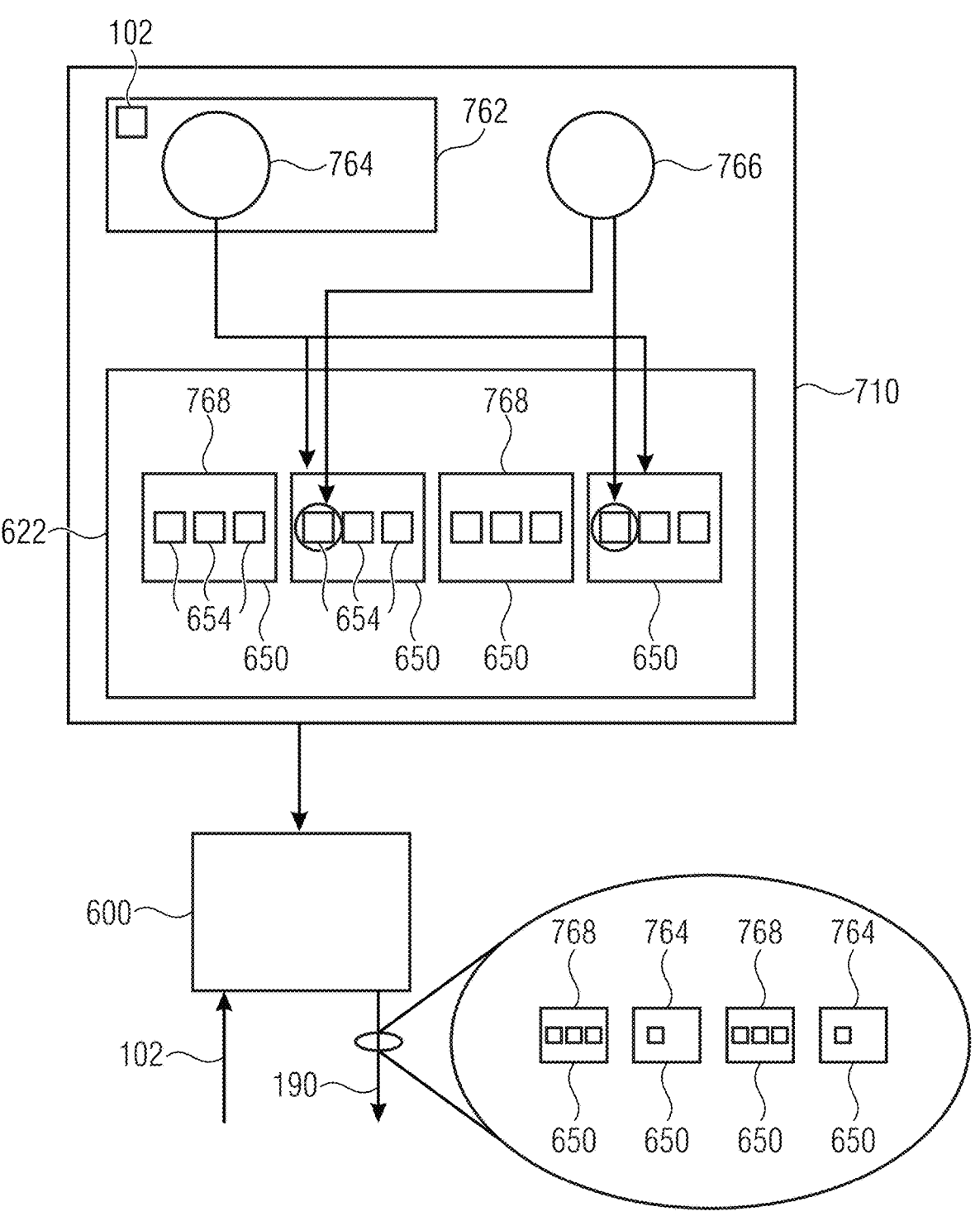
FIG. 14 illustrates another example of a file parser and a file using a sample group information.

FIG. 14 illustrates another example of the file parser 600 in conjunction with a file 710 which may optionally correspond to the file 610 of FIG. 13 or file 110 of FIG. 1. According to the example of FIG. 14, the descriptive data within the file 710 comprises an information 762 about a sample group, which indicates a set 764 of the samples 650 of the track 121. According to the example of FIG. 14, file parser 600 derives the sample group 762 from the file 710 and detects, which portion 766 (i.e. a subset) of the bitstream portions 654 (e.g. samples 130) of each of the samples 650 indicated by the sample group is required by the predetermined operation point 102. File parser 600 may forward the portion 766 of the bitstream portion 654 of each of the samples 764 of the sample group and each bitstream portion 654 of each of the samples 768 not indicated by the sample group and the video bitstream. In contrast, file parser 600 may omit a forwarding of bitstream portions 654 of samples 650 indicated by the sample group 764 which bitstream portions 654 are, according to the descriptive data, not required by the predetermined operation point 102. In some examples, the required bitstream portions may be indicated by the descriptive data, while in other examples, bitstream portions which are not required may be indicated.

In other words, e.g. according to the example of FIG. 14, sample groups can be used to identify which samples require sub-sample removal and which not. For this purpose, the sample groups need to be parameterized and include additional information that specifies how to handle some samples belonging to samples groups that need to be partially extracted.

```
class PartiallyDisposableGroupEntry( ) extends
VisualSampleGroupEntry ('pdis') {
    unsigned int(8) groupID;
}
```

This sample grouping would determine that parts of the samples need to be removed/ignored when playing the group. E.g. the base layer part of the sample as shown in FIG. 12 to conform to a profile/operation point.

The sample grouping mechanism described above would allow a parser to identify the samples at which parts thereof need to be dropped. However, still it may be unclear for a parser which parts need to be kept and which dropped.

Figure 15:
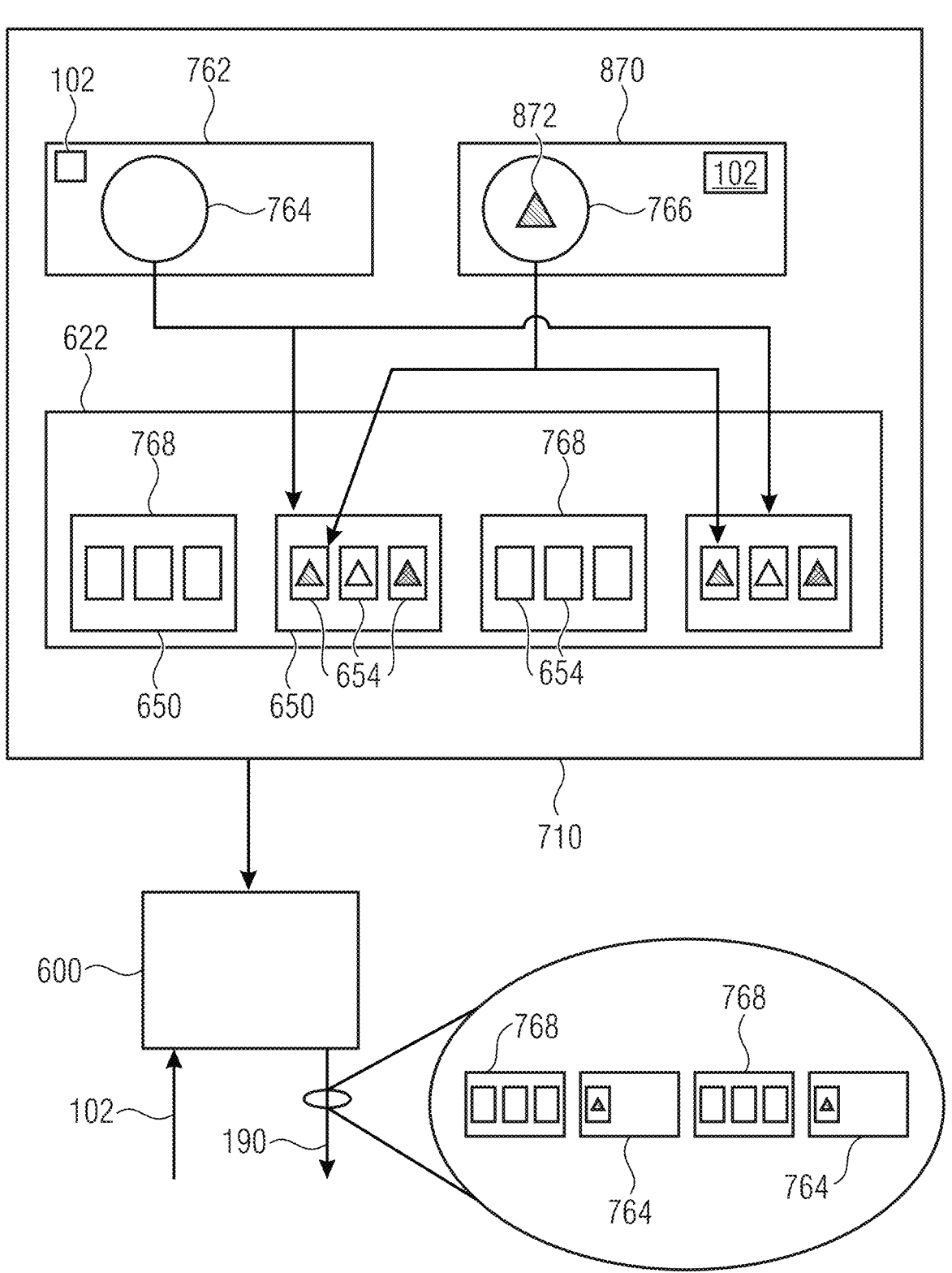
FIG. 15 illustrates an example of a file parser and a file using a subtrack syntax structure.

FIG. 15 illustrates another example of the file parser 600, the description of which is based on the description of the file parser 600 of FIG. 13, and the description of the file parser 600 of FIG. 14. According to the example of FIG. 15, the file 710 comprises a subtrack syntax structure 870, e.g., "strk". The subtract syntax structure 870 indicates a predetermined type of bitstream portion syntax element 872, for example, a layer identifier, layer_id, or temporal sublayer identifier, also referred to as temporal_id, tid, or Tid. The subtract syntax structure 870 further indicates, for the predetermined type of bitstream portion syntax element 872, a related predetermined value to be used as a criterion for indicating, whether a bitstream portion of a sample 764 of the sample group 762 is required by the predetermined operation point 102. File parser 600 may derive the subtract syntax structure 870 from descriptive data within the file 710. File parser 600 may, for each bitstream portion 654 of each of the samples 650 of the sample group 762, derive from the descriptive data the value of the predetermined type of bitstream portion syntax element of the respective bitstream portion 654. The file parser 600 may selectively handle the respective bitstream portion 654 as being required by the predetermined operation point 102, if the value of the predetermined type of bit stream portion syntax element corresponds to the predetermined value.

In other words, file parser 600 may determine a portion of samples 130 of the track 121 by means of a layer identifier or a temporal sublayer identifier.

In other words, the information of which NAL units to keep and which to drop could be conveyed by using sub-tracks.

Subtracks are defined with 'strk' boxes. The structure of the file could look as follows:

SubTrackBoxes ('strk') one per sub-track used together with sample grouping

It contains a subtrack information box 'stri'

Contains for instance the subtrack id

With a mandatory Subtrack definition box ('strd') which holds a subtrack sample group box 'stsg':

Which defines the relation of specified subtrack to a sample group

Sub-tracks are to some extent a description of groups of NAL units that lead to a conformant sub-bitstream. A mapping is required to identify which NAL units belong to a sub-track. Typically, this is done by syntax elements of the video itself. For instance, for SVC, a SVC sub track layer box 'sstl' is defined that conveys the information within the Subtrack definition box 'strd' box of which syntax elements have what value—e.g, dependency_id, quality_id, etc. In the case that we are considering the information for an extension of such a box would contain the layer_id and temporalID.

This means that a parser that identifies first with the previously described sample grouping a sample (partially disposable sample) that needs to be partially removed, or some NAL units thereof needs to be dropped and not sent to the decoder, would parse the information in the subtracks and depending on the information in subtrack definition box would parse syntax values of the NAL units (e.g. layer_id and temporalID) and depending on their value keep it or drop it before sending to the decoder.

Subtracks require that the parser understands some syntax structure of the media contained below. They are compact but come along with an additional complexity for the parser. Alternatively, subsample information boxes can contain similar information in a more verbose fashion. Instead of describing the assignment of syntax values to a subtract, subsample information boxes are tables that for each sample they index byte ranges and identify parst smaller than a sample.

Figure 16:
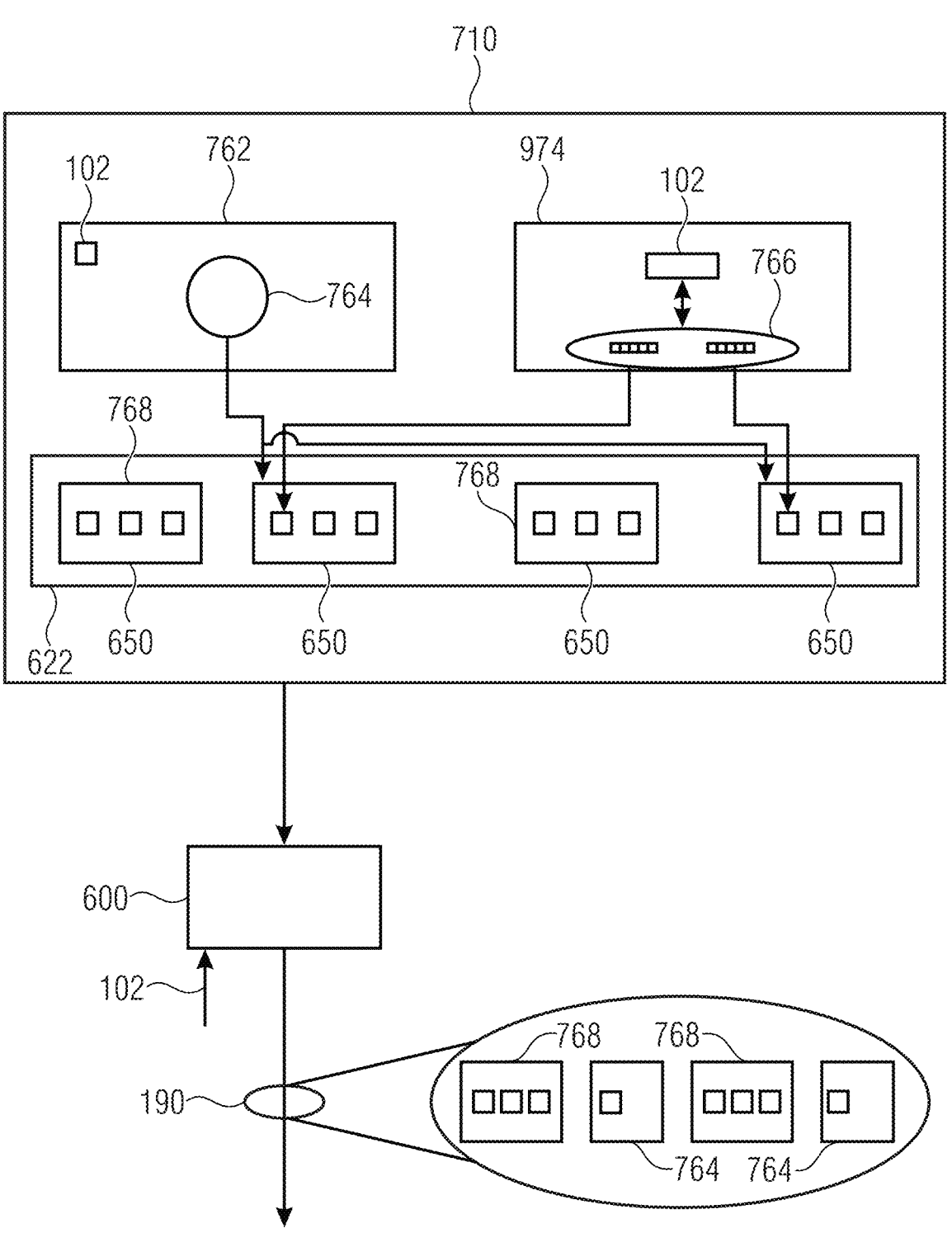
FIG. 16 illustrates an example of a file parser and a file using a subsample syntax structure.

FIG. 16 illustrates another example of the file parser 600. The file parser 600 of FIG. 16 may be an implementation of the file parser 600 of FIG. 14, for example, as an alternative to the implementation of FIG. 15. According to the example of FIG. 16, file 710 comprises a subsample syntax structure 974, e.g., "subs". The subsample syntax structure 974 is indicative of a mapping rule between the predetermined operation point 102 and respective bit ranges within portions of the track for the samples required by the predetermined operation point 102. In other words, the mapping rule may associate each of the samples of the sample group 752 with a bite range within a portion of the track comprising the respective sample indicated by the sample group 762. File parser 600 may derive the subsample syntax structure 974 from file 710 and may, for each of the samples of the sample group, for each of the bitstream portions of the respective sample, selectively handle the respective bitstream portion as being required by the predetermined operation point, if the respective bitstream portion is part of the bite range of the respective sample indicated by the mapping group.

In other words, a subsample information box can be used to convey this information and map sub-track with subSampleInformationBox. The benefit of such a solution is that the mapping is not based on some particular syntax value in the bitstream, but that the mapping is simply explicitly signaled and needs not deeper parsing of the video bitstream on the player side.

In this case, the parser would first identify the samples that are partially disposable using the sample grouping described above. Then the parser parses the subsample information boxes and identify the parts of the sample (based on the byte ranges) that belong to a given operation point. Then, the parser would only send to the decoder the relevant parts of those "partially disposable" samples.

The codec_specific_parameters field of the SubSampleInformationBox in this case is as follows:

```
if (flags == xx) {
    unsigned int(32) operating_point;
}
```

As indicated in FIG. 1, file 110, or file 610, 710, respectively, may optionally be provided to file parser 10 by a client device 9. Client device 9 may download file 110 from a server. For example, the client device 9 may be an application such as a DASH client. The client device 9 may receive from the server, a manifest file, such as an MPD, the manifest file comprising a plurality of descriptions for respective media representations, which are downloadable from the server.

As indicated before, streaming of parts of a track could be desirable. Typically in streaming scenarios, e.g. DASH one track is mapped to one representation, which for instance has a given URL assigned.

Naturally, a DASH client would rather to not download irrelevant data, i.e. in the example above not download L0-Tid, when downloading layer 1.

This is done by mapping the operation point of interest to byte ranges of a resource (track) using a box ('ssix') that contains byte ranges for the levels defined in the 'leva' box. The 'leva' box specifies levels that typically are built incrementally. That is, all the byte ranges of levels below the target level are included in the HTTP requests, e.g when using DASH and subrepresentations. For a DASH client to be aware that some levels are not to be included in this fashion, i.e. incrementally, some signaling is required. In one embodiment, the indication of levels not to be included in higher target levels is exposed in a file format box and also in a Media Presentation Description so that some unnecessary byte ranges need not to be included in the clients HTTP requests.

The previously described embodiments of section 2 may be particularly beneficial for cases, in which all layers are grouped within one track of the file. In the following, embodiments will be described, in which layers, which are associated with samples 130 (or bitstream portions 654) required for the predetermined operation point 102 may be distributed over two or more tracks 121.

Figure 17:
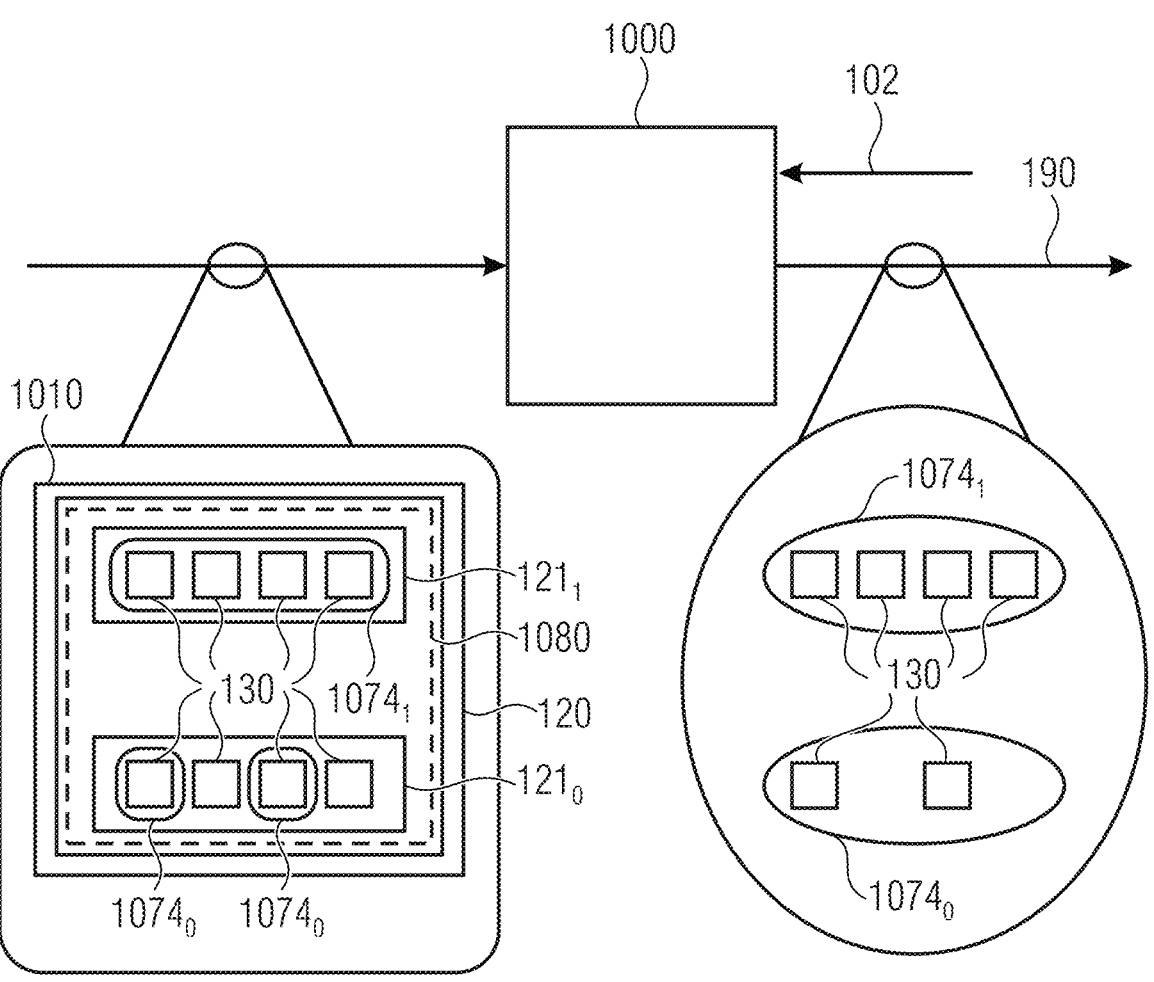
FIG. 17 illustrates an example of a file parser and a file having multiple tracks.

FIG. 17 illustrates an example of a file parser 1000, which may optionally correspond to file parser 100 of FIG. 1. File parser 1000 is configured for receiving a file 1010 which may optionally correspond to file 110 of FIG. 1. The file 1010 comprises a set 120 of tracks 121 signaling a coded video sequence. Each of the tracks 121 represents a sub-stream comprising a sequence of samples 130 of the video sequence. For example, as described with respect to FIG. 1, each of the samples 130 represents one or a plurality of bitstream portions such as VCL NAL units of the file 1010. File parser 1000 is configured for deriving, from descriptive data within the file 1010, a subset 1080 of tracks 121 of the set 120 of tracks 121. The subset 1080 of tracks is not necessarily a proper subset, that is, the subset may comprise one or more or all of the tracks 121 of the file 1010. Tracks of the subset 1080 of tracks comprise samples which are required by a predetermined operation point 102. File parser 1000 may derive, from the descriptive data, a portion of the samples 130 of each of the subset 1080 of tracks 121 required by the predetermined operation point 102. In the illustrative example of FIG. 17, the set 120 of tracks is represented by a first track $121_0$ and a second track $121_1$, which are both part of the subset 1080 of tracks which comprise samples for the predetermined operation point 102. File parser 1000 may determine, based on the descriptive data within the file, for the first track $121_0$ a portion $1074_0$ of samples 130 required for the predetermined operation point 102 and may determine, for the second track $121_1$, a portion $1074_1$ of samples 130 required by the predetermined operation point. File parser 1000 may selectively forward the respective portions 1074 of samples 130 of the tracks 121 of the subset 1080 of tracks in the video bitstream 190. That is, file parser 1000 may include samples 130 of the portions 1074 (i.e., portions $1074_0$, $1074_1$) required by the predetermined operation point in the video bitstream 190 and may ignore samples of the file 1010, which are not part of the portions 1074 in constructing bitstream 190.

For example, one of the tracks of file 1010, e.g., the first track $121_0$, may be a base layer track which may be decoded independently from further tracks of file 1010. The base layer track may comply with the predetermined operation point when extracted individually. According to this example, the second track $121_1$ may comprise an enhancement layer.

In other words, some embodiments, e.g. the embodiment according to FIG. 17, but not limited to the embodiment of FIG. 17, allow to provide a base layer track that does not require any "special" handling as the profile tier level matches all NAL units within the track.

However, when parsing the enhancement layer only some, or not all, base layer NAL units are required. If extractors were used, the extractors point only to the required NAL units. However, as they come with a data-rate and processing overhead it might be more desirable to not use extractors. In that case it is required to allow identification of the required NAL units.

For example, the identification may be achieved through a mechanism based on sample grouping. In other words, the descriptive data from which file parser 1010 derives the subset 1080 of tracks 121 and the respective portions 1074 of samples for the tracks 121 of the subset 1080 may be indicated in file 1000 by using a sample group.

Figure 18:
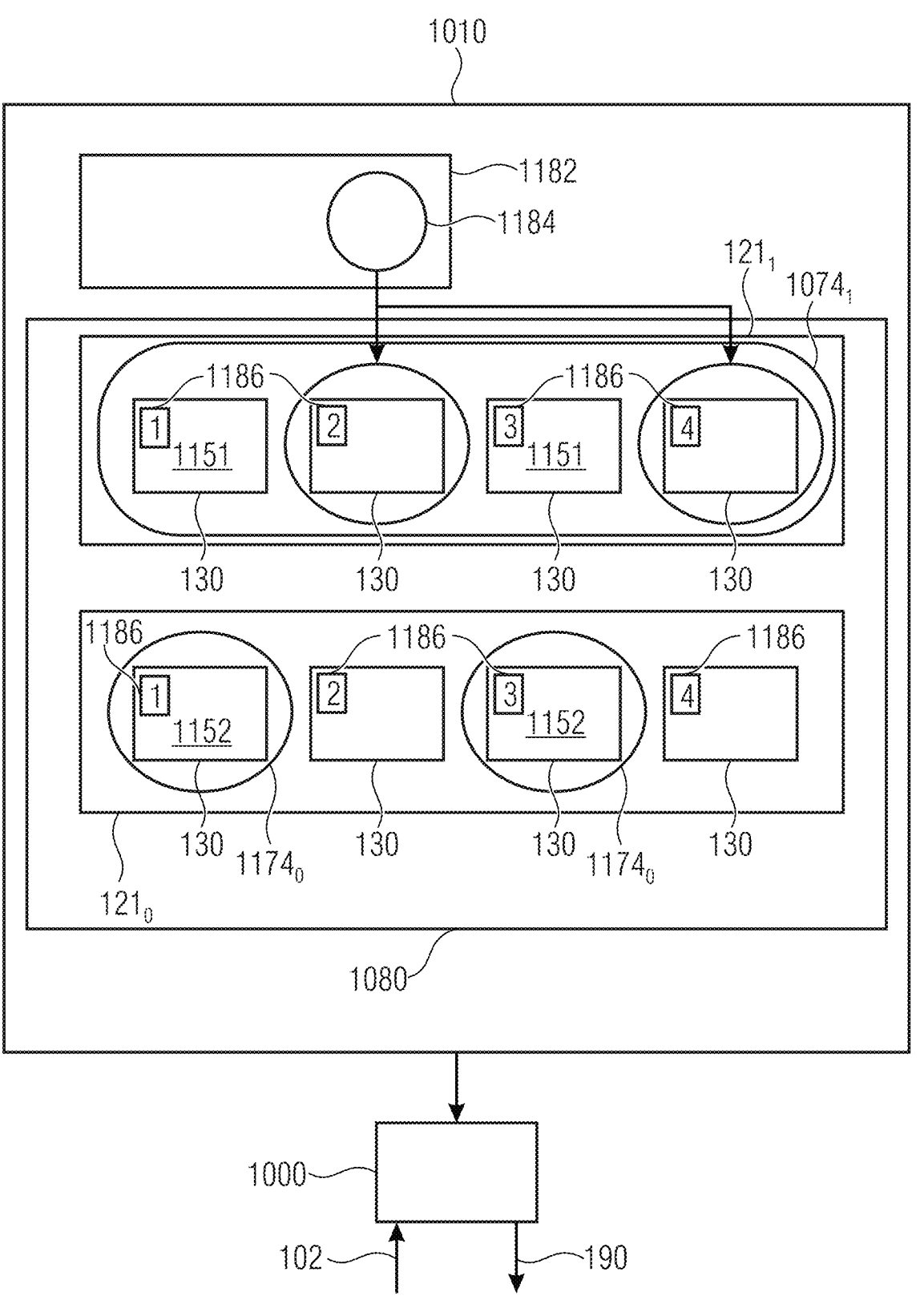
FIG. 18 illustrates an example of a file parser and a file having multiple tracks and using a sample group information.

FIG. 18 illustrates an example of the file parser 1000 and in the file 1010 of FIG. 17, according to which the file 1010 is indicative of a sample group 1182 for a track of the tracks 121 of the file 1010. For example, the sample group 1182 may be indicated for a track comprising an enhancement layer. In FIG. 18, sample group 1182 is for illustrative purpose exemplarily associated with the second track $121_1$. For example, file parser 1000 may derive, based on the predetermined operation point 102, a track comprising a sub-stream to be played as indicated by the predetermined operation point. A track comprising a sub-stream indicated by the predetermined operation point may be referred to as indicated track. File parser 1000 detects whether the file 1010 comprises a sample group 1182 associated with the indicated track. The sample group 1182 may indicate a set 1184 of samples of the indicated track, e.g., track $121_1$, as being independent from further tracks. File parser 1000 may forward the samples 130 of the indicated track $121_1$ in the video bitstream 190. Further, file parser 1000 may detect, for each sample 1151 of the indicated track $121_1$, which is not part of the set 1184 indicated by the sample group 1182 to be independent from further tracks, samples 1152 of further tracks, such as track $121_0$ of the subset 180 of tracks 121, which samples 1152 have equal time stamps 1186 as the samples 1151 of the indicated track $121_1$. File parser 1000 may forward samples of the further tracks of the subset of tracks, i.e., tracks other than the indicated track $121_1$, in the video bitstream 190 if the samples of the further track have a temporally aligned or temporally collocated, sample in the indicated track $121_1$ which is not indicated to be independent from further tracks. For example, the indicated track $121_1$ may depend on one or more further layers, samples of which may be required for decoding a layer signaled in the indicated track $121_1$. For samples of the indicated track $121_1$, which samples are not indicated as being independent from further tracks, file parser 1000 may detect samples of the further layers on which the layer of the indicated track $121_1$ depends, and which are temporally aligned with the samples not indicated to be independent, and forward detected samples of the further layer.

In other words, a sample grouping mechanism would indicate whether NAL units are entailed for a given operation point or not. For instance, based on the solution mentioned in section 1 where track grouping is used to indicate that some tracks belong to an operation point. An additional sample grouping within the track would mark some samples as not belonging or belonging to a particular operation point. In such a case, it is part of the invention to indicate within the track grouping that additional sample handling is required to determine sample by sample whether a sample belongs to a certain operation point.

```
class IndepSampleInOperationPoint extends
VisualSampleGroupEntry ('indo')) {
    unsigned int(32) operating_points[ ];
}
```

Sample marked as belonging to this sample group would not need the sample of reference tracks belonging to the same operation point group. So the sample to group tables mapping each samples to a given group would indicate when used for a sample that that sample is independent and does not need samples of the dependent tracks for a given operation point. So the parser would not look for samples in a dependent track when it finds this indication.

Figure 19:
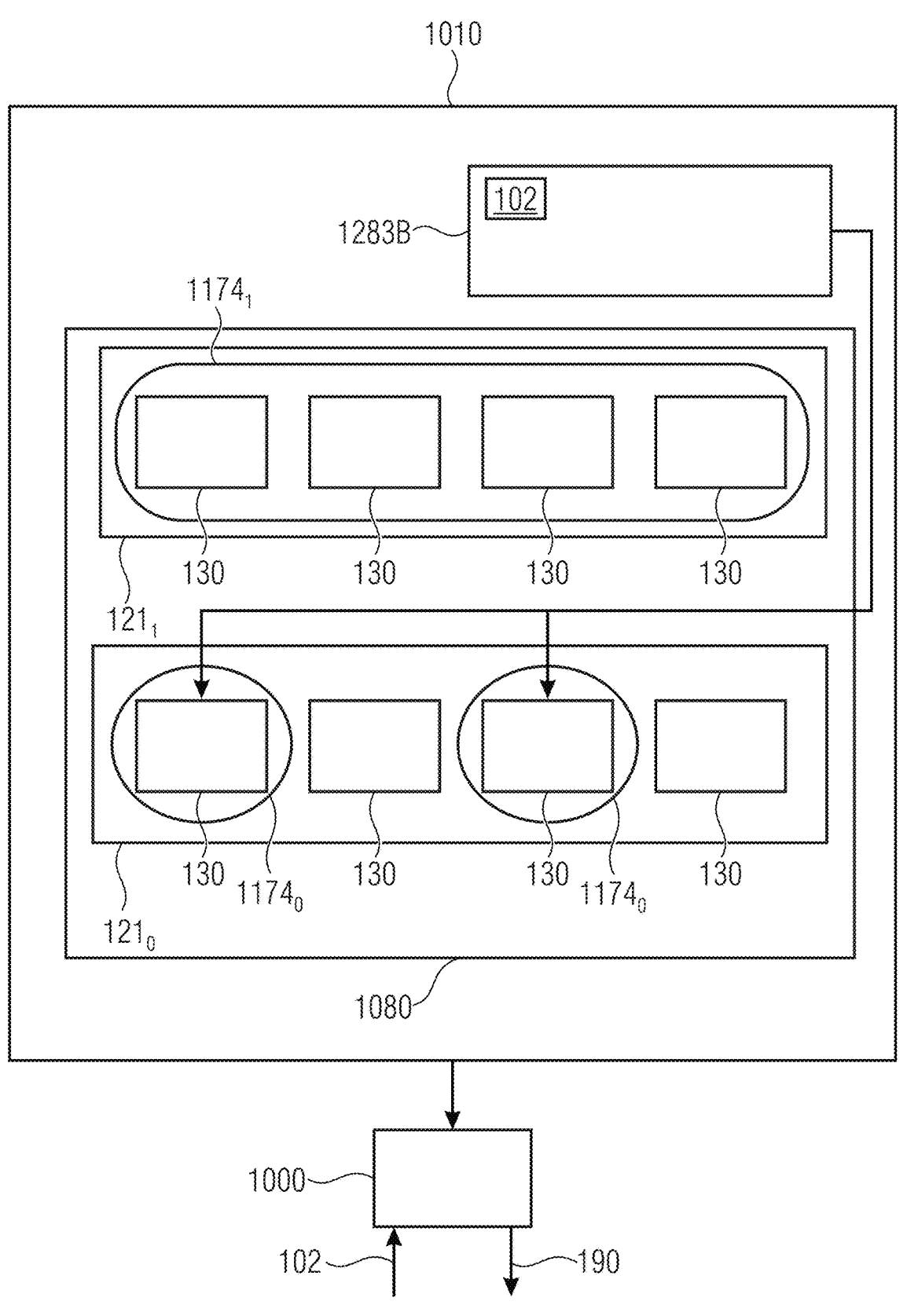
FIG. 19 illustrates an example of a file parser and a file having multiple tracks and using an operation point sample group information.

FIG. 19 illustrates another example of the file parser 1000 and the file 1010 of FIG. 17, according to which file 1010 may comprise an operation point sample group 1183 associated with a track of the subset 180 of tracks, for example, with track $121_0$. In examples, file 1010 may comprise an operation point sample group for each of the tracks of the subset 1080 of tracks. Accordingly, file parser 1000 may detect, for each track associated with a predetermined operation point 102, that is, for each of the tracks of the subset 1080 of tracks, whether the descriptive data of file 1010 comprises an operation point sample group 1183 for the respective track, the operation point sample group 1183 being associated with a predetermined operation point 102.

The operation point sample group 1183 indicates the samples of the track to which the operation point sample group 1183 is associated, which samples are required by the predetermined operation point.

In other words, another option would be that samples themselves would indicate to which operation points they belong or don't belong. This would require all tracks to contain the operation point sample groups and the parser would take from all tracks that are of interest only the samples that belong to a given operation point as indicated by this other type of sample grouping.

```
class OperationPointSampleGroup extends
VisualSampleGroupEntry ('opsg')) {
}
```

Figure 20:
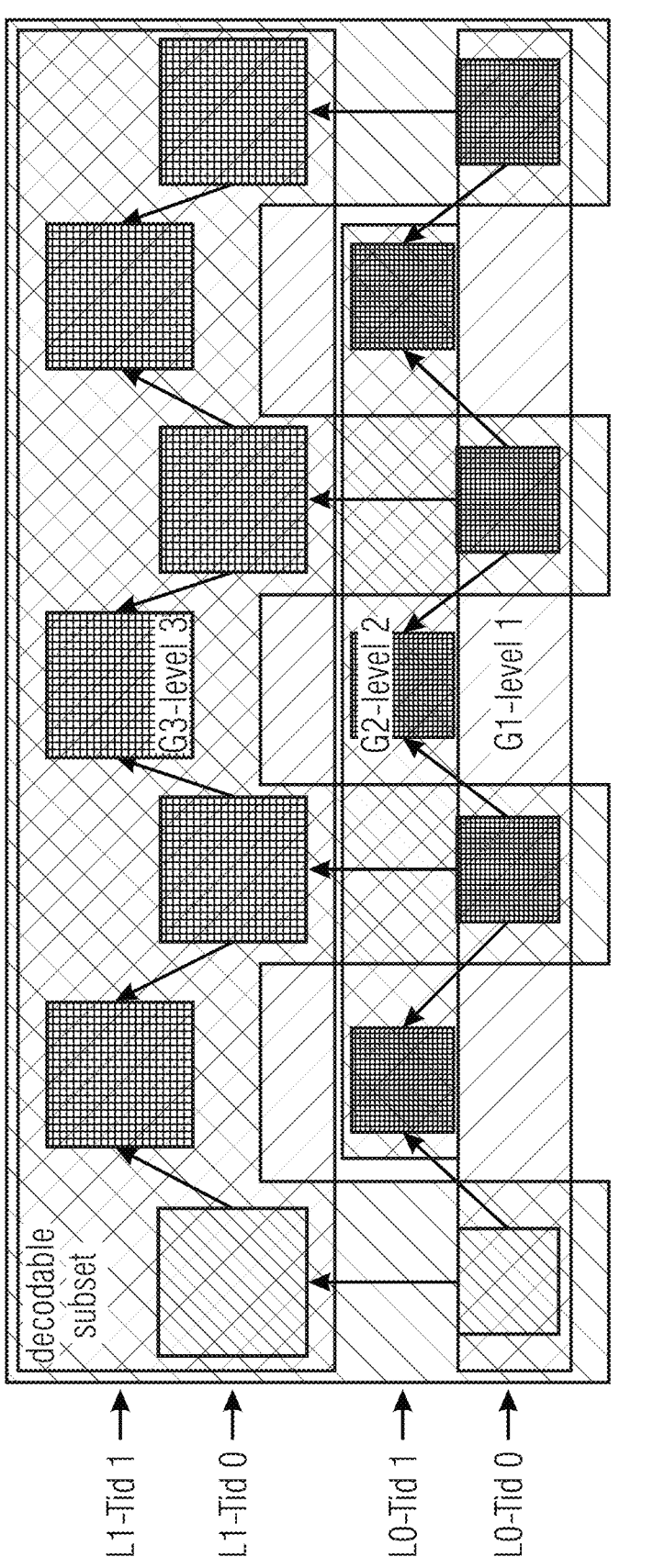
FIG. 20 illustrates an example of a grouping of samples of a multi-layered video stream.

FIG. 20 illustrates an example of a grouping of samples by means of layers and temporal sublayers for the exemplary bitstream of FIG. 12. For example, the track grouping mechanism illustrated in FIG. 20 may be indicated in file 1010 on the basis of the track grouping mechanism described in section 1, further containing information about which sub-layers (or which NAL units) do not belong to an operation point and parsing of NAL units (e.g. TID to determine to which sub-layer a NAL unit belongs to) is carried out. These means that the track grouping would require to indicate for an operation point which temporal ID values (sub-layer correspondence) have the NAL units that belong to an operation point. The tracks themselves would have all the sub-layers (possible values of temporal IDs) within them and further parsing of NAL unit header values would be required to not include them in the bitstream sent to the decoder. The syntax could look as follows with additions highlighted in bold compared to the track group described in section 1.

```
aligned(8) class TrackGroupTypeBox(unsigned int(32)
track_group_type) extends FullBox(track_group_type,
version = 0, flags = 0)
{
unsigned int(32) track_group_id;
if track_group_type == 'oinf' {
    unsigned int(6) num_profile_tier_level;
    for (i=1; i<=num_profile_tier_level; i++) {
        unsigned int(1) general_tier_flag;
        unsigned int(5) general_profile_idc;
        unsigned int(x) general_constraint_indicator_flags;
        unsigned int(8) general_level_idc;
    }
    unsigned int(16) num_operating_points;
    for (i=0; i<num_operating_points) {
        unsigned int(8) ptl_idx;
        unsigned int(8) layer_count;
        for (j=0; j<layer_count; j++) {
            unsigned int(6) layer_id;
            unsigned int(6) max_sub_layer_id;
        }
    }
}
}
```

Figure 21:
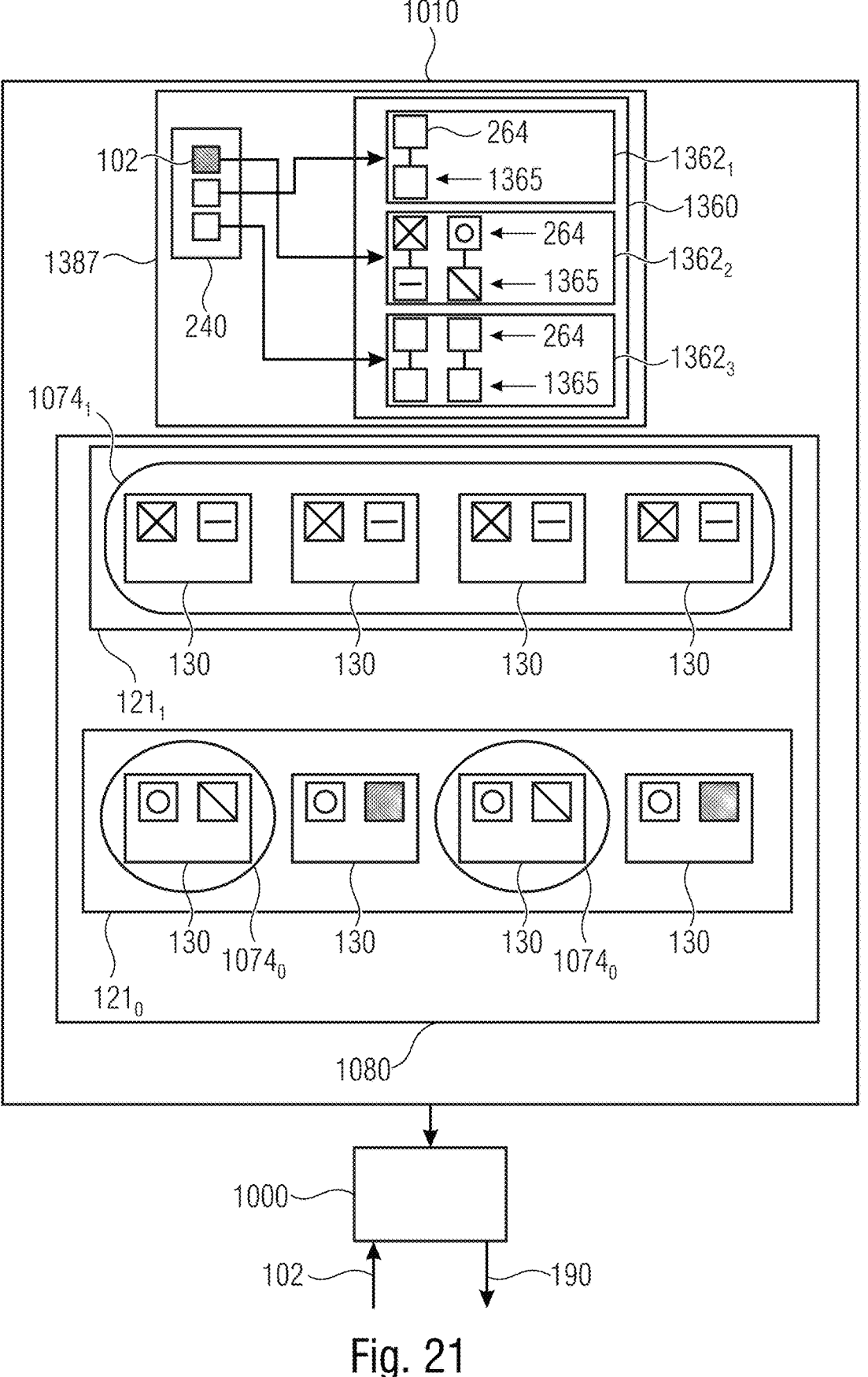
FIG. 21 illustrates an example of a file parser and a file having multiple tracks and using a set of layer identifiers.

FIG. 21 illustrates another embodiment of the file parser 1000 and the file 1010 according to an embodiment. Examples of the embodiment of FIG. 21 may implement the embodiment described with respect to FIG. 20. According to the embodiment of FIG. 21, the file 1010 is indicative of a set 1362 of layer identifiers. The set 1362 of layer identifiers comprises one or more layer identifiers 264 associated with a predetermined operation point 102. In examples, file 1010 comprises a set 1360 of sets 1362 of layer identifiers. In FIG. 21, the set 1360 exemplarily comprises a first set $1362_1$, a second set 13121 and a third set $1362_3$ of layer identifiers. One of the sets 1362, for example set 13121, may be associated with the predetermined operation point 102. File parser 1000 may derive from the descriptive data within the file, whether a track 121 of the subset of tracks is associated with one of the layer identifiers 264 of the set 13121 of layer identifiers associated with a predetermined operation point. If the track is associated with one of the layer identifiers 264 of the associated set 13121 of layer identifiers, file parser 1000 may selectively assign the track to the subset 1080 of tracks, and derive from the descriptive data, whether a portion of the samples of the track is associated with a sublayer, samples of which are required by the predetermined operation point 102. File parser may selectively forward the portion of samples associated with the sublayer which is indicated to be required by the predetermined operation point 102 and the video bitstream 190. That is, file parser 1000 may omit forwarding samples of the respective track which are not associated with the sublayer indicated to be required by the predetermined operation point, when constructing bitstream 190.

For example, descriptive data of file 1010 may indicate, for each of the layer identifiers 264 of the set 13121 of layer identifiers for the predetermined operation point, an associated sublayer identifier indicating a subset of the samples associated with the layer identified with the respective layer identifier. For example, the sublayer identifier may indicate a maximum value for a temporal identifier for samples of the layer identified with the respective layer identifier. File parser 1000 may, for each of the tracks which is associated with a predetermined operation point, derive from the descriptive data, the set of layer identifiers associated with the predetermined operation point and a set of sublayer identifiers associated with the set of layer identifiers for the predetermined operation point. Parser 1000 may, for each sample of the tracks associated with a predetermined operation point, forward the respective sample in the video bitstream 190, if a sample is associated with the set of layer identifiers and with the set of sublayer identifiers indicate for the predetermined operation point, and do not forward the sample otherwise.

For example, file 1010 may comprise a syntax structure, for example a track group syntax structure or a sample group syntax structure, comprising for each of a set 240 of operation points which includes the predetermined operation point 102, an associated set 162 of layer identifiers 264. Each of the layer identifiers 264 may have associated therewith, an associated sublayer identifier which is indicative of one or more sublayers of the layer associated with the layer identifier 264. For example, a layer may comprise one or more temporal sublayers, which are ordered hierarchically. The sublayer identifier 1365 may indicate, for the layer identified with the layer identifier 264, a maximum temporal sublayer of the identified layer required for the predetermined operation point 102. File parser 1000 may include, for each of the layers identified by the set 13121 of layer identifiers associated with a predetermined operation point 102, samples 130 in the video bitstream 190, which samples 130 are associated with a temporal layer identifier equal to or lower than the maximum temporal identifier indicated by the sublayer identifier 1364 associated with the respective layer identifier 264.

Figure 22:
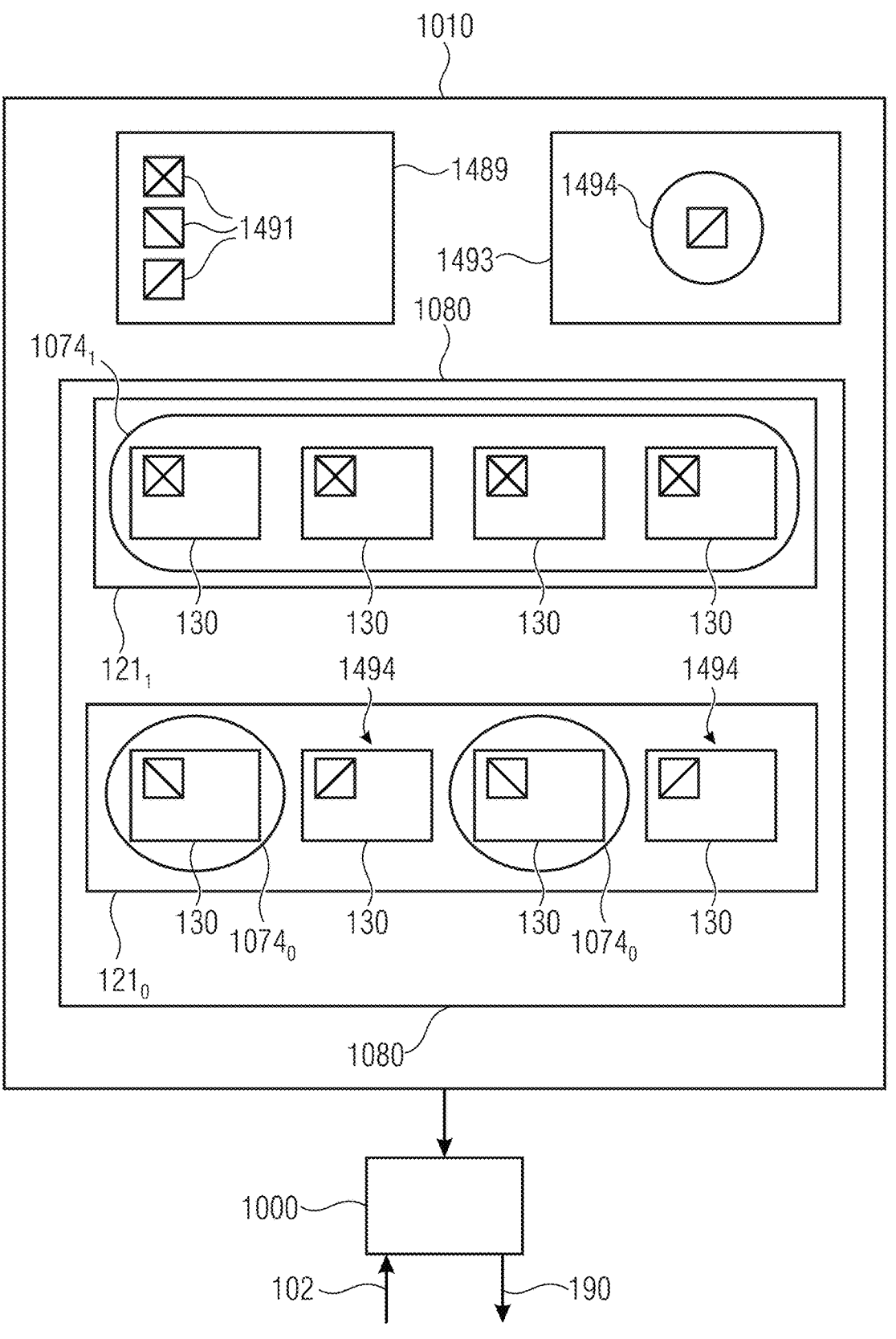
FIG. 22 illustrates an example of a file parser and a file having multiple tracks and using level indices.

FIG. 22 illustrates another example of the file parser 1000 and the file 1010 according to which the portions 1074 to be included in the video bitstream 190 are indicated by means of level indexes. According to the example of FIG. 22, file parser 1000 is configured to derive from the descriptive data a level assigned syntax structure 1489 assigning a level index 1491 to samples 130 of the set of tracks. According to this example, the predetermined operation point 102 is associated with a set of level indexes indicating the level indexes of the samples required by the predetermined operation point 102. For example, the set of level indexes may comprise one or more level indexes, the set of level indexes being, for example, indicated by a maximum level index implying that the step of level indexes includes smaller level indexes. For examples, the level assignment syntax structure may indicate a first level for first samples of an indicated track and a second level for second samples of the indicated track, the first samples having a first temporal identifier and a second samples having a second temporal identifier. According to the example of FIG. 22, file parser 1000 may detect, for each of the tracks 121, whether the track comprises samples associated with level index of the set of level indexes associated with a predetermined operation point. If so, file parser 1000 may selectively add the track to the subset 180 of tracks to be forwarded in the video bitstream 190. Otherwise, file parser 1000 may ignore the track for the video bitstream 190. Further, file parser 1000 may derive, from the descriptive data, a sample group associated with a predetermined operation point 102, a sample group indicating a set 1494 of the samples of the subset of tracks which is not required by the predetermined operation point, by indicating one or more of the level indexes of the set of level indexes as being not required by the predetermined operation point. For each of the samples of the subset of tracks, file parser 1000 may omit a forwarding of the respective sample in the video bitstream 190, if the level of the respective sample is indicated as not being required by the predetermined operation point. Otherwise, file parser 1000 may forward the respective sample.

In a further embodiment this independency or dependency is indicated by using sample groups in a different manner, i.e. the samples group would indicate that some levels identified by the 'leva' box would not be required for an operation point.

Operation points can be defined in the sample group group description box using VisualSampleGroupEntries.

```
Class OperationPointRecord {
    Unsigned int(X) profile_level_idc;
    Unsigned int(8) exclude_levels_cnt;
    For(i=0; i<exclude_levels_cnt; ++i) {
        Unsigned int(8) level_to_exclude_from_dependency;
    }
    . . .
}
Class OperationPointInformation extends
VisualSampleGroupEntry('oinf')
{
    OperationPointRecord oinf;
}
```

However, this would require to use the 'leva' (Level Assignment) box mapping for the implicit reconstruction. The 'leva' only mandates level dependencies like this: m<=n<p. Where samples from level n may depend on any samples from levels m but shall not depend on any samples from level p. Therefore, G3 may depend on G1 but not necessarily on G2. The structure shown above (Operation-PointRecord) shows an example of how this indication of a independency of G3 to G2 is entailed to be able to process the data more efficiently can be done. With the provided mechanism in the new sample group, it would be explicitly clear that some levels in the leva box are excluded from higher levels (by the indication in the sample group "level_to_exclude_from_dependency").

Figure 23:
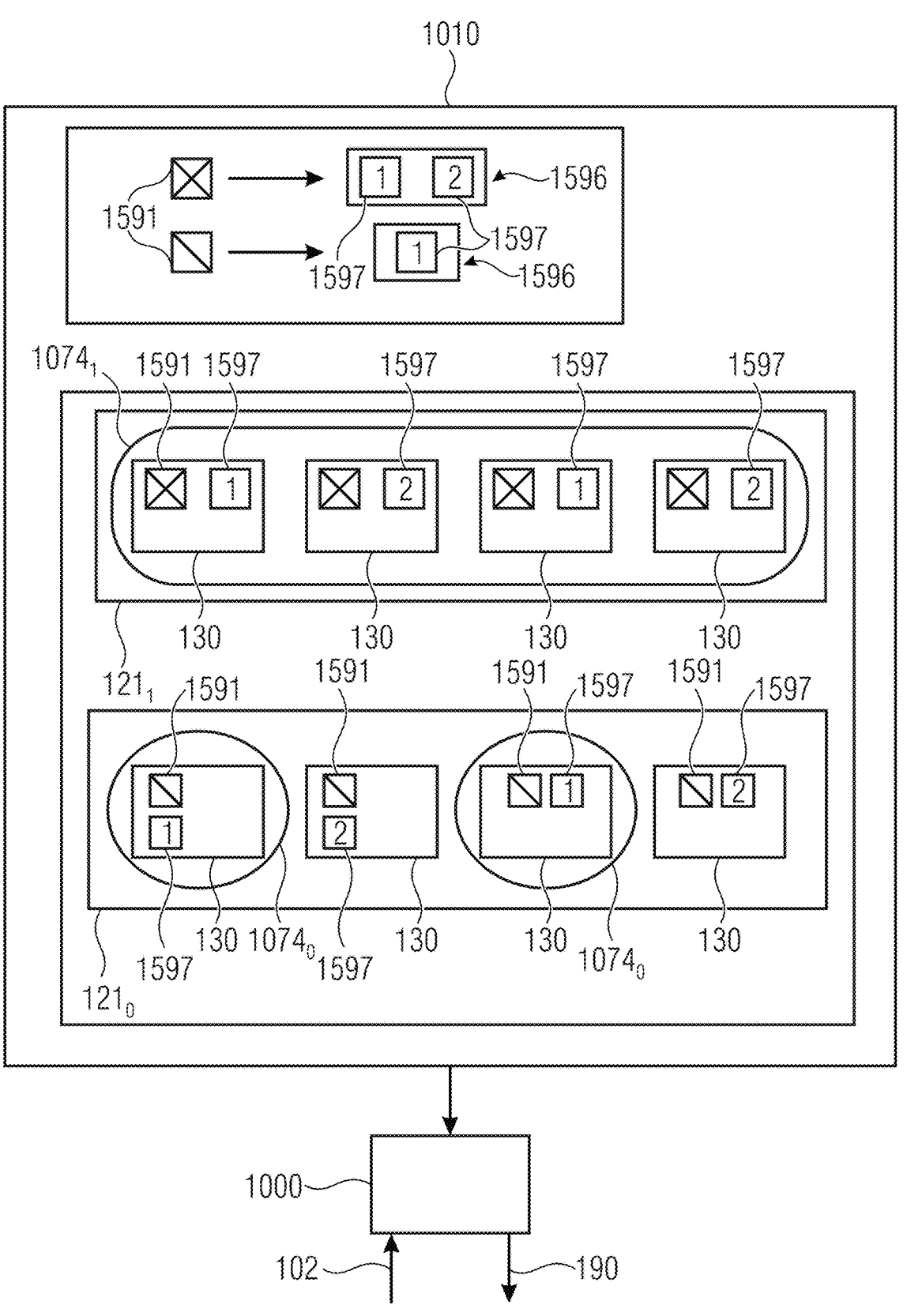
FIG. 23 illustrates an example of a file parser and a file having multiple tracks and a sample group information.

FIG. 23 illustrates another example of the file parser 1000 and the file 1010 according to an embodiment. According to the example of FIG. 23, the file 1010 comprises information on a sample group 1595 which indicates, for a predetermined operation point 102, the portions 1074 of samples 130 of tracks 121 required by the predetermined operation point. In the illustrative example of FIG. 23, the predetermined operation point 102 is associated with the first track 120$_0$ and the second track 121$_1$. The sample group 1595 may indicate, for the first track 121$_0$, a portion 1074$_0$ of samples of the first track 121$_0$ associated with the predetermined operation point. Accordingly, the sample group 1595 may indicate, for the second track 121$_1$, a portion 1074$_1$ of samples of the first track 121$_1$ associated with the predetermined operation point. For example, the samples 130 of the tracks 121 may each be associated with a layer of the video stream signaled in file 1010. Each of the samples 130 may be associated with a layer identifier 1591, indicating the layer, to which the respective sample is associated. In example, samples associated with the same layer may be part of the same track. In some examples, samples of the same track may be associated with the same layer, however, in further examples, a track may comprise samples of several layers. In other words, in some examples, there may be one track per layer, and in other examples, one track may comprise samples of multiple layers.

The sample group 1595 may be associated with the predetermined operation point. In other examples, the sample group 1595 is indicative of, for each of a set of multiple operation points (e.g. the set 240 of operation points), including the predetermine operation point, a respective set of samples. The sample group 1595 may indicate the set of samples for the predetermined operation point, and optionally further operation points, by indicating a set of layer identifiers 1591 associated with the respective operation points, such as the predetermined operation point.

Each of samples 130 may further be associated with a temporal sublayer, by having, associated to the respective sample, a temporal identifier 1597. The temporal identifier 1597 indicates, to which of a set of temporal subsets of the samples 130 of the coded video sequence the sample belongs. The temporal identifier 1597 may, for example, correspond to the temporal_id, as explained with respect to FIG. 15 and FIG. 21. Sample group 1595 indicates, for each of the layer identifiers 1591 associated with the predetermined operation point, a constraint 1596 on the temporal identifier 1597. For example, the constraint 1596 may be indicated in the sample group 1595, by indicating whether all temporal sublayers of the respective layer are required for the predetermined operation point, or not. Further, in case that not all temporal sublayers of the respective layers are required for the predetermined operation point, the indication of the constraint 1596 may comprise an indication for a maximum temporal sublayer. As explained with respect to FIG. 1, temporal sublayers may be ordered hierarchically. File parser 1000 may include into the video bitstream 190, for each of the layers identified by the layer identifiers 1591 associated with a predetermined operation point, all samples 130 which are associated with a temporal sublayer which is, in its hierarchical order, equal to or lower than the indicated constraint on the temporal identifier. For example, the maximum temporal sublayer may be indicated by the constraint 1596 by means of a maximum value for the temporal identifier.

In examples, the sample group 1595 indicates, for the predetermined operation point, a profile, a tier, and a level and/or a set of one or more constraints of the predetermined operation point. For example, the sample group 1595 may indicate, for each of a plurality of operation points, respective profiles, tiers, levels, and a respective set of layer identifiers. Further, the sample group 1595, may comprise, for each of the sets of layer identifiers for the plurality of operation points a respective constraint 1596 on the temporal identifier 1591.

In other words, FIG. 23 may be an example of an embodiment, according to which the indication of the portions 1074 of samples required by the predetermined operation point is done by indicating explicitly up to which level the dependency occurs for each of the samples. However, in this case the sub-layer value (max_tid_in_dep_layer) is indicated and it is expected that the filer format parser checks the TID values for including it in the output bitstream to decode or not.

```
Class OperationPointRecord {
    Unsigned int(X) profile_level_idc;
    Unsigned int(8) layers;
    For(i=0; i<; layers ++i) {
        Unsigned int(3) max_tid_in_dep_layer;
    }
    ...
}
```

According to another embodiment of the file parser 1000 of FIG. 17, file parser 1000 may derive, from descriptive data in the file 1000 that a predetermined track of the subset of tracks is required for the predetermined operation point and forwards the samples of the predetermined track in the video bitstream 190. File parser 1000 may, for each of further tracks, i.e., tracks other than the predetermined track, of the subset 180 of the tracks, inspect, for each of the samples of the respective track, whether the sample is part of a sample group, such as sample group 1595, the sample group indicating samples as being required by the determined operation point. If so, file parser 1000 may forward the respective samples in the video bitstream 190, and if not, file parser 1000 may omit the samples in constructing the video bitstream 190. In example, the sample group is defined so as to comprise samples having one of a specified set of temporal identifiers indicating to which of a set of temporal subsets of the samples of the coded video sequence the respective sample belongs.

The latter embodiment may provide for an efficient parsing of the file. As already stated, the sample group mechanism may require that the parser parses tables for each track to identify to which sample group a sample belongs. Those tables indicate each sample to belong to a sample group, if any. Then the parser, would need to react accordingly. E.g. excluding levels that are not necessary, by not included samples belonging to that level in the bitstream sent to the decoder.

However, typically the maximum temporal id that is required does not change sample by sample, but is a characteristic of a layer. E.g. L1 in the example only depends on temporal IDs equal to 0 in L0. Therefore, this information could be conveyed for a track.

In a further embodiment a track group mechanism or another track property description is used that when using a given reference type, e.g. in 'tref' having a ref_type of 'sref' sample group reference, the track group indicates the index of the sample groups in the dependent layers that are included into the output bitstream.

The grouping above would allow four different operation points:
  G1 only (sample group description of G1)
  G1+G2 (sample group description of G2)
  G1+G3 (sample group description of G1 is used in G3 reference where G2 samples are excluded as they are not included into the track (group/property) description)

In this case, the parser would need to parse a track group or the track reference box 'tref' that are generic for all samples within the track. That reference would indicate that it is a "non-full" reference, e.g. only temporalID equal to 0 is required in the referenced layer, or an 'sref' reference that indicates that only some samples belonging to a sample group in the referenced layer are required.

Based on this information the parser, parses the reference layer only looking for samples with temporalID equal to 0 or parsing the sample group table in the reference track looking for samples that belong to the sample groups that are required. The bitstream sent to the decoder would contain only the relevant NAL units.

Figure 24:
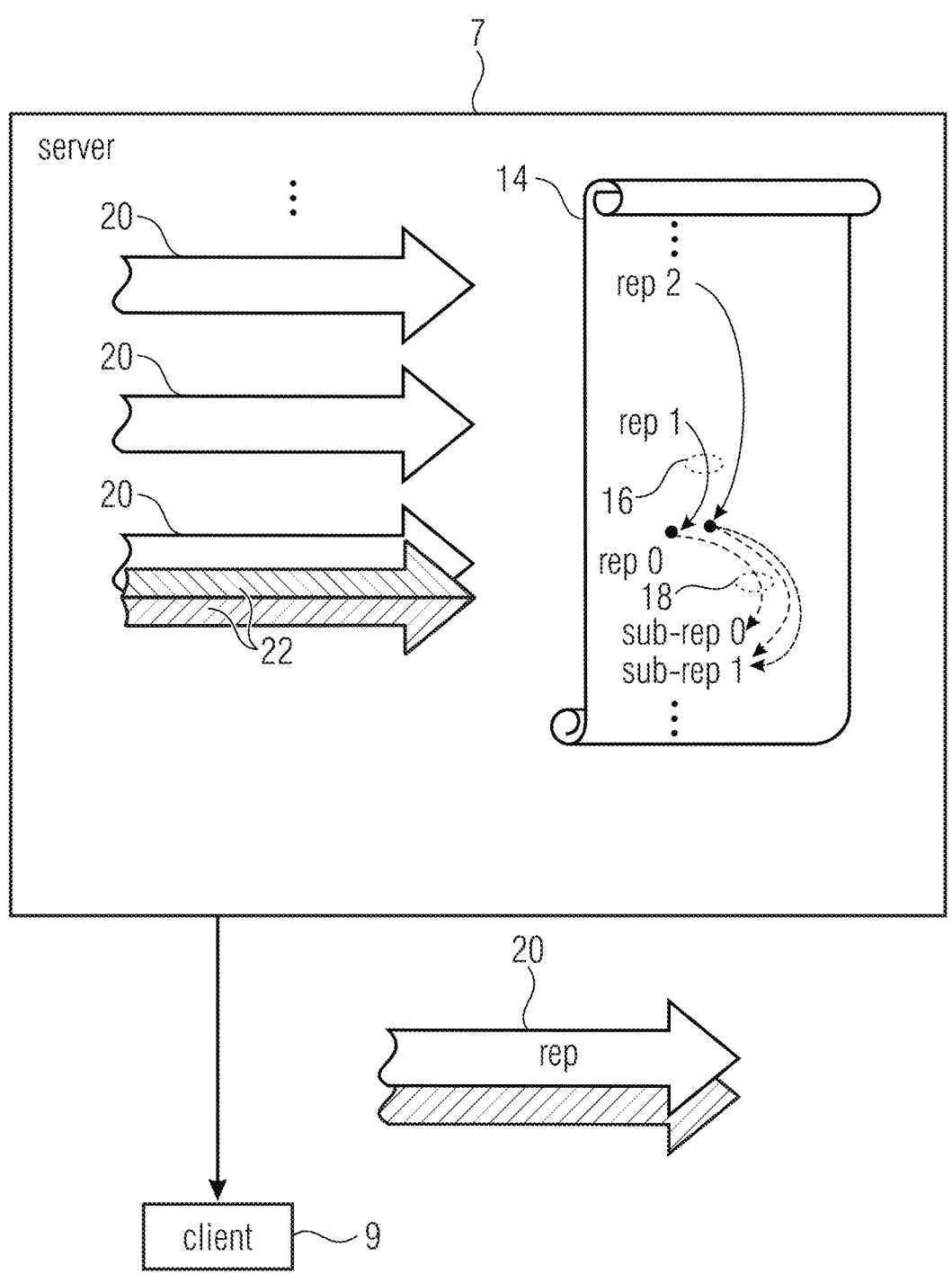
FIG. 24 illustrates an example of a client and a manifest file.

FIG. 24 illustrates an example of a client 9, which may optionally correspond to the client 9 of FIG. 1, in conjunction with a server 7. Client 9 may download a manifest file 14 describing a set of media representations Rep #downloadable by the client. Client 9 may derive, from the manifest file 14, for a first media representation Rep0 information on sub-representations sub-rep 0, sub-rep1 embedded into the first media representations. Further, client 9 may derive from the manifest file 14 for a second media representation Rep1, a first indication 16 of a first set of one or more media representations which the second media representation Rep1 depends on, the set of one or more media representations including the first media representation Rep0. Further, client 9 may derive from the manifest file 14 for a second media representation Rep1, a second indication 18 of a second set of one or more sub-representations out of the sub-representations sub-rep0, sub-rep1 embedded into the first media representation, which are needed for playing the second media representation Rep 1. Client 9 may download the second representation (Rep 1) along with the first set of one or more media representations with restricting downloading the first representation (Rep 0) to the second set of one or more sub-representations. For example, the client requests the manifest 14 from server 12, inspects the manifest 12, and then retrieves, e.g. by HTTP requests, Rep 1 plus Rep 0's sub-rep 0 as indicated by 16 and 18.

In examples, the client 9 may access samples or sub-samples (e.g. NAL units defined by a certain NAL unit value, such as layer ID, or temporal layer and forming, thus, a substream 22) of a track (e.g. as shown each representation might have one track 20 embedded thereinto) which is contained in the first representation (Rep 0), which belong to the second set of one or more sub-representations, by deriving information on the samples or sub-samples from segments of the first representation (Rep 0) (e.g. this information might be contained in the media segments which contain the NAL units, or some initial segment or rep 0 which is firstly downloaded by the client for that Rep 0).

In other words, similar to as discussed previously, in this case also 'ssix' and 'leva' boxes are required to allow downloading only some parts of a track, as streaming only the NAL units required is desirable. The 'ssix' box and 'leva' box would contain descriptive information of the file as to which level samples belong to and byte ranges that are to be consider to access only the relevant samples belonging to a level.

In this case in order to download only the required part, this means to indicate at a DASH level, i.e. in the manifest MPD, that a representation depends on only parts of another representation. Note that in the example described there are 2 track and therefore there would be two representations in the DASH MPD, one for layer 0 and one for layer 1. I.e., a further embodiment consists of an indication for DASH that a dependency not on representation level but on subrepresentations happens. In the example bitstream, the representation containing layer 1 only needs a part of the representation containing layer 0. That is either by adding a @dependencyId "extension" allowing that the Id indicated in the @dependencyId of a representation points to a subrepresentation or some kind of indication at subrepresentations level that points required or not when dependent Representation. For instance, this could be a descriptor that indicates which subrepresentation is required. Subrepresentation in DASH in this case would be the parts of the representation containing layer 0 that contains only NAL units with temporalID equal to 0.

3. File Parser, File Generator and File According to FIGS. 25 and 26

Figure 25:
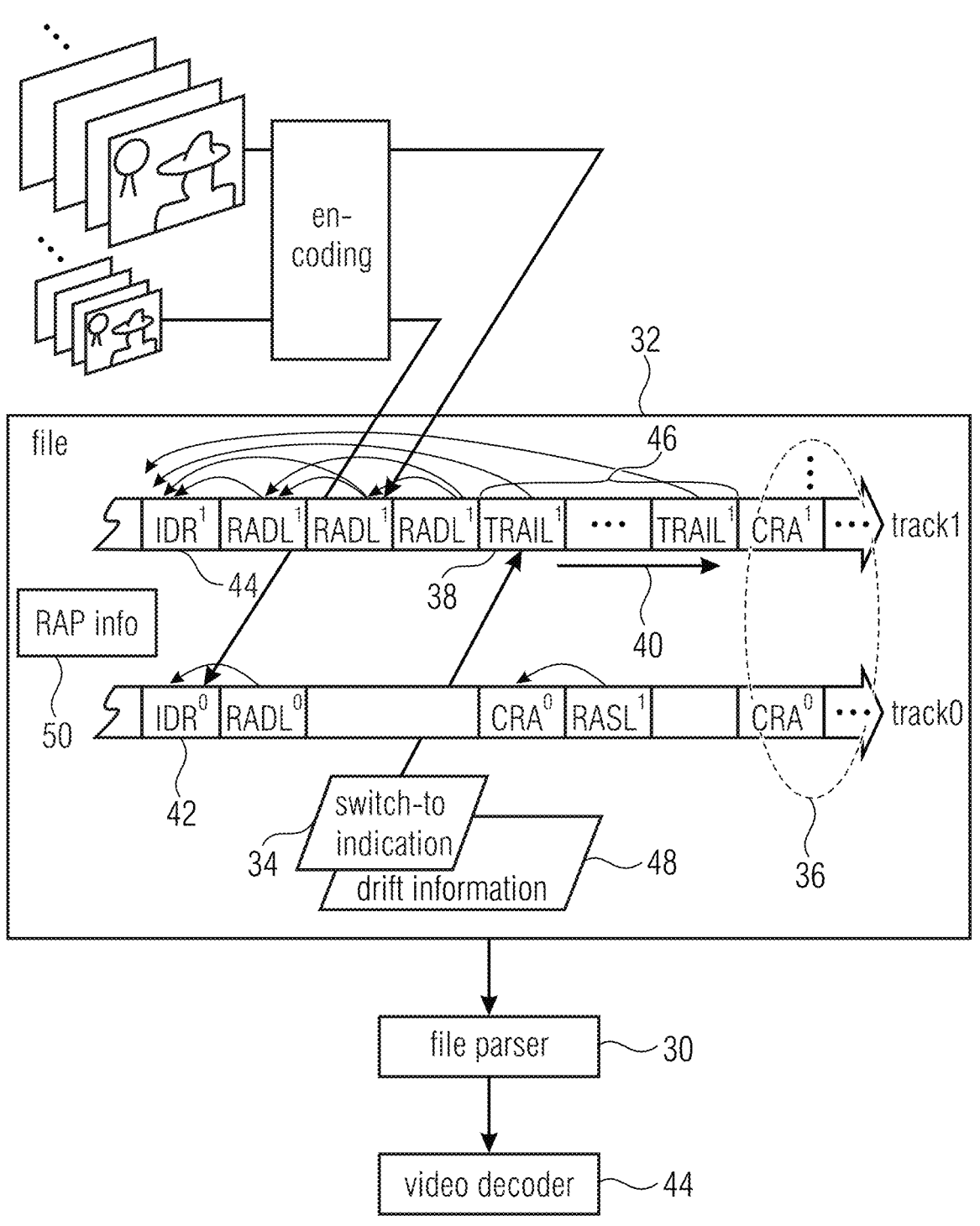
FIG. 25 illustrates a file parser and a file according to another embodiment.

FIG. 25 illustrates a file parser 30 in conjunction with a video decoder 44 according to an embodiment. File parser 30 may optionally be in accordance with file parser 10 of FIG. 1. File parser 30 may receive a file 32, which may correspond to file 110. File 30 may comprise a set 36 of tracks, e.g. comprising track 0 and track 1, each of the tracks comprising samples, e.g. samples 130 of FIG. 1. The file 32 comprises switching information 34 for the set 36 of tracks, the switching information 34 indicating samples 38 of a first track, e.g. track 1, of the set 36 of tracks at which switching from a second track (e.g., track 0) of the set of tracks is allowed provided that one or more preceding samples in the second track (e.g. track 0) are available to the video decoder 44 fed by the file parser from the file. The one or more preceding samples may refer, for example, to the ones preceding sample 38 in coding order 40 up to, inclusively,

TABLE 1

| Element or Attribute Name | Use | Description |
|---|---|---|
| Representation | | This element contains a description of a Representation. |
| @id | M | specifies an identifier for this Representation. The identifier shall be unique within a Period unless the Representation is functionally identically to another Representation in the same Period.<br>The identifier shall not contain whitespace characters.<br>If used in the template-based URL construction as defined in 5.3.9.4.4, the string shall only contain characters that are permitted within an HTTP-URL according to RFC 1738. |
| @bandwidth | M | Consider a hypothetical constant bitrate channel of bandwidth with the value of this attribute in bits per second (bps). Then, if the Representation is continuously delivered at this bitrate, starting at any SAP that is indicated either by @startwithSAP or by any Segment Index box, a client can be assured of having enough data for continuous playout providing playout begins after @minBufferTime * @bandwidth bits have been received (i.e. at time @minBufferTime after the first bit is received).<br>For dependent Representations this value shall specify the minimum bandwidth as defined above of this Representation and all complementary Representations. |
| @qualityRanking | O | specifies a quality ranking of the Representation relative to other Representations in the same Adaptation Set. Lower values represent higher quality content. If not present then no ranking is defined. |
| @dependencyId | O | specifies all complementary Representations the Representation depends on in the decoding and/or presentation process as a whitespace-separated list of values of @id attributes.<br>If not present, the Representation can be decoded and presented independently of any other Representation.<br>This attribute shall not be present where there are no dependencies. |
| . . . | . . . | . . . |
| @maxLevelInDepRep | O | specifies the Sub-Representations of the Representations specified by @dependencyId the Representation depends on in the decoding and/or presentation process as a whitespace-separated list of values of @level attributes of the Sub-Representation of the corresponding Representations. |

Legend:

For attributes: M = Mandatory, O = Optional, OD = Optional with Default Value, CM = Conditionally Mandatory.

For elements: <minOccurs> . . . <maxOccurs> (N = unbounded)

Elements are bold; attributes are non-bold and preceded with an @. List of elements and attributes is in italics bold referring to those taken from the Base type that has been extended by this type.

the immediately preceding RAP sample 42, because then it is guaranteed that any reference sample of sample 38, here exemplarily 44, has a co-temporal sample, here sample 42, in the part of the second track available to the decoder. The tracks have embedded thereinto different version of the same video content in a manner, for instance, mutually independently encoded. File parser 30 may derive the switching information 34 from file 32. Embodiments of section 3 may be related to the third aspect.

For example, file parser 30 may provide the switching information 34 to an external device configured to decide on the switching, e.g. video player comprising, or cooperating with, the video decoder.

Optionally, the switching information 34 may comprise information 48 on drift-affected samples 46 of the first track (track 1) which are affected from decoding drift by the video decoder decoding the drift-affected samples 46 of the first track (track 1) based on (e.g. by reference picture resampling of) previous samples of the second track (track 0) which are temporally aligned to reference samples of the first track (track 1) referred to (directly as shown in the figure or indirectly via one or more other of the drift-affected samples) by the drift-affected samples 46 (such as sample 42 which is co-aligned/co-temporal to sample 44 referred to by sample 38). For example, file parser 30 may derive the information 48 from file 32.

For example, the information 48 on the drift-affected samples 46 is indicative of an upper bound of a number of, or a temporal duration of, the drift-affected samples.

For example, the information 48 on the drift-affected samples 46 is indicative of a quality of the drift-affected samples meeting a predetermined criterion.

For example, the information 48 on the drift-affected samples is indicative of the drift-affected samples being coded without temporal syntax prediction.

For example, the information 48 on the drift-affected samples identifies the drift-affected samples.

Optionally, the file 32 comprises RAP information 50 which is indicative of RAP samples 44 (such RAP samples might be synchronization samples or sync samples, SAP (stream access point) samples and/or IRAPs) of the first track (track 1). The RAP information 50 may be separate from the switching information 34 (e.g. are two different kinds of information; in fact, samples 38 are no RAP samples). File parser 30 may derive the RAP information 50 from file 30 for the first track (track 1).

Optionally, the file 32 comprises further RAP information 52 which is indicative of RAP samples 42 (such RAP samples might be synchronization samples or sync samples, SAP (stream access point) samples and/or IRAPs) of the second track (track 0), the switching information 34 indicating the samples 38 of the first track (track 1) of the set of tracks at which switching from the second track (track 0) of the set of tracks is allowed provided that those samples in the second track (track 0) are available to the video decoder 44 which precede the samples of the first track upstream to the closest (in terms of coding order) preceding RAP sample 42 of the second track (track 0). File parser 30 may derive the further RAP information 52 from file 30 for the second track (track 1).

The switching information 34 and the file parser 32 may provide for a more flexible switching between tracks in the decoding of video bitstreams. For a long time, video codecs allowed to change the resolution of the video (i.e. the size of the matrix of coded samples per picture) only at certain pictures (IRAP) that are independently coded and break prediction dependencies of proceeding pictures. At such independent random-access points (IRAPs), the decoding process can begin and results in pictures of a single resolution to be output until the next occurrence of such an IRAP. The concept of leading pictures in open GOP structures introduces pictures with inter-dependencies to the associated IRAP and its preceding IRAP as shown in the following FIG. 26A.

Figure 26A:
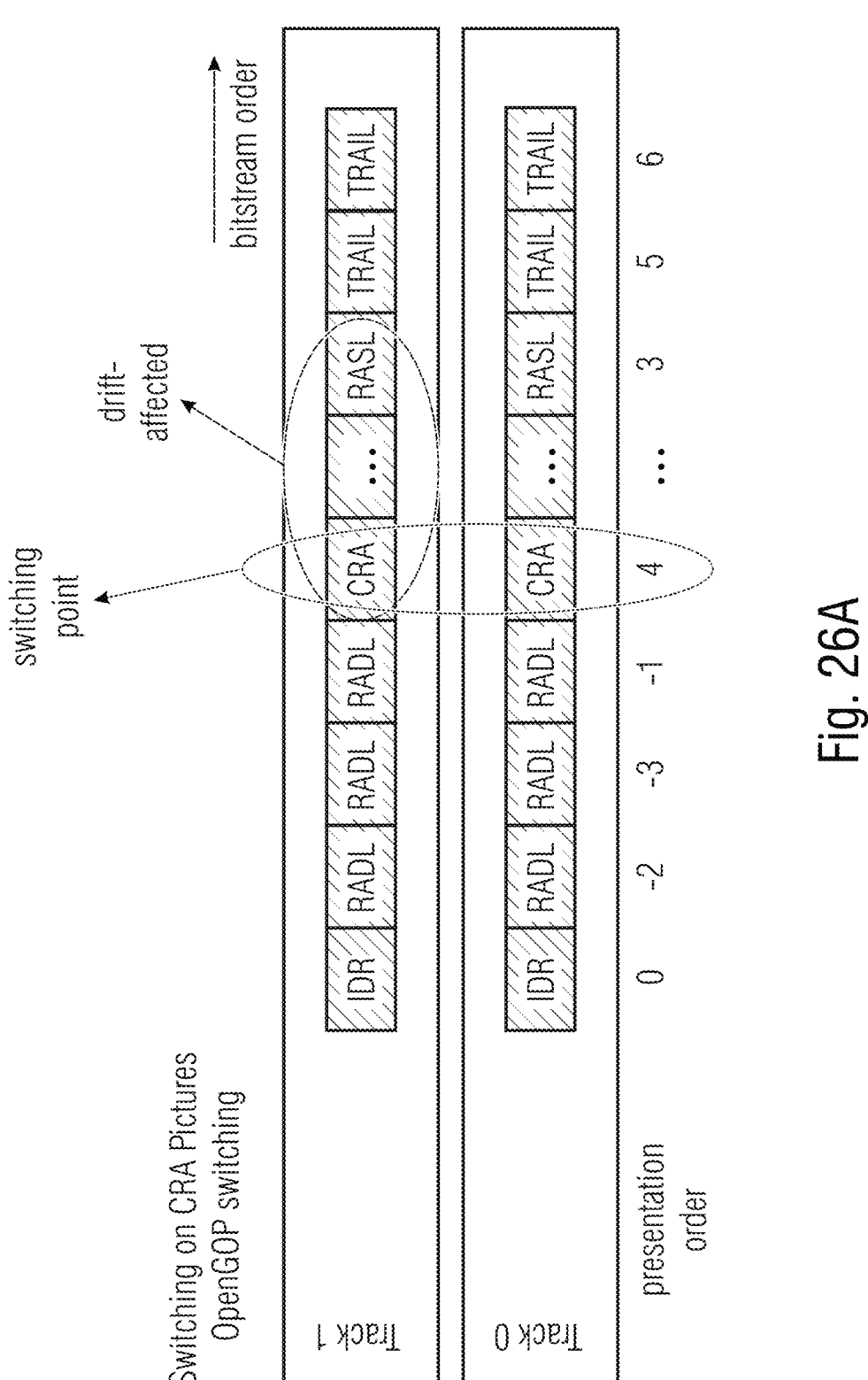
FIG. 26a-c illustrates examples of switching between tracks.

FIG. 26A illustrates drift affected pictures in open GOP CRA switching. In other words, FIG. 26A illustrates open GOP switching at so-called CRA pictures. The associated leading pictures will be drift affected until occurrence of a non-leading pictures such as IRAP, TRAIL, DRAP, GDR and so on. However, from a codec perspective, this scheme used to be only possible between streams of a same resolution. Further, the support of such use cases in the file format is limited to guaranteeing that apart from the CRA only the trailing pictures (POC 5 and higher) are decodable and being silent about the leading pictures.

Latest generation codecs such as the emerging VVC allow to change resolution also at pictures that are non-IRAP pictures. This is achieved by incorporating an additional resampling step in the inter-prediction chain and thereby, reference pictures of different resolutions than the current pictures can be used for reference and hence, resolution change can occur at pictures between IRAPs.

Figure 26B:
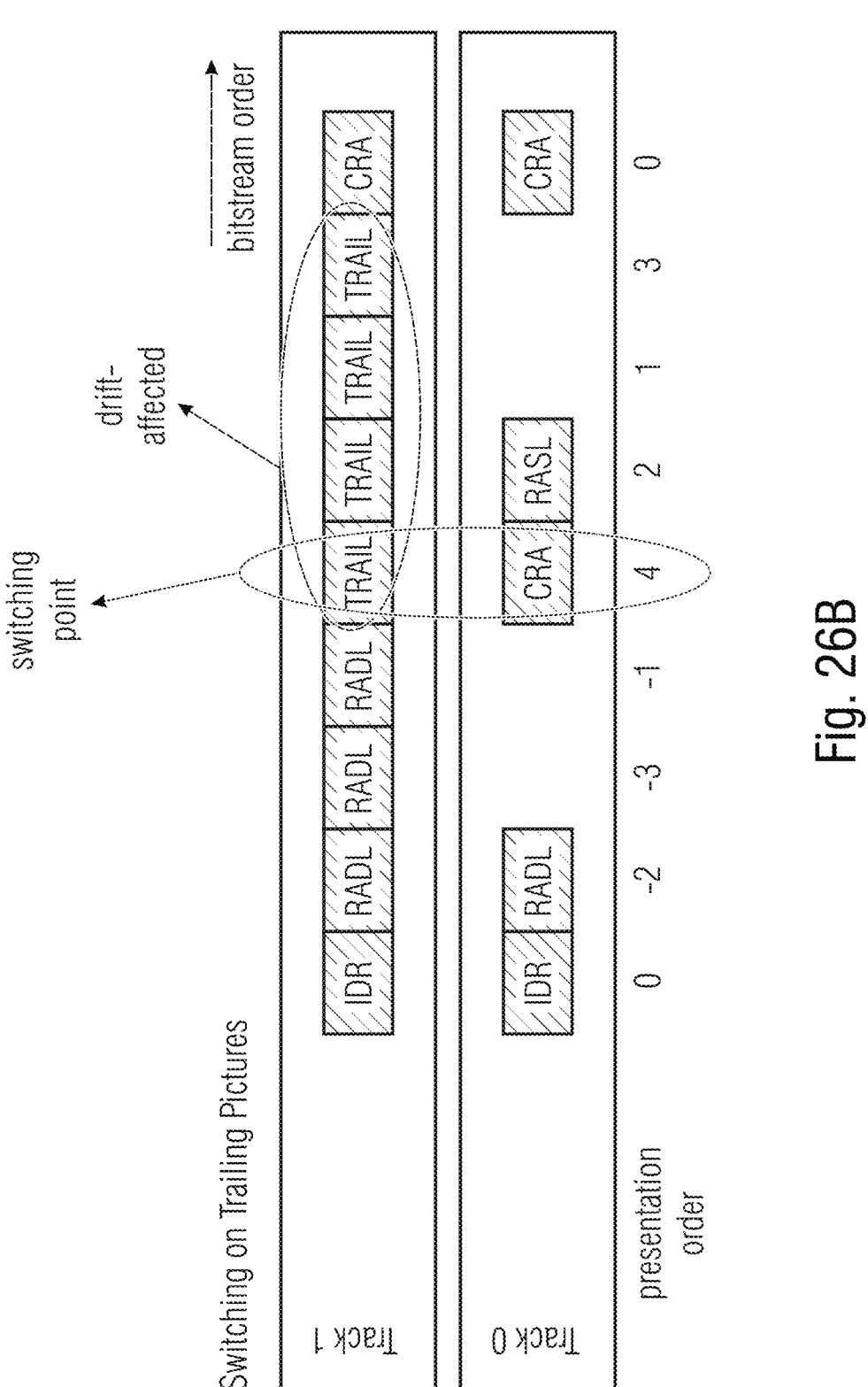

This feature can be helpful primarily in a low-delay conversational scenario, wherein a sender can adjust the video resolution (e.g. in case of bandwidth issues) without having to send a bitrate-wise costly IRAP. However, in a video-on-demand segment based streaming scenario, it is conceivable to use this feature to allow bitrate adaption by means of resolution switching (which is the common case) wherein a client can switch between different versions of a content (e.g. 720p and 1080p) without waiting for segments that start with an IRAP. However, the important difference is that such switching is not envisioned by a single encoder and will likely result in a certain amount of artefacts or drift in some of the decoded pictures. The following FIG. 26B provides an illustration regarding the described scenario and which pictures are affected by the drift. In other words, FIG. 26B illustrates drift affected pictures when switching at trailing pictures.

Figure 26C:
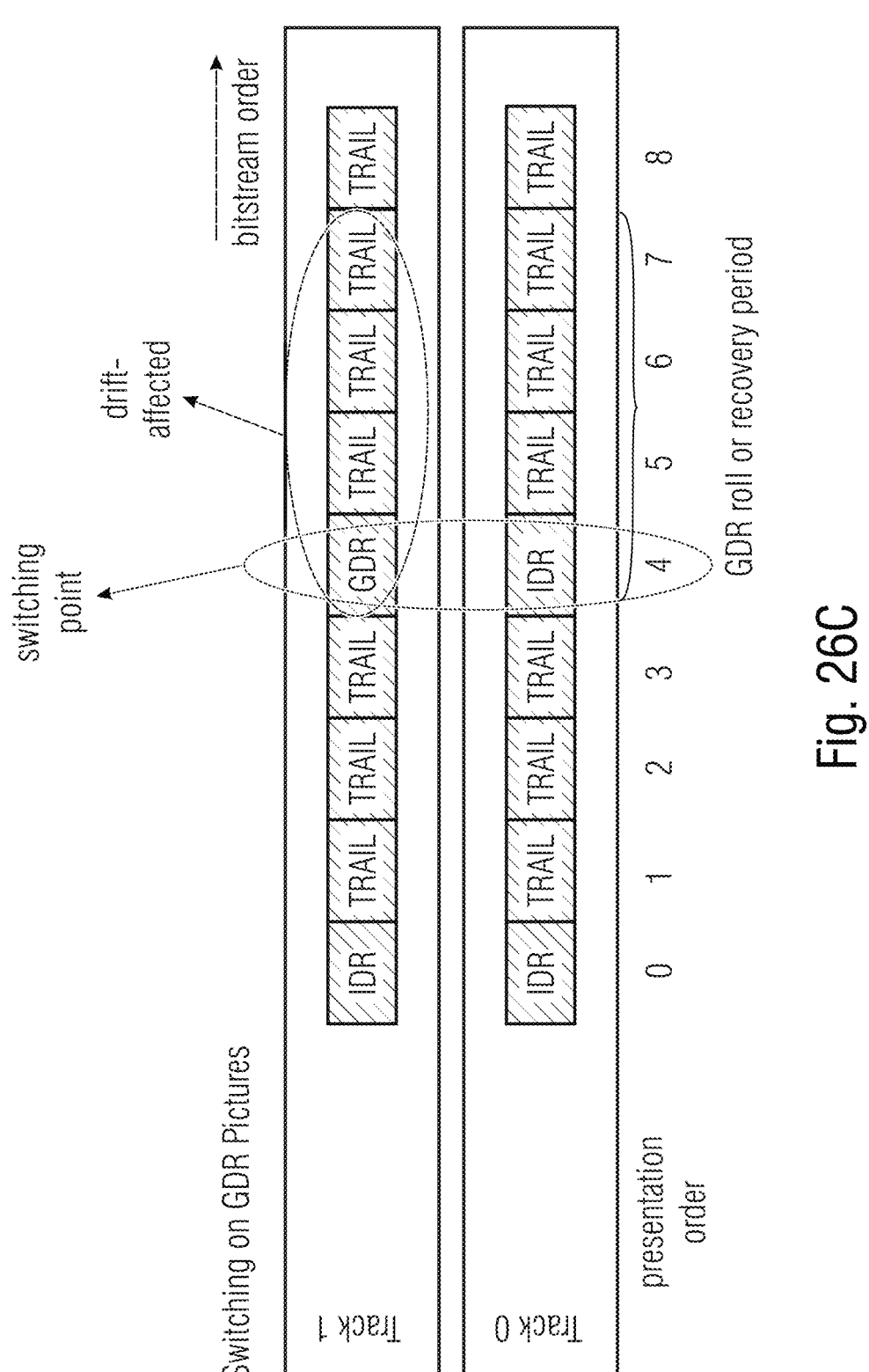

Further application examples in the context of new emerging codecs such as VVC exist, e.g. GDR based streams as illustrated in FIG. 26C, where non-refreshed regions may be drift-affected when switching into such a GDR cycle.

From perspective of a file format for such coded video data, the different versions to switch among are typically stored in separate tracks and a switching event involves a first switch-from track and a second switch-to track. It is important to provide information in the file format container to identify samples (of the switch-to track) where such switching can occur with a controllable/a-priori determinable amount of artefacts/drift and additional information about the nature of such artefacts/drift. As explained above, such non-IRAP pictures could for instance be regular trailing pictures or GDR pictures or STSA pictures and so on.

Therefore, as part of the invention in a first embodiment, an indication is provided in the FF (e.g. through SAP type, sync sample type, configuration record information, or a separate box providing this information on a per-track, per-track-group, per-sample or per-sample-group basis) that certain samples of the switch-to track (including or excluding the switching point picture of the switch-to track) can be decoded when earlier samples of the switch-from track are available for referencing. Regarding the track-group exemplary embodiment, such track groups would for instance contain a set of tracks and indicate that drift-inducing switching among the tracks contained in the track group is possible. Regarding the sample-group exemplary embodiment, such sample groups would include the switching point picture and the drift affect pictures when switching among a track group.

In a further embodiment, an indication is given in the file format similar to the above (e.g. through SAP type, sync sample type, configuration record information, or a separate box providing this information on a per-track, per-track-group, per-sample or per-sample-group basis) that when any such drift-affected picture (including or excluding the switching point picture) will be decoded, the samples will be of an acceptable quality when reference samples of a any track in the track group are available. In other words, the embodiment is an indication that any severe-drift-inducing inter-prediction tools in the drift-affected pictures such as TMVP, ATMVP, DMVR, BIO, i.e. further Motion Vector prediction related tools or syntax-prediction based tools are absence, and instead, only pixel value based prediction is used by the drift-affected pictures.

In a further embodiment, an indication is given in the file format similar to the above (e.g. through SAP type, sync sample type, configuration record information, or a separate box providing this information on a per-track, per-track-group, per-sample or per-sample-group basis) about drift duration, i.e. duration from switching point until the last drift-affected picture in the switch-to track, in seconds or number of pictures. This information can help applications to schedule switching events when they are least impactful subjectively, e.g. when a region moves out of viewport.

4. File Parser, File Generator and File According to FIG. 27

Figure 27:
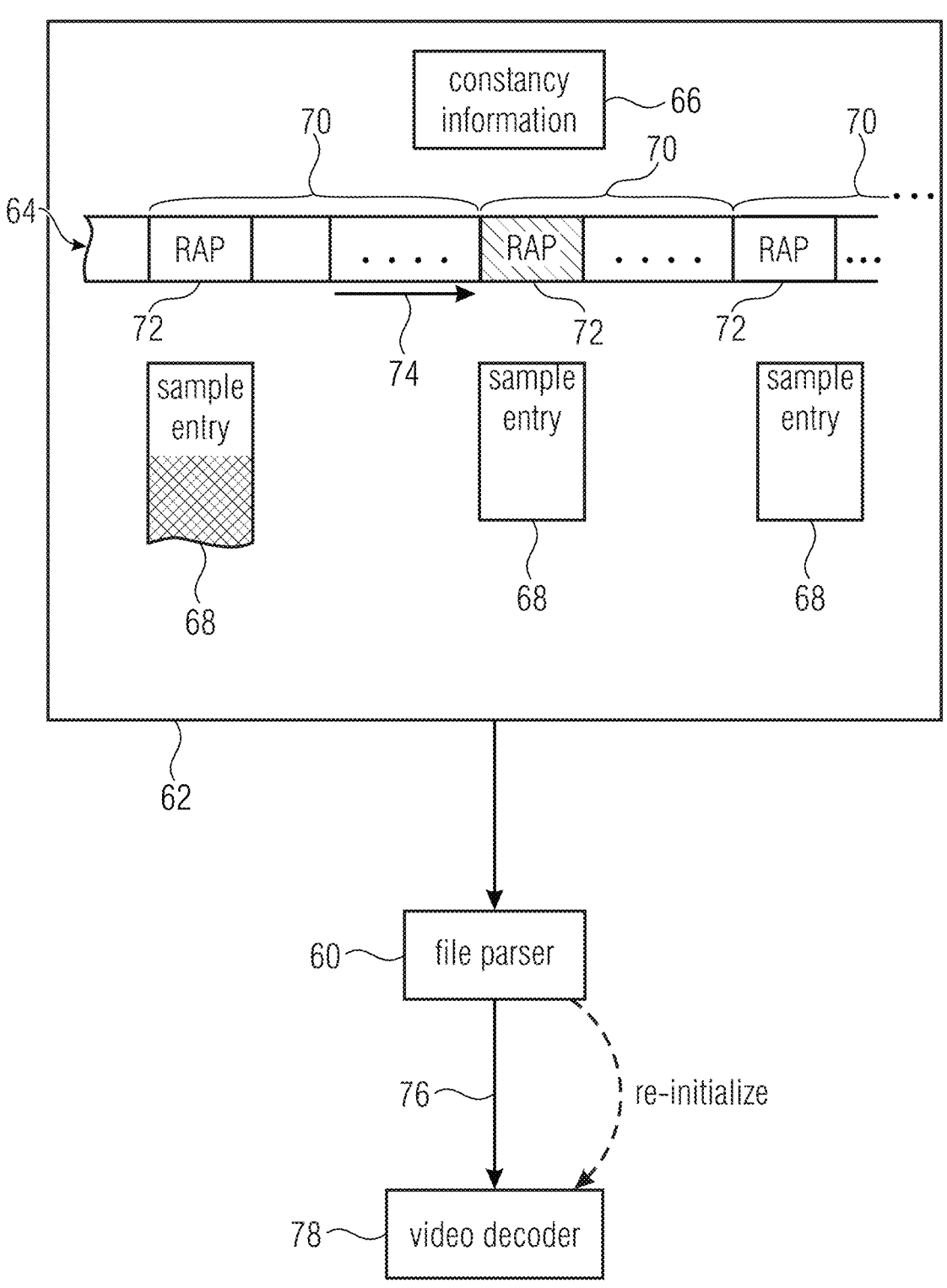
FIG. 27 illustrates a file parser and a file according to another embodiment.

FIG. 27 illustrates a file parser 60 according to an embodiment of the fourth aspect. File parser may optionally be in accordance with file parser 10 of FIG. 1. FIG. 27 illustrates file parser 60 in conjunction with a video decoder 78, e.g. video decoder 17. File parser 60 may receive a file 62, which may optionally correspond to file 110. File 62 comprises a track 64, e.g. track 121. File 62 may comprise sample entries 68 (e.g. samples entries as described in section 0) for the track 64, the sample entries 68 signaling video parameters for respective coded video sequences 70 of a video bitstream 76 which is inserted into the track 64 or a track group of the file 62 to which the track belongs. For example, the video parameter may relate to highest allowed values for reference picture index, picture size and/or activation of certain interpolation tools. File 62 further comprises an indication 66 which indicates, whether the video parameters signaled by all of the sample entries 68 for the track 64 or the track group meet a predetermined decoder capability, e.g. in terms of one or more of memory allocation mount used, picture output size, CPB size, etc. The video bitstream 76 to which the video parameters refer may, e.g., a video bitstream which is forwarded by the parser 60 from file 62 to decoder 78, e.g. video bitstream 190 of FIG. 1. Each coded video sequence 70 starts at an RAP 72, e.g. IRAP, of the video bitstream 76 and ends in front of a subsequent RAP 72 of the video bitstream, e.g. in coding/stream order 74.

File parser 60 may derive the indication 66 from file 62. If all sample entries 68 present in the file 62 for each coded video sequence 70 of the video bitstream 76 are indicated, by indication 66, to meet the predetermined decoder capability, file parser 60 may leave video decoder 78, which receives the coded video sequence 76, at an RAP 72 (let's say the simply hatched one in FIG. 27) at which a coded video sequence 70 starts, as currently initialized. That is, in this case, file parser 60 may omit a re-initialization of the video decoder 78. The file parser 60 may omit the re-initialization irrespective of video parameters signaled by the sample entry 68 for the RAP (the simply hatched one) deviating from video parameters signaled by the sample entry present in the file for the preceding coded video sequence (i.e. the cross-hatched sample entry) or not. Alternatively or additionally, file parser 60 may omit the re-initialization irrespective of the video parameters signaled by the sample entry 68 for the RAP conflicting with a current initialization (e.g., conflicting in terms of one or more of memory allocation mount used, picture output size, CPB size) of the video decoder 78 or not.

For example, the indication 66 may be a syntax element or a syntax structure, indicating whether all sample entries 68 present in the file 62 for each coded video sequence 70 of the video bitstream 76 meet the predetermined decoder capability. In examples, file parser 60 may derive from the presence or the absence of a syntax element or a syntax structure in file 62 whether all sample entries 68 present in the file 62 for each coded video sequence 70 of the video bitstream 76 meet the predetermined decoder capability.

For example, if the indication does not indicate that all sample entries present in the file for the track 64 signal video parameters for the coded video sequence which meet the predetermined decoder capability, the file parser 60 may initiate a re-initialization of the video decoder at a RAP at which a coded video sequence starts, depending on a first criterion and/or a second criterion. The first criterion being fulfilled may depend on whether the video parameters signaled by the sample entry 68 for the IRAP deviating from video parameters signaled by the sample entry present in the file for the preceding coded video sequence or not. In other words, the file parser may re-initialize the video decoder 78, if sample entry changes and the indication 66 does not indicate, that that all sample entries present in the file for the track 64 signal video parameters for the coded video sequence which meet the predetermined decoder capability. The second criterion being fulfilled may depend on whether the video parameters signaled by the sample entry 68 for the IRAP conflicting with current initialization of the video decoder or not.

For example, file parser 60 may derive decoder capability related video parameters, e.g. DCI NAL units, from a section of the file which relates to the track, and forward the video bitstream 76 from the track or the track group to the video decoder along with providing the video decoder 76 with the decoder capability related video parameters at RAPs at which the coded video sequences start and for which the sample entries are present in the track.

For example, an initialization (and re-initialization) of the video decoder affects one or more of a coded picture buffer size, an amount of allocated memory and/or a number of allocated processor decoder kernels.

The indication 66 allows to avoid an unnecessary decoder re-initialization. For example, VVC has a new syntax structure referred to as Decoder Capability Information (DCI) and this syntax structure has a different scope than comparable syntax structures such as Parameter Sets in former codecs such as, for instance, HEVC. A DCI entails limit information about the profile tier level of a bitstream similar to the way that parameter sets contain such information for their respective scope. However, in former video coding standards, the scope of such parameter sets cannot last beyond a single coded video sequence (CVS), i.e. from IRAP to IRAP. Now, with VVC, a profile tier level limit guarantee can be expressed with a scope spanning aver the concatenation of multiple IRAP periods, i.e. what is defined as a bitstream which entails all data from the beginning of the first CVS in the bitstream until the end of the bitstream (e.g. as signalled through an end-of-bitstream NAL unit).

For instance, imagine the case where three CVSs of HEVC coded video are concatenated to a bitstream. When this example is packetized into a file format container, the respective track would entail three sample entries, each containing new and potentially different parameter sets. Note that Section 4.10 of ISO/IEC 14496-15 describes in an informative section that "the video decoder for decoding of the bitstream output from the file parser is expected to be reset at the first sample at which the sample entry changes" which implies that in the described scenario the application parsing the file needs to initialize the decoder. Before, VVC there was no means to indicate the parameter set sections relevant for decoder initialization such as profile tier level are to remain constant in the bitstream.

However, imagining the above example based on VVC coded video CVSs, the bitstream may contain DCIs at each IRAP describing the maximum capability needed for decoding the entire bitstream (i.e. the mentioned three concatenated video sequences). Hence, there will also exist three sample entries as in HEVC at which the respective configuartionRecords in the sample entries will carry pairs of VPS/SPS/PPS. However, if there was a single DCI for each CVSs that required individual sample entries to be present (e.g. for parameter changes which would not require a decoder re-initialization or without changes at all), it would still be beneficial to indicate that all the sample entries have a single DCI and that no decoder reset is required.

In the first embodiment, an indication is added to the file format container that all sample entries in a track have the same DCI contents so that a single decoder initialization at the operation point described by the DCI is sufficient to decode the entire bitstream without re-initialization (or reset) of the respective decoder.

For instance, the invention could use flags of the Sample Description Box 'stsd' to indicate that same DCI applies to all sample entries within a track. The current 'stsd' box is not using any flags (flags=0). More concretely the flag signals if decoder re-initialization can be omitted for changing between sample entries in the sample description box (i.e. track). Therefore, if the flag is set to 1, configuration record changes (in other words: changes of sample entries) will not require decoder re-initialization.

```
aligned(8) class SampleDescriptionBox (unsigned int(32) handler_type)
    extends FullBox('stsd', version, flags = 0) {
    int i ;
    unsigned int(32) entry_count;
    for (i = 1 ; i <= entry_count ; i++) {
        SampleEntry( );   // an instance of a class derived from
SampleEntry
    }
}
```

Semantics:

If flags is set to 1, all sample entries in stsd box contain the same parameters describing the maximum capability needed for decoding of the entire track (e.g.: DCI in VVC) and therefore can be switched without full re-initialization of the decoder.

In another embodiment of the invention, each track has a mandatory media information box 'minf' which describe characteristics information of the media in a track. This new box contains a DCI NAL unit used for all sample entries in that track.

An example for such a decoder configuration box is given in the following:

Definition

Box Types: 'dcfg'
Container: MediaInformationBox
Mandatory: No
Quantity: Exactly one
The DecoderConfigurationBox contains decoder configuration information valid for all sample entries in a track. When this box is present the player can switch sample entries without re-initialization of the decoder. The NAL units from this box can be overwritten by the NAL units from the selected sample entry except of DCI NAL units.
Syntax

```
aligned(8) class DecoderConfigurationBox
    extends FullBox('dcfg', version = 0, 0) {
unsigned int(8) numOfArrays;
    for (j=0; j < numOfArrays; j++) {
        unsigned int(1) array_completeness;
        bit(1) reserved = 0;
        unsigned int(6) NAL_unit_type;
        unsigned int(16) numNalus;
        for (i=0; i< numNalus; i++) {
            unsigned int(16) nalUnitLength;
            bit(8*nalUnitLength) nalUnit;
        }
    }
}
```

Semantics
    numOfArrays indicates the number of arrays of NAL units of the indicated type(s).
    array_completeness when equal to 1 indicates that all NAL units of the given type are in the following array and none are in the stream or in the sample entry; when equal to 0 indicates that additional NAL units of the indicated type may be in the stream or in the sample entry.
    NAL_unit_type indicates the type of the NAL units in the following array (which shall be all of that type); it takes a value as defined in ISO/IEC 23009-3; it is restricted to take one of the values indicating a DCI, VPS, SPS, PPS, prefix SEI, or suffix SEI NAL unit.
    numNalus indicates the number of NAL units of the indicated type included in the decoder configuration box. The SEI array shall only contain SEI messages of a 'declarative' nature, that is, those that provide information about the stream as a whole.
    nalUnitLength indicates the length in bytes of the NAL unit.
    nalUnit contains an DCI, SPS, PPS, VPS or declarative SEI NAL unit, as specified in ISO/IEC 23009-3.

In another embodiment, a group of tracks is indicated to obey the limits constituted by a single first DCI when played, regardless of the second DCIs in the individual sample entries of the individual tracks belonging to the group. The first DCI may be conveyed through explicit signalling as described above or marked via means of a flag to be of broader persistence/scope as above.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded image signal or file can be stored on a digital storage medium or can be transmitted on a transmission medium such as a wireless transmission medium or a wired transmission medium such as the Internet.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

In the foregoing Detailed Description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. File parser, comprising one or more processors, wherein the one or more processors are configured to:

derive from a file switching information for a set of tracks, the switching information indicating samples of a first track of the set of tracks at which switching from a second track of the set of tracks is allowed provided that one or more preceding samples in the second track are available to a video decoder fed by the file parser from the file; and derive, from the switching information, information on drift-affected samples of the first track which are affected from decoding drift by the video decoder decoding the drift-affected samples of the first track based on previous samples of the second track which are temporally aligned to reference samples of the first track referred to by the drift-affected samples.

2. File parser of claim 1, wherein the one or more processors are configured to:

provide the switching information to an external device configured to decide on the switching.

3. File parser of claim 1, wherein the one or more processors are configured to:

derive, from the switching information, information on dependent samples of the first track, which follow one of the samples of the first track at which switching from the second track is allowed, and which depend on one or more preceding reference samples of the first track, the one or more preceding reference samples preceding the one of the samples of the first track at which switching from the second track is allowed.

4. File parser of claim 3, wherein the information on the dependent sample is indicative of an upper bound of a number of, or a temporal duration of, the dependent samples.

5. File parser of claim 3, wherein the information on the dependent samples is indicative of a quality of the dependent samples meeting a predetermined criterion.

6. File parser of claim 3, wherein the information on the dependent samples is indicative of the dependent samples being coded without temporal syntax prediction.

7. File parser of claim 3, wherein the information on the dependent samples identifies the dependent samples.

8. File parser of claim 3, wherein the one or more processors are configured to:

derive, for the first track, RAP information from the file which is indicative of RAP samples of the first track, the RAP information being separate from the switching information.

9. File parser of claim 3, wherein the one or more processors are configured to:

derive, for the second track, further RAP information from the file which is indicative of RAP samples of the second track, the switching information indicating the samples of the first track of the set of tracks at which switching from a second track of the set of tracks is allowed provided that those samples in the second track are available to the video decoder which precede the samples of the first track upstream to the closest preceding RAP sample of the second track.

10. File parser of claim 1, wherein the information on the drift-affected samples is indicative of an upper bound of a number of, or a temporal duration of, the drift-affected samples.

11. File parser of claim 1, wherein the information on the drift-affected samples is indicative of a quality of the drift-affected samples meeting a predetermined criterion.

12. File parser of claim 1, wherein the information on the drift-affected samples is indicative of the drift-affected samples being coded without temporal syntax prediction.

13. File parser of claim 1, wherein the information on the drift-affected samples identifies the drift-affected samples.

14. File parser of claim 1, wherein the one or more processors are configured to:

derive, for the first track, RAP information from the file which is indicative of RAP samples of the first track, the RAP information being separate from the switching information.

15. File parser of claim 1, wherein the one or more processors are configured to:

derive, for the second track, further RAP information from the file which is indicative of RAP samples of the second track, the switching information indicating the samples of the first track of the set of tracks at which switching from a second track of the set of tracks is allowed provided that those samples in the second track are available to the video decoder which precede the samples of the first track upstream to the closest preceding RAP sample of the second track.

16. Non-transitory digital storage medium having stored thereon a file of a video, the file comprising:

a set of tracks; and switching information for the set of tracks, the switching information indicating samples of a first track of the set of tracks at which switching from a second track of the set of tracks is allowed provided that one or more preceding samples in the second track are available to a video decoder fed from the file, and the switching information indicating information on drift-affected samples of the first track which are affected from decoding drift by the video decoder decoding the drift-affected samples of the first track based on previous samples of the second track which are temporally aligned to reference samples of the first track referred to by the drift-affected samples.

17. File generator, comprising one or more processors, wherein the one or more processors are configured to:

provide a file with information for a set of tracks, the switching information indicating samples of a first track of the set of tracks at which switching from a second track of the set of tracks is allowed provided that one or more preceding samples in the second track are available to a video decoder fed from the file, and the switching information indicating information on drift-affected samples of the first track which are affected from decoding drift by the video decoder decoding the drift-affected samples of the first track based on previous samples of the second track which are temporally aligned to reference samples of the first track referred to by the drift-affected samples.

18. Method for processing a file, comprising:

derive from the file switching information for a set of tracks, the switching information indicating samples of a first track of the set of tracks at which switching from a second track of the set of tracks is allowed provided that one or more preceding samples in the second track are available to a video decoder to which the file is provided, and the switching information indicating information on drift-affected samples of the first track which are affected from decoding drift by the video decoder decoding the drift-affected samples of the first track based on previous samples of the second track which are temporally aligned to reference samples of the first track referred to by the drift-affected samples.

19. Method for generating a file, comprising:

provide the file with information for a set of tracks, the switching information indicating samples of a first track of the set of tracks at which switching from a second track of the set of tracks is allowed provided that one or more preceding samples in the second track are available to a video decoder fed from the file, and the switching information indicating information on drift-affected samples of the first track which are affected from decoding drift by the video decoder decoding the drift-affected samples of the first track based on previous samples of the second track which are temporally aligned to reference samples of the first track referred to by the drift-affected samples.

*    *    *    *    *